United States Patent
Parri et al.

(10) Patent No.: US 8,119,026 B2
(45) Date of Patent: Feb. 21, 2012

(54) BIREFRINGENT LAYER WITH NEGATIVE OPTICAL DISPERSION

(75) Inventors: Owain Llyr Parri, Hampshire (GB); Kevin Adlem, Dorset (GB); Karl Skjonnemand, Southampton (GB); David Wilkes, Southampton (GB)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 97 days.

(21) Appl. No.: 12/532,901

(22) PCT Filed: Mar. 4, 2008

(86) PCT No.: PCT/EP2008/001703
§ 371 (c)(1), (2), (4) Date: Sep. 24, 2009

(87) PCT Pub. No.: WO2008/119426
PCT Pub. Date: Oct. 9, 2008

(65) Prior Publication Data
US 2010/0072422 A1    Mar. 25, 2010

(30) Foreign Application Priority Data
Mar. 30, 2007  (EP) ..................................... 07006652

(51) Int. Cl.
*C09K 19/00* (2006.01)
*C09K 19/06* (2006.01)
*C09K 19/32* (2006.01)
*C09K 19/52* (2006.01)

(52) U.S. Cl. ........... 252/299.01; 252/299.6; 252/299.61; 252/299.62; 252/299.63; 349/167; 349/182; 430/20; 428/1.1

(58) Field of Classification Search ............. 252/299.01, 252/299.6, 299.61–299.63; 349/167, 182; 428/1.1; 430/20
See application file for complete search history.

(56) References Cited

U.S. PATENT DOCUMENTS

| 6,139,771 | A | 10/2000 | Walba et al. |
| 6,203,724 | B1 | 3/2001 | Reiffenrath et al. |
| 7,480,021 | B2 * | 1/2009 | Rao et al. ..................... 349/117 |
| 2010/0110362 | A1 * | 5/2010 | Parri et al. ..................... 349/194 |
| 2010/0222534 | A1 * | 9/2010 | Adlem et al. ................. 526/285 |

FOREIGN PATENT DOCUMENTS

| WO | 2005085222 A1 | 9/2005 |
| WO | PCTEP2008001703 R | 6/2008 |

\* cited by examiner

*Primary Examiner* — Geraldina Visconti
(74) *Attorney, Agent, or Firm* — Millen, White, Zelano & Branigan, P.C.

(57) ABSTRACT

The invention relates to a birefringent layer having negative optical dispersion, a liquid crystal (LC) medium for its preparation, and the use of the birefringent layer and the LC media in optical, electrooptical, electronic, semiconducting or luminescent components or devices.

33 Claims, 10 Drawing Sheets

BIREFRINGENT LAYER WITH NEGATIVE OPTICAL DISPERSION

FIELD OF THE INVENTION

The invention relates to a birefringent layer having negative optical dispersion, liquid crystal (LC) media for its preparation, and the use of the birefringent layer and the LC media in optical, electrooptical, electronic, semiconducting or luminescent components or devices.

BACKGROUND AND PRIOR ART

There is a need for anisotropic optical layers or films that demonstrate negative optical retardation dispersion. For example, a quarter wave film made with negative dispersion birefringent materials will be largely achromatic. Devices such as a reflective LCD that utilises such a quarter wave film will have a dark state that is not coloured. Currently such devices have to use two retarder films to achieve this effect. The dispersive power of such a film can be defined in many ways, however one common way is to measure the optical retardation at 450 nm and divide this by the optical retardation measured at 550 nm ($R_{450}/R_{550}$). If the on-axis retardation of a negative retardation dispersion film at 550 nm is 137.5 nm and the $R_{450}/R_{550}$ value is 0.82, then such a film will be a largely a quarter wave for all wavelengths of visible light and a liquid crystal display device (LCD) using this film as, for example, a circular polariser would have a substantially black appearance. On the other hand, a film made with an on axis of 137.5 nm which had normal positive dispersion (typically $R_{450}/R_{550}=1.13$) would only be a quarter wave for one wavelength (550 nm), and an LCD device using this film as, for example, a circular polariser would have a purple appearance. Another way of representing this information is to plot the change in birefringence as a function of wavelength. FIG. 1 shows a typical birefringence against wavelength plot for a polymerised film made from the commercially available reactive mesogen RM257 (Merck KgaA, Darmstadt, Germany). The $R_{450}/R_{550}$ for this compound is around 1.115.

In an anisotropic optical film formed by rod-shaped, optically anisotropic molecules, the origin of the retardation dispersion is due to the fact that the two refractive indices $n_e$, $n_o$, of the anisotropic molecules (wherein $n_e$ is the "extraordinary refractive index" in the direction parallel to the long molecular axis, and $n_o$ is the "ordinary refractive index" in the directions perpendicular to the long molecular axis) are changing with wavelength at different rates, with $n_e$ changing more rapidly than $n_o$ towards the blue end of the visible wavelength spectrum. One way of preparing material with low or negative retardation dispersion is to design molecules with increased $n_o$ dispersion and decreased $n_e$ dispersion. This is schematically shown in FIG. 2. Such an approach has been demonstrated in prior art to give LC's with negative birefringence and positive dispersion as well as compounds with positive birefringence and negative dispersion.

Thus, molecules that can be formed into anisotropic films that demonstrate the property of negative or reverse retardation dispersion have been disclosed in prior art. For example, JP2005-208416 A1 and WO 2006/052001 A1 disclose polymerisable materials based on a "cardo" core group. JP2005-208414 A1 discloses molecules that have covalently bonded discs and rods. JP2005-208415 A1 and JP2002-267838 A1 disclose materials that possess a cross-shape with short high refractive index parts of the molecule crossed with longer lower refractive index parts. WO 2005-085222 A1 discloses molecules that have two lower refractive index parts connected by a higher refractive index bridge part. The bridge is predominantly connected to the rods via a fused five-membered heterocyclic ring. All the above-mentioned documents disclose molecules that not only demonstrate negative dispersion, but also contain at least one polymerisable group and can therefore be polymerised when exposed to either heat or UV irradiation. These materials can be processed either as single materials, or as a mixture to give thin films which under the appropriate conditions can demonstrate uniform anisotropic properties. If photoinitiator is also included in the mixture, the anisotropic properties can be locked in by exposing the film to UV irradiation. This method of preparing optical films is well known.

Another class of materials which is claimed to demonstrate negative birefringence is disclosed in U.S. Pat. No. 6,139,771, which describes compounds generally consisting of two rod-shaped LC parts connected by an acetylenic or bis-acetylenic bridging group. The bridging group is connected to the two rod-shaped parts using a benzene ring.

U.S. Pat. No. 6,203,724 discloses molecules generally consisting of two rod-shaped LC parts connected by highly dispersive bridging groups. The bridging group is connected to the rod-shaped parts via the axial position of a cyclohexane ring. However the document does neither disclose nor suggest to use such compounds for the preparation of birefringent layers having negative optical dispersion.

U.S. Pat. No. 5,567,349 discloses dimers (or H-shaped RM's) wherein the bridging group is connected to the rod shaped part of the molecule via a phenyl ring, however, this document does not report that the molecules demonstrate negative dispersion or negative birefringence.

However, the materials already disclosed in the literature have thermal properties that are not suitable for processing under standard industrial processes, or are not soluble in the solvents commonly used in standard industrial processes or are not compatible with host RM materials commonly used in standard industrial processes, or are too expensive to manufacture.

This invention has the aim of providing improved birefringent layers and materials for their preparation not having the drawbacks of the prior art materials.

Another aim of the invention is to extend the pool of layers and materials having negative dispersion that are available to the expert. Other aims are immediately evident to the expert from the following description.

It has been found that these aims can be achieved by providing birefringent layers and materials as claimed in the present invention.

SUMMARY OF THE INVENTION

The invention relates to a birefringent layer with $R_{450}/R_{550}<1$, wherein $R_{450}$ is the optical on-axis retardation at a wavelength of 450 nm and $R_{550}$ is the optical on-axis retardation at a wavelength of 550 nm, said layer comprising one or more non-polymerisable compounds containing
  two mesogenic groups comprising one or more non-aromatic rings,
  a bridging group connecting the mesogenic groups, comprising one or more subgroups selected from pi-conjugated linear carbyl or hydrocarbyl groups, aromatic and heteroaromatic groups, and being linked to a $sp^3$-hybridised C-atom or Si-atom in a non-aromatic ring of each mesogenic group,
said layer optionally comprising one or more additional compounds selected from mesogenic, liquid crystalline and/or polymerised or crosslinked compounds.

The invention further relates to an LC medium comprising one or more non-polymerisable compounds as described above and below, and one or more compounds that are optionally mesogenic or liquid crystalline.

The invention further relates to a polymerisable LC medium comprising one or more non-polymerisable compounds as described above and below, and one or more compounds that are polymerisable and are optionally mesogenic or liquid crystalline.

The invention further relates to an anisotropic polymer obtainable by polymerising a polymerisable LC medium as described above and below, preferably in its LC phase in an oriented state in form of a thin film.

The invention further relates to the use of layers, LC media and polymers as described above and below in optical, electronic and electrooptical components and devices, preferably in optical films, retarders or compensators having negative optical dispersion.

The invention further relates to an optical, electronic or electrooptical component or device, comprising a layer, LC medium or polymer as described above and below.

Said devices and components include, without limitation, electrooptical displays, LCDs, optical films, retarders, compensators, polarisers, beam splitters, reflective films, alignment layers, colour filters, holographic elements, hot stamping foils, coloured images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips.

TERMS AND DEFINITIONS

Figure 1:
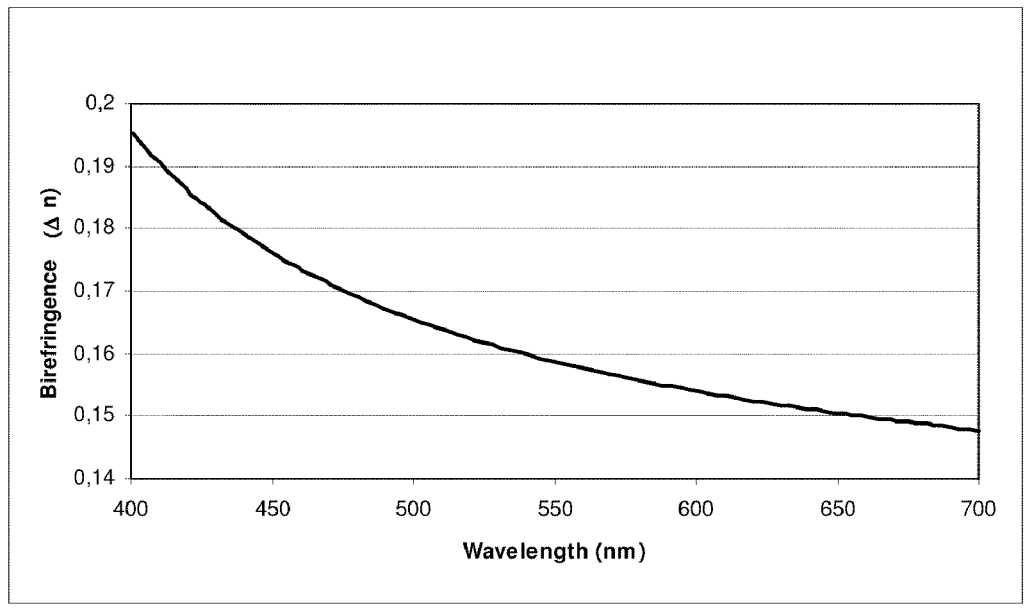
FIG. 1 shows the birefringence versus wavelength plot for a birefringent layer comprising a polymerised film of prior art.
Figure 2:
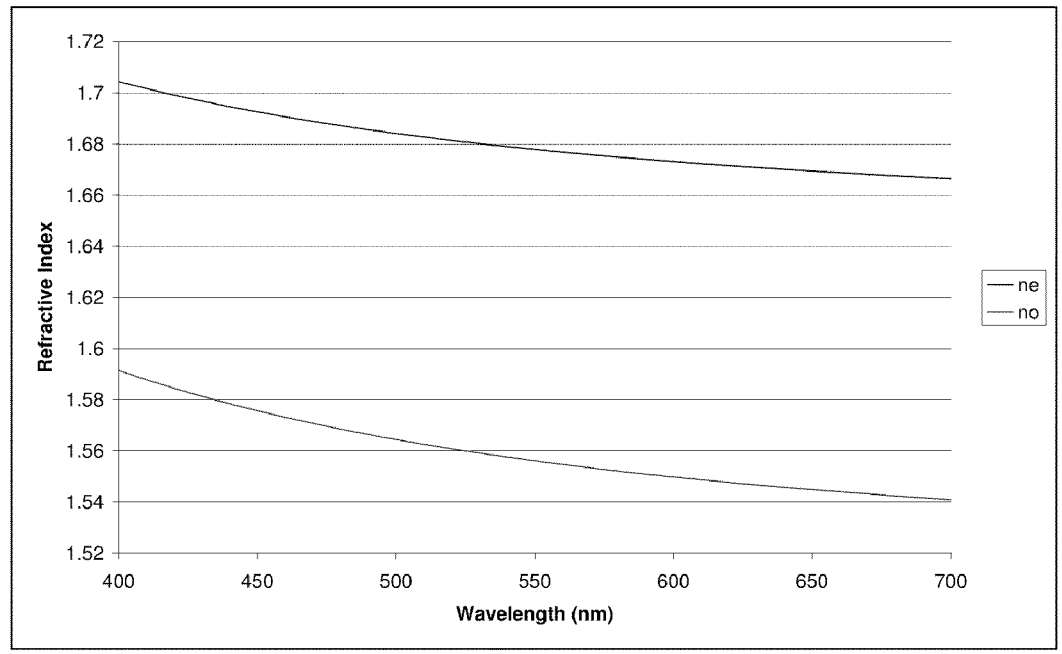
FIG. 2 shows the refractive index versus wavelength plot of a modelled molecule with low or negative retardation dispersion, showing increased $n_o$ dispersion and decreased $n_e$ dispersion.

The term "liquid crystal or mesogenic compound" means a compound comprising one or more calamitic (rod- or board/lath-shaped) or discotic (disk-shaped) mesogenic groups. The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds, or when the mesogenic compounds or materials, or the mixtures thereof, are polymerised. For the sake of simplicity, the term "liquid crystal" is used hereinafter for both mesogenic and LC materials. For an overview of definitions see C. Tschierske, G. Pelzl and S. Diele, Angew. Chem. 2004, 116, 6340-6368.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" (RM) means a polymerisable mesogenic or liquid crystal compound.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

The term "film" includes rigid or flexible, self-supporting or free-standing films with mechanical stability, as well as coatings or layers on a supporting substrate or between two substrates.

The term "pi-conjugated" means a group containing mainly C atoms with $sp^2$-hybridisation, or optionally also sp-hybridisation, which may also be replaced by hetero atoms. In the simplest case this is for example a group with alternating C—C single and double bonds, or triple bonds, but does also include groups like 1,3- or 1,4-phenylene. Also included in this meaning are groups like for example aryl amines, aryl phosphines and certain heterocycles (i.e. conjugation via N-, O-, P- or S-atoms).

The term "carbyl group" means any monovalent or multivalent organic radical moiety which comprises at least one carbon atom either without any non-carbon atoms (like for example —C≡C—), or optionally combined with at least one non-carbon atom such as N, O, S, P, Si, Se, As, Te or Ge (for example carbonyl etc.). The term "hydrocarbyl group" denotes a carbyl group that does additionally contain one or more H atoms and optionally contains one or more hetero atoms like for example N, O, S, P, Si, Se, As, Te or Ge. A carbyl or hydrocarbyl group comprising a chain of 3 or more C atoms may also be linear, branched and/or cyclic, including spiro and/or fused rings. In a hydrocarbyl group, one or more H atoms may also be replaced by deuterium atoms.

On the molecular level, the birefringence of a liquid crystal depends on the anisotropy of the polarizability ($\Delta\alpha=\alpha_{\parallel}-\alpha_{\perp}$). "Polarizability" means the ease with which the electron distribution in the atom or molecule can be distorted. The polarizability increases with greater number of electrons and a more diffuse electron cloud. The polarizability can be calculated using a method described in e.g. Jap. J. Appl. Phys. 42, (2003) p 3463.

The "optical retardation" at a given wavelength $R(\lambda)$ (in nm) of a layer of liquid crystalline or birefringent material is defined as the product of birefringence at that wavelength $\Delta n(\lambda)$ and layer thickness d (in nm) according to the equation $$R(\lambda)=\Delta n(\lambda)\cdot d$$

The optical retardation R represents the difference in the optical path lengths in nanometers traveled by S-polarised and P-polarised light whilst passing through the birefringent material. "On-axis" retardation means the retardation at normal incidence to the sample surface.

The term "negative (optical) dispersion" refers to a birefringent or liquid crystalline material or layer that displays reverse birefringence dispersion where the magnitude of the birefringence ($\Delta n$) increases with increasing wavelength ($\lambda$). i.e $|\Delta n(450)|<|\Delta n(550)|$, or $\Delta n(450)/\Delta n(550)<1$, where $\Delta n(450)$ and $\Delta n(550)$ are the birefringence of the material measured at wavelengths of 450 nm and 550 nm respectively. In contrast, positive (optical) dispersion" means a material or layer having $|\Delta n(450)|>|\Delta n(550)|$ or $\Delta n(450)/\Delta n(550)>1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Figure 4A:
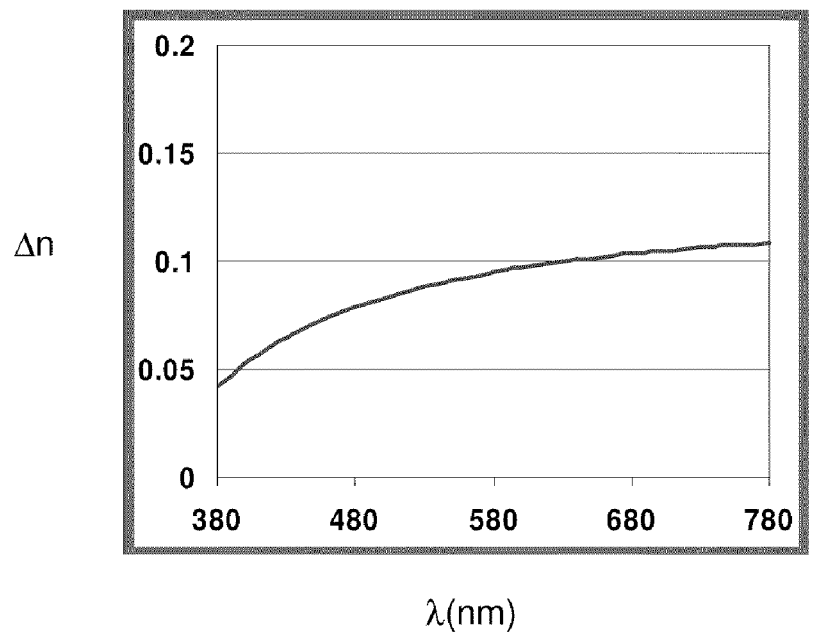
FIG. 4a and FIG. 4b show the birefringence versus wavelength plot for a compound with negative dispersion (4a) and positive dispersion (4b), respectively.

This is shown schematically in FIG. 4a.

Since the optical retardation at a given wavelength is defined as the product of birefringence and layer thickness as described above [$R(\lambda)=\Delta n(\lambda)\cdot d$], the optical dispersion can be expressed either as the "birefringence dispersion" by the ratio $\Delta n(450)/\Delta n(550)$, or as "retardation dispersion" by the ratio $R(450)/R(550)$, wherein $R(450)$ and $R(550)$ are the retardation of the material measured at wavelengths of 450 nm and 550 nm respectively. Since the layer thickness d does not change with the wavelength, $R(450)/R(550)$ is equal to $\Delta n(450)/\Delta n(550)$. Thus, a material or layer with negative or reverse dispersion has $R(450)/R(550)<1$ or $|R(450)|<|R(550)|$, and a material or layer with positive or normal dispersion has $R(450)/R(550)>1$ or $|R(450)|>|R(550)|$.

In the present invention, unless stated otherwise "optical dispersion" means the retardation dispersion i.e. the ratio $(R(450)/R(550))$.

The retardation ($R(\lambda)$) of a material can be measured using a spectroscopic ellipsometer, for example the M2000 spectroscopic ellipsometer manufactured by J. A. Woollam Co., This instrument is capable of measuring the optical retardance in nanometers of a birefringent sample e.g. Quartz over a range of wavelengths typically, 370 nm to 2000 nm. From this data it is possible to calculate the dispersion ($R(450)/R(550)$ or $\Delta n(450)/\Delta n(550)$) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

DETAILED DESCRIPTION OF THE INVENTION

The birefringent layer according to the present invention preferably comprises one or more non-polymerisable compounds having the structural features as described above and below, hereinafter referred to as "guest component" or "guest compounds", and one or more mesogenic or liquid crystalline compounds, preferably a mixture of two or more compounds, hereinafter referred to as "host component" or "host mixture", preferably an LC host mixture having a nematic phase. The terms "guest" and "host" does not exclude the possibility that the amount of the guest component in the final LC mixture is >50% by weight, and the amount of the host component in the final LC mixture is <50% by weight.

The birefringent layer preferably has positive birefringence and negative (or "reverse") dispersion.

The host component preferably has positive birefringence and positive (or "normal") dispersion.

The guest component preferably has
(1) Negative birefringence at 550 nm and normal (positive) birefringence dispersion (e.g. negative calamitic compound) or
(2) Positive birefringence at 550 nm and reverse (negative) birefringence dispersion. In this case $\Delta n(450)/\Delta n(550)$ can be negative if the guest component has a negative birefringence at 450 nm.

In the guest compounds, the mesogenic groups do preferably exhibit a low polarizability and are preferably calamitic groups, very preferably rod-shaped groups. The mesogenic groups are preferably comprising mainly non-aromatic, most preferably fully saturated, carbocyclic or heterocyclic groups which are connected directly or via linkage groups, wherein "mainly" means that each mesogenic group comprises more saturated rings than unsaturated or aromatic rings, and very preferably does not comprise more than one unsaturated or aromatic ring.

In the guest compounds, the two mesogenic groups can be identical or different from each other.

The guest compounds preferably comprise one or two terminal groups attached to the mesogenic groups, preferably at the short side of the rod-shaped mesogenic groups. These terminal groups are preferably selected from the groups $R^{1-5}$ in formula I shown below.

The bridging group does preferably exhibit a high polarizability and is preferably consisting mainly, very preferably exclusively, of subgroups selected from pi-conjugated linear groups, aromatic and heteroaromatic groups.

Preferably the bridging group consists, very preferably exclusively, of one or more subgroups selected from groups having a bonding angle of 120° or more, preferably in the range of 180°. Suitable and preferred subgroups include, without limitation, groups comprising sp-hybridised C-atoms, like —C≡C—, or divalent aromatic groups connected to their neighbored groups in para-position, like e.g. 1,4-phenylene, naphthalene-2,6-diyl, indane-2,6-diyl or thieno[3,2-b]thiophene-2,5-diyl.

Preferably the bridging group is connected to an $sp^3$-hybridised C-atom or Si-atom located in a non-aromatic ring of the mesogenic group. Very preferably the bridging group is connected in axial position to a cyclohexylene or silanane ring comprised in the mesogenic group, which is optionally substituted and wherein one or more non-adjacent C-atoms are optionally replaced by Si and/or one or more non-adjacent $CH_2$ groups are optionally replaced by —O— and/or —S—.

Figure 3A:
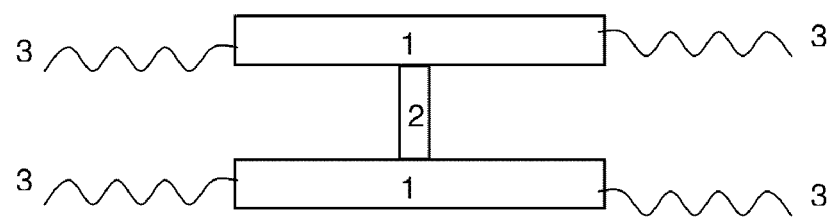
FIG. 3a and FIG. 3b do schematically depict a guest compound according to the present invention.
Figure 3B:
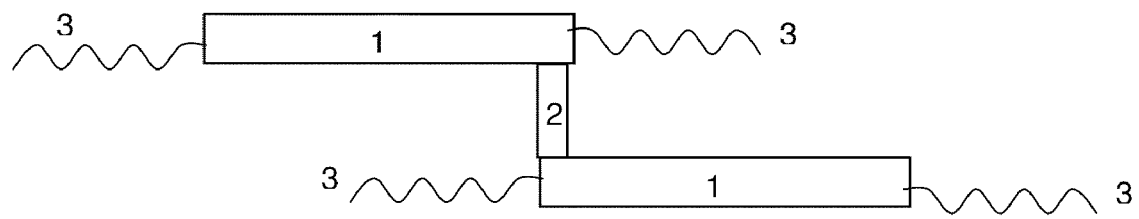

FIG. 3a and FIG. 3b do schematically illustrate the structure of polymerisable compounds according to the present invention, without limiting its scope. Therein 1 denotes mesogenic calamitic groups, 2 denotes a bridging group and 3 denotes non-polymerisable terminal groups like carbyl or hydrocarbyl.

The compounds according to the present invention are not limited to the structures shown in FIGS. 3a and 3b. For example, the compounds may also comprise non-polymerisable terminal groups in other positions than those shown in FIGS. 3a and 3b, or in addition to those shown in FIGS. 3a and 3b. The terminal groups may also be omitted.

Since the bridging group is a linear group consisting of subgroups having bonding angles of approx. 180°, and is linked to the mesogenic groups via an $sp^3$-hybridised C-atom or Si-atom (i.e. with a bonding angle of approx. 109°), the compounds of the present invention have an H-shaped or L-shaped structure, wherein the mesogenic groups are substantially parallel to each other and substantially perpendicular to the bridging group, as illustrated in FIG. 3a and FIG. 3b.

Figure 4B:
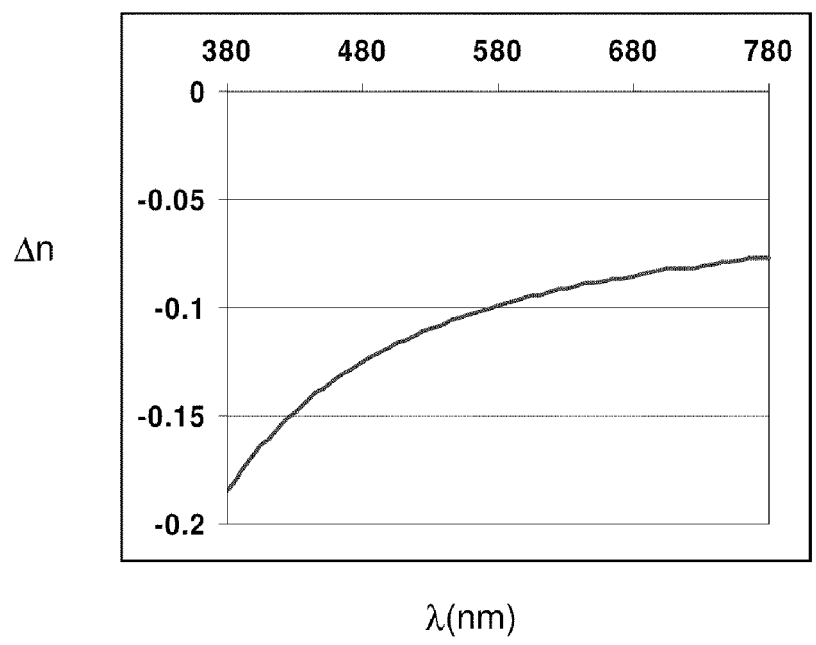

In addition, the bridging group, which essentially consists of subgroups with pi-conjugation, has a high polarizability and a high refractive index, whereas the mesogenic groups, which essentially consist of non-aromatic rings, have a low polarizability and a low refractive index. As a result, the compounds show, depending on their exact structure, either positive birefringence and negative dispersion, as schematically depicted in FIG. 4a, or negative birefringence with positive dispersion, as schematically depicted in FIG. 4b.

As a reference normal calamitic materials have positive birefringence and positive dispersion. It is desirable to have materials where the magnitude of Δn decreases at shorter wavelength, and compounds with both positive dispersion and negative birefringence can be mixed with a host material to give a mixture which possesses a range of dispersion (depending on the concentration of the dopant and host) varying from positive birefringence with positive dispersion through to positive birefringence with negative dispersion.

Preferably the guest compounds are selected of formula I

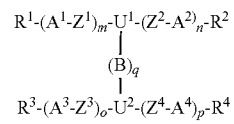

wherein
$U^{1,2}$ are independently of each other selected from

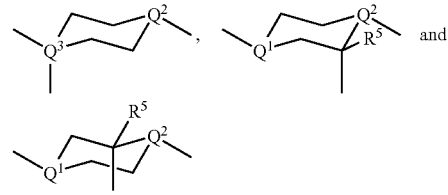

including their mirror images, wherein the rings $U^1$ and $U^2$ are each bonded to the group $—(B)_q—$ via the axial bond, and one or two non-adjacent $CH_2$ groups in these rings are optionally replaced by O and/or S, and the rings $U^1$ and $U^2$ are optionally substituted by one or more groups L,
$Q^{1,2}$ are independently of each other CH or SiH,
$Q^3$ is C or Si,
B is in each occurrence independently of one another —C≡C—, —$CY^1$=$CY^2$— or an optionally substituted aromatic or heteroaromatic group,
$Y^{1,2}$ are independently of each other H, F, Cl, CN or $R^0$,
q is an integer from 1 to 10, preferably 1, 2, 3, 4, 5 or 6,
$A^{1-4}$ are independently of each other selected from non-aromatic, aromatic or heteroaromatic carbocyclic or heterocyclic groups, which are optionally substituted by one or more groups $R^5$, and wherein each of -$(A^1-Z^1)_m$—U—$(Z^2-A^2)_n$- and -$(A^3-Z^3)_o$—$U^2$—$(Z^4-A^4)_p$-does not contain more aromatic groups than non-aromatic groups and preferably does not contain more than one aromatic group,
$Z^{1-4}$ are independently of each other —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CH_2CF_2$—, —$CF_2CF_2$—, —CH=CH—, —$CY^1$=$CY^2$—, —CH=N—, —N=CH—, —N=N—, —CH=$CR^0$—, —C≡C—, —CH=CH—COO—, —OCO—CH=CH—, $CR^0R^{00}$ or a single bond,
$R^0$ and $R^{00}$ are independently of each other H or alkyl with 1 to 12 C-atoms,
m and n are independently of each other 0, 1, 2, 3 or 4,
o and p are independently of each other 0, 1, 2, 3 or 4,
$R^{1-5}$ are independently of each other identical or different groups selected from H, halogen, —CN, —NC, —NCO, —NCS, —OCN, —SCN, —C(=O)$NR^0R^{00}$, —C(=O)$X^0$, —C(=O)$R^0$, —$NH_2$, —$NR^0R^{00}$, —SH, —$SR^0$, —$SO_3H$, —$SO_2R^0$, —OH, —$NO_2$, —$CF_3$, —$SF_5$, optionally substituted silyl, or carbyl or hydrocarbyl with 1 to 40 C atoms that is optionally substituted and optionally comprises one or more hetero atoms, and wherein one or more H atoms are optionally replaced by D atoms.

In the guest compounds of the present invention, the subgroups forming the bridging group, like B in formula I, are preferably selected from groups having a bonding angle of 120° or more, preferably in the range of 180°. Very preferred are —C≡C— groups or divalent aromatic groups connected to their adjacent groups in para-position, like e.g. 1,4-phenylene, naphthalene-2,6-diyl, indane-2,6-diyl or thieno[3,2-b]thiophene-2,5-diyl.

Further possible subgroups include —CH=CH—, —CY$^1$=CY$^2$—, —CH=N—, —N=CH—, —N=N— and —CH=CR$^0$— wherein Y$^1$, Y$^2$, R$^0$ have the meanings given above.

Preferably the bridging group, like —(B)$_q$— in formula I, comprises one or more groups selected from the group consisting of —C≡C—, optionally substituted 1,4-phenylene and optionally substituted 9H-fluorene-2,7-diyl. The subgroups, or B in formula I, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or —(B)$_q$— in formula I, are selected from —C≡C—, —C≡C—C≡C—, —C≡C—C≡C—C≡C—, —C≡C—C≡C—C≡C—C≡C—,

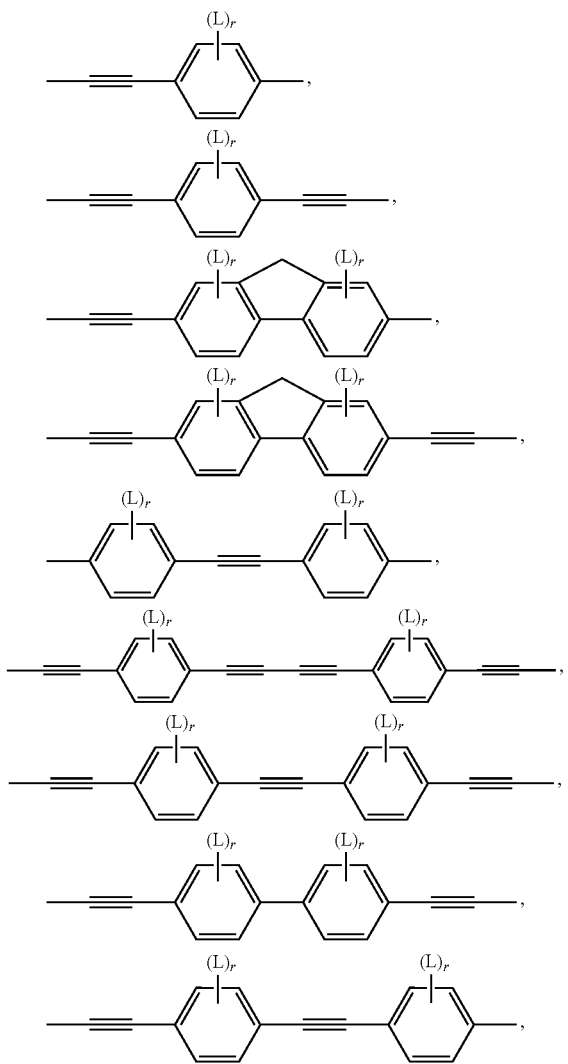

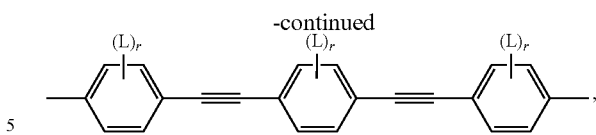

wherein r is 0, 1, 2, 3 or 4 and L has the meaning as described below.

In the guest compounds of the present invention, the non-aromatic rings of the mesogenic groups where the bridging group is attached, like U$^1$ and U$^2$ in formula I, are preferably selected from

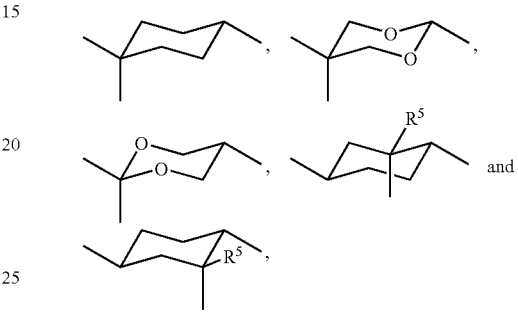

wherein R$^5$ is as defined in formula I.

In the guest compounds of the present invention, the aromatic groups, like A$^{1-4}$ in formula I, may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and are optionally substituted.

Preferred aromatic groups include, without limitation, benzene, biphenylene, triphenylene, [1,1':3',1"]terphenyl-2'-ylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, etc.

Preferred heteroaromatic groups include, without limitation, 5-membered rings like pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings like pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, and fused systems like carbazole, indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dithienopyridine, isobenzothiophene, dibenzothiophene, benzothiadiazothiophene, or combinations thereof.

In the compounds of the present invention, the non-aromatic carbocyclic and heterocyclic rings, like $A^{1-4}$ in formula I, include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

The non-aromatic carbocyclic and heterocyclic groups may be mononuclear, i.e. having only one ring (like for example cyclohexane), or polynuclear, i.e. having two or more fused rings (like for example decahydronaphthalene or bicyclooctane). Especially preferred are fully saturated groups. Further preferred are mono-, bi- or tricyclic non-aromatic groups with up to 25 C atoms that optionally comprise fused rings and are optionally substituted. Very preferred are 5-, 6-, 7- or 8-membered carbocyclic rings wherein one or more non-adjacent C-atoms are optionally replaced by Si and/or one or more non-adjacent CH groups are optionally replaced by N and/or one or more non-adjacent $CH_2$ groups are optionally replaced by —O— and/or —S—, all of which are optionally substituted.

Preferred non-aromatic groups include, without limitation, 5-membered rings like cyclopentane, tetrahydrofuran, tetrahydrothiofuran, pyrrolidine, 6-membered rings like cyclohexane, silinane, cyclohexene, tetrahydropyran, tetrahydrothiopyran, 1,3-dioxane, 1,3-dithiane, piperidine, 7-membered rings like cycloheptane, and fused systems like bicyclo[2.2.2]octane, tetrahydronaphthalene, decahydronaphthalene, indane, or combinations thereof.

Preferably the non-aromatic and aromatic rings, or $A^{1-4}$ in formula I, are selected from trans-1,4-cyclohexylene and 1,4-phenylene that is optionally substituted with one or more groups L.

Preferably the mesogenic groups comprise not more than one, very preferably no aromatic ring, most preferably no aromatic or unsaturated ring.

Very preferred are compounds of formula I wherein m and p are 1 and n and o are 1 or 2. Further preferred are compounds of formula I wherein m and p are 1 or 2 and n and o are 0. Further preferred are compounds wherein m, n, o and p are 2.

In the guest compounds of the present invention, the linkage groups connecting the aromatic and non-aromatic cyclic groups in the mesogenic groups, like $Z^{1-4}$ in formula I, are preferably selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, CH=N—, —N=CH—, —N=N—, —CH=CR$^0$—, —C≡C—, —CH=CH—COO—, —OCO—CH=CH—, CR$^0$R$^{00}$ or a single bond, very preferably from —COO—, —OCO— and a single bond.

In the guest compounds of the present invention, the substituents on the rings, like L in formula I, are preferably selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein R$^0$ and R$^{00}$ are as defined in formula I and X is halogen.

Preferred substituents are selected from F, Cl, CN, NO$_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated.

Very preferred substituents are selected from F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OCD$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, in particular F, Cl, CN, CH$_3$, C$_2$H$_5$, C(CH$_3$)$_3$, CH(CH$_3$)$_2$, OCH$_3$, COCH$_3$, OCD$_3$ or OCF$_3$, most preferably F, Cl, CH$_3$, C(CH$_3$)$_3$, OCH$_3$ or COCH$_3$.

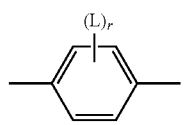

is preferably

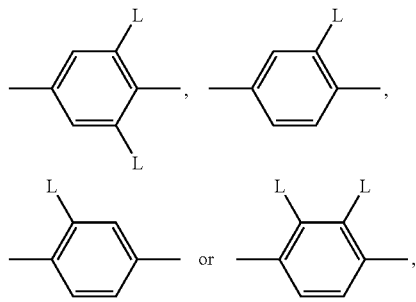

with L having each independently one of the meanings given above.

In the guest compounds of the present invention, the terminal groups, like R-5 in formula I, are preferably selected from F, Cl, Br, I or carbyl or hydrocarbyl groups. Especially preferred carbyl and hydrocarbly groups include, without limitation, straight-chain, branched or cyclic alkyl with 1 to 40, preferably 1 to 25 C-atoms, which is unsubstituted, mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —O—CO—O—, —S—CO—, —CO—S—, —SO$_2$—, —CO—NR$^0$—, —NR$^0$—CO—, —NR$^0$—CO—NR$^{00}$—, —CY$^1$=CY$^2$— or —C≡C— in such a manner that O and/or S atoms are not linked directly to one another, wherein Y$^1$ and Y$^2$ are independently of each other H, F, Cl or CN, and R$^0$ and R$^{00}$ are independently of each other H or an optionally substituted aliphatic or aromatic hydrocarbon with 1 to 20 C atoms.

Very preferably the terminal groups, like R$^{1-5}$ in formula I, are selected from, C$_1$-C$_{20}$-alkyl, C$_1$-C$_{20}$-oxaalkyl, C$_1$-C$_{20}$-alkoxy, C$_2$-C$_{20}$-alkenyl, C$_2$-C$_{20}$-alkynyl, C$_1$-C$_{20}$-thioalkyl, C$_1$-C$_{20}$-silyl, C$_1$-C$_{20}$-ester, C$_1$-C$_{20}$-amino, C$_1$-C$_{20}$-fluoroalkyl.

An alkyl or alkoxy radical, i.e. where the terminal CH$_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more $CH_2$ groups are replaced by —CH═CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-1E-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one $CH_2$ group is replaced by —O— and one by —CO—, these radicals are preferably neighbored. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in (position. Examples for especially preferred straight-chain groups with a terminal F substituent are fluoromethyl, 2-fluorethyl, 3-fluorpropyl, 4-fluorbutyl, 5-fluorpentyl, 6-fluorohexyl and 7-fluorheptyl. Other positions of F are, however, not excluded.

$R^0$ and $R^{00}$ are preferably selected from H, straight-chain or branched alkyl with 1 to 12 C atoms.

—$CY^1$═$CY^2$— is preferably —CH═CH—, —CF═CF— or —CH═C(CN)—.

Halogen is F, Cl, Br or I, preferably F or Cl.

$R^{1-5}$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

Very preferred compounds of formula I are those of the following subformulae:

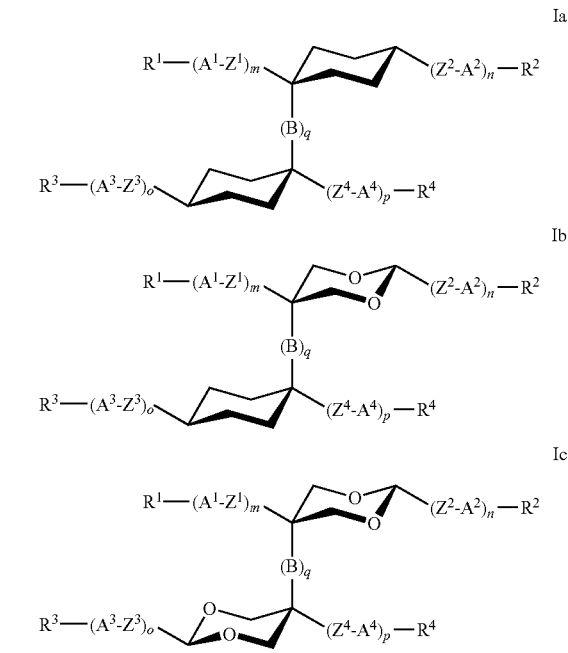

Id
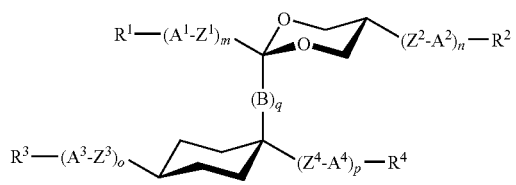
Ie
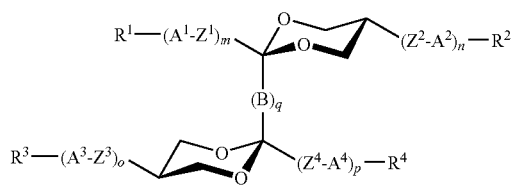
If
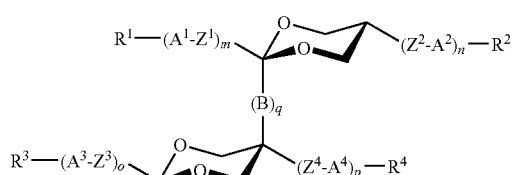
Ig
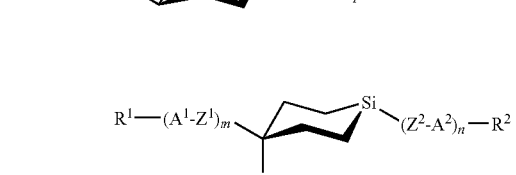
Ih
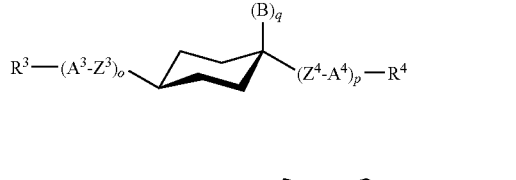
Ij
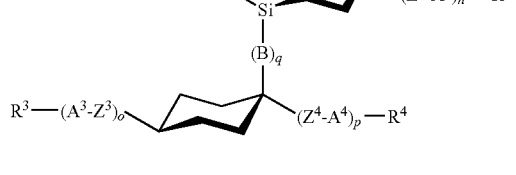
Ik
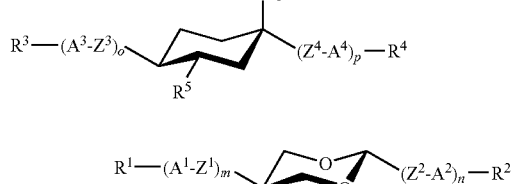
Im
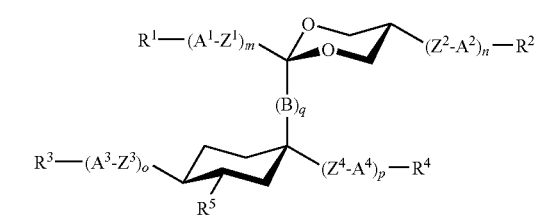
In
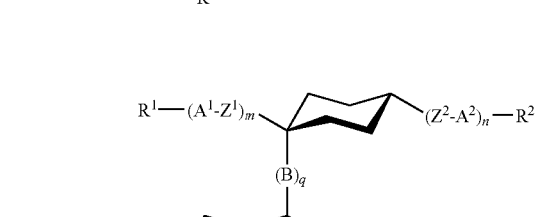
Io
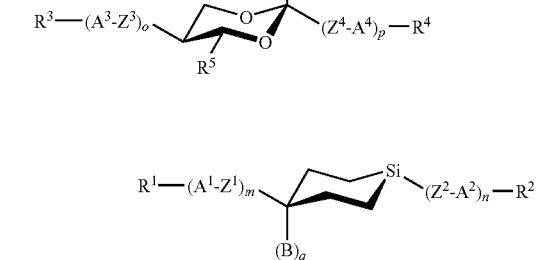
Ip
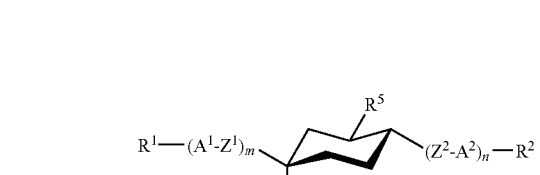
Iq
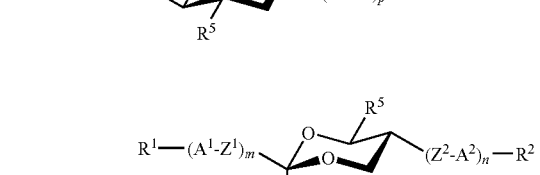
Ir
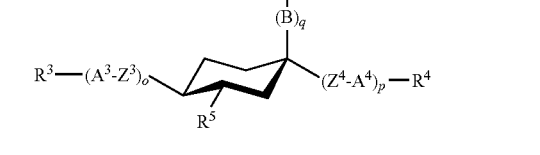

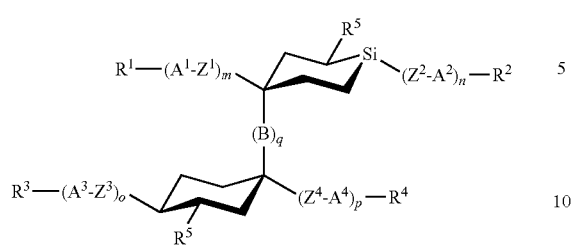
Is
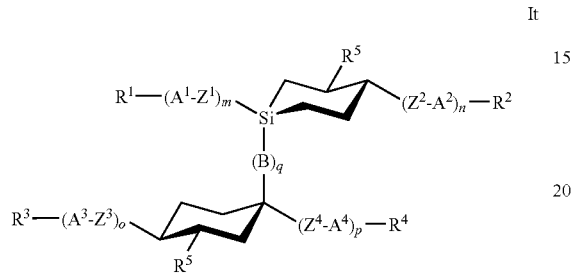
It
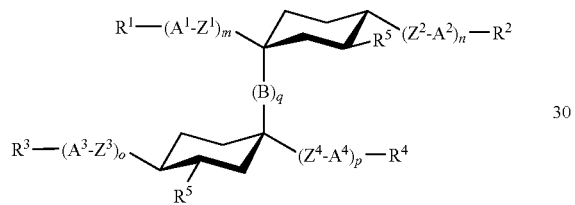
Iu
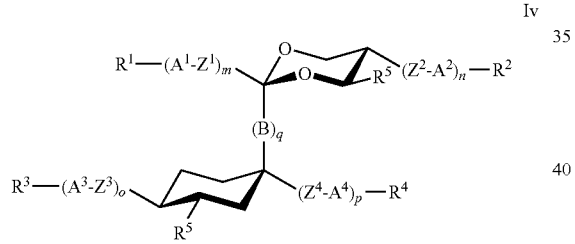
Iv
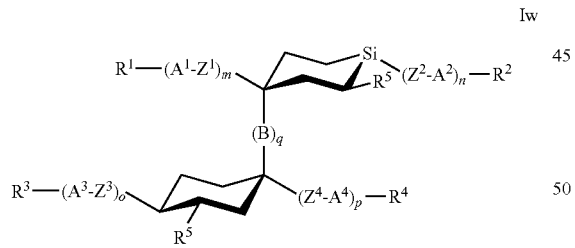
Iw
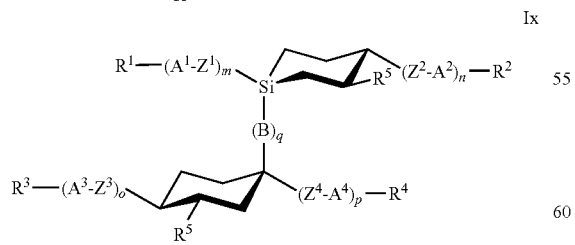
Ix
wherein $R^{1-5}$, $A^{1-4}$, $Z^{1-4}$, B, m, n, o, p and q have the meanings given above.
Especially preferred are compounds of the following sub-formulae:
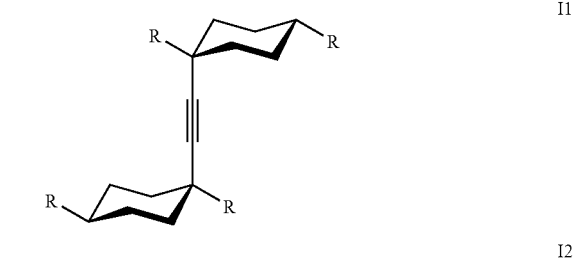
I1
I2
I3
I4
I5
I6

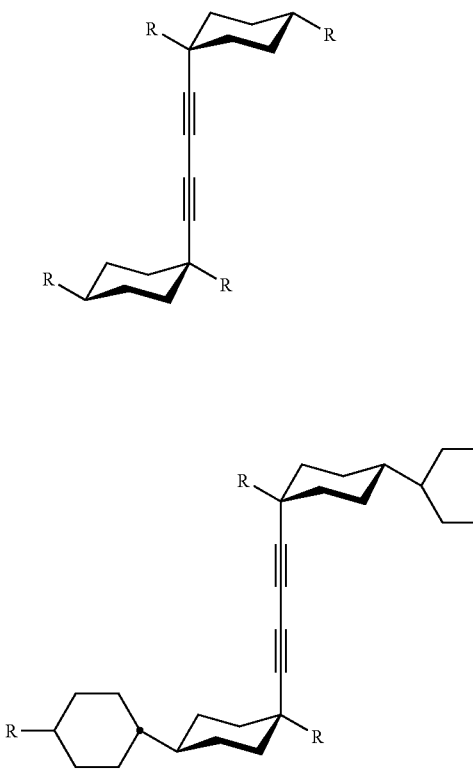
I7
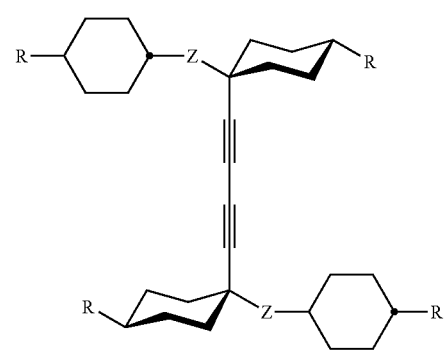
I8
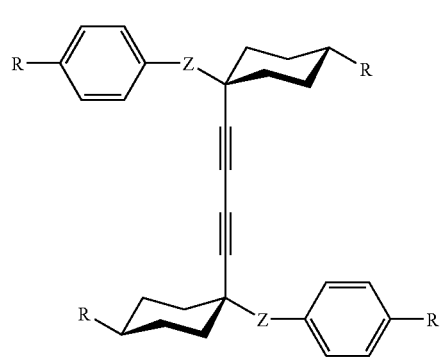
I9
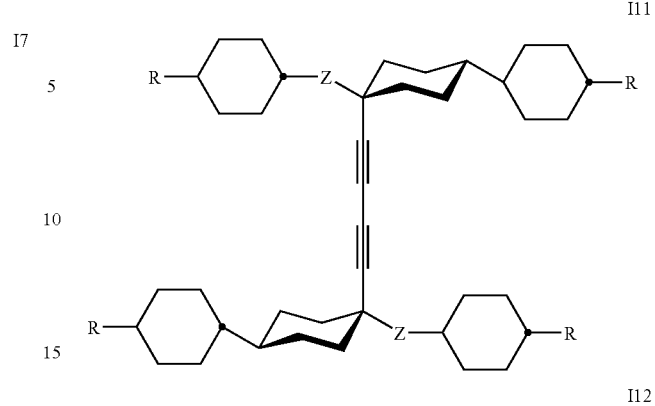
I11
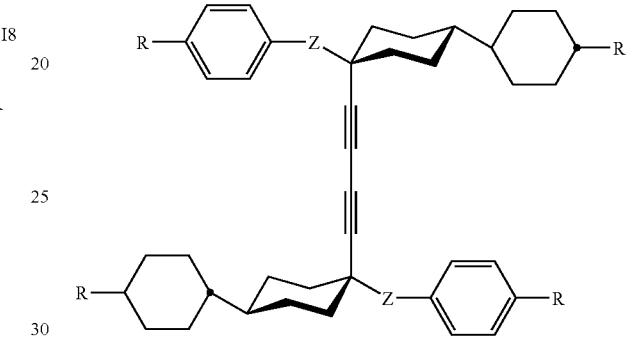
I12
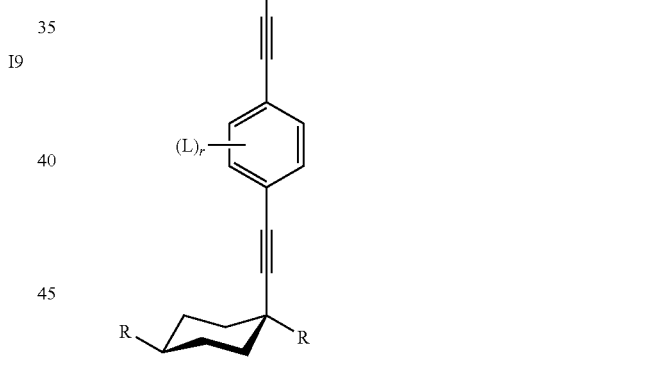
I13
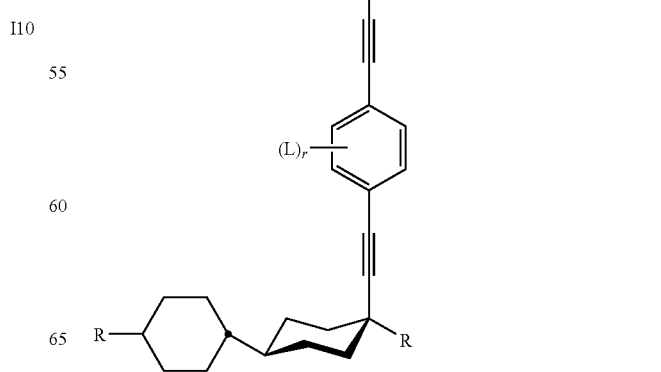
I14

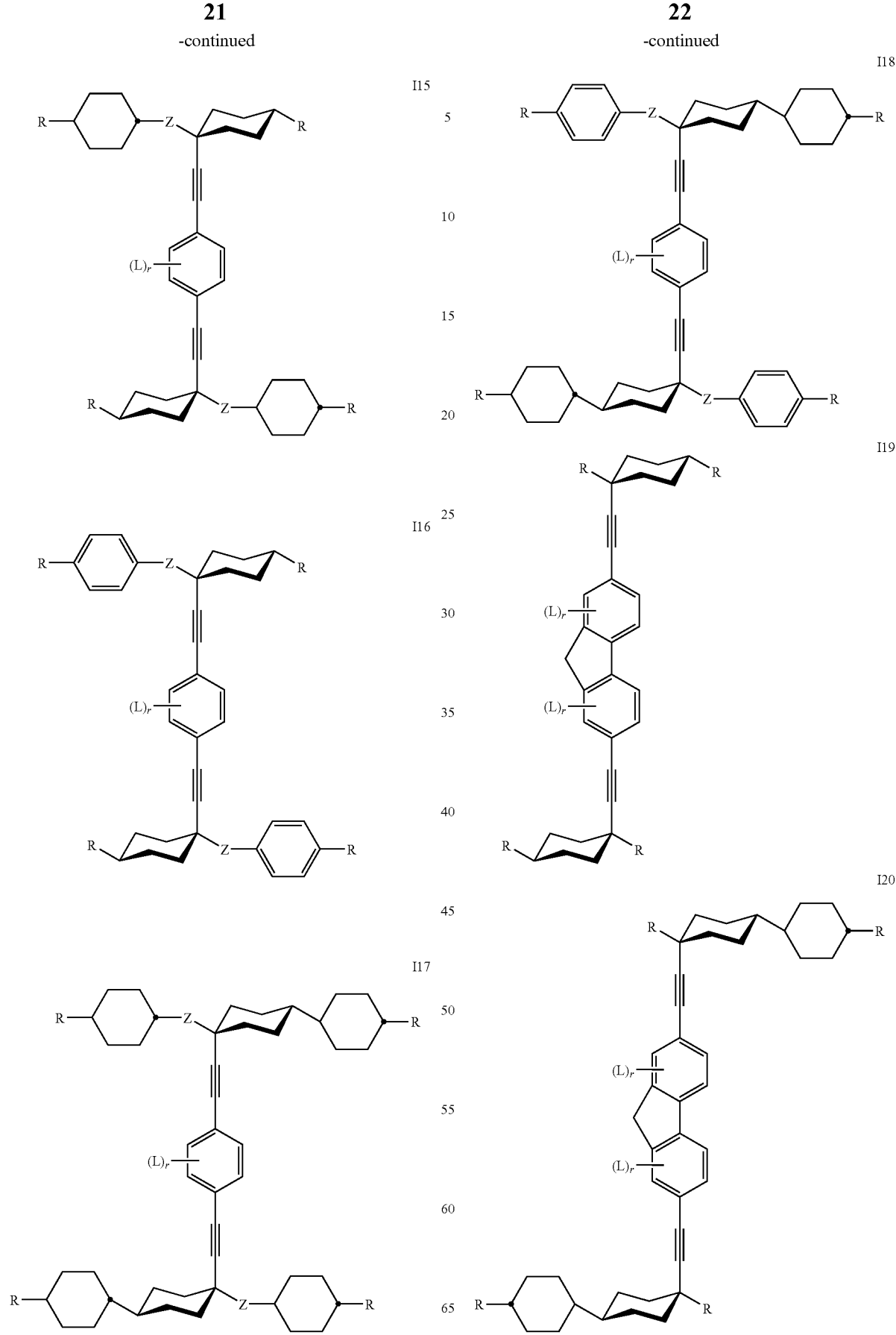

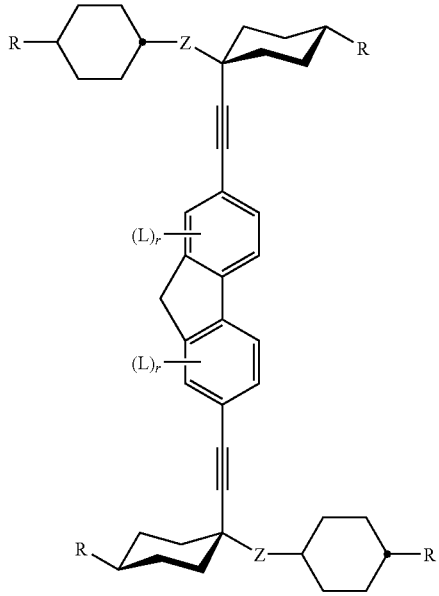

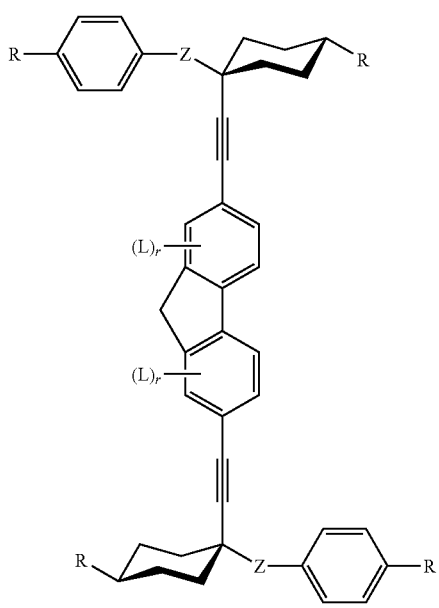

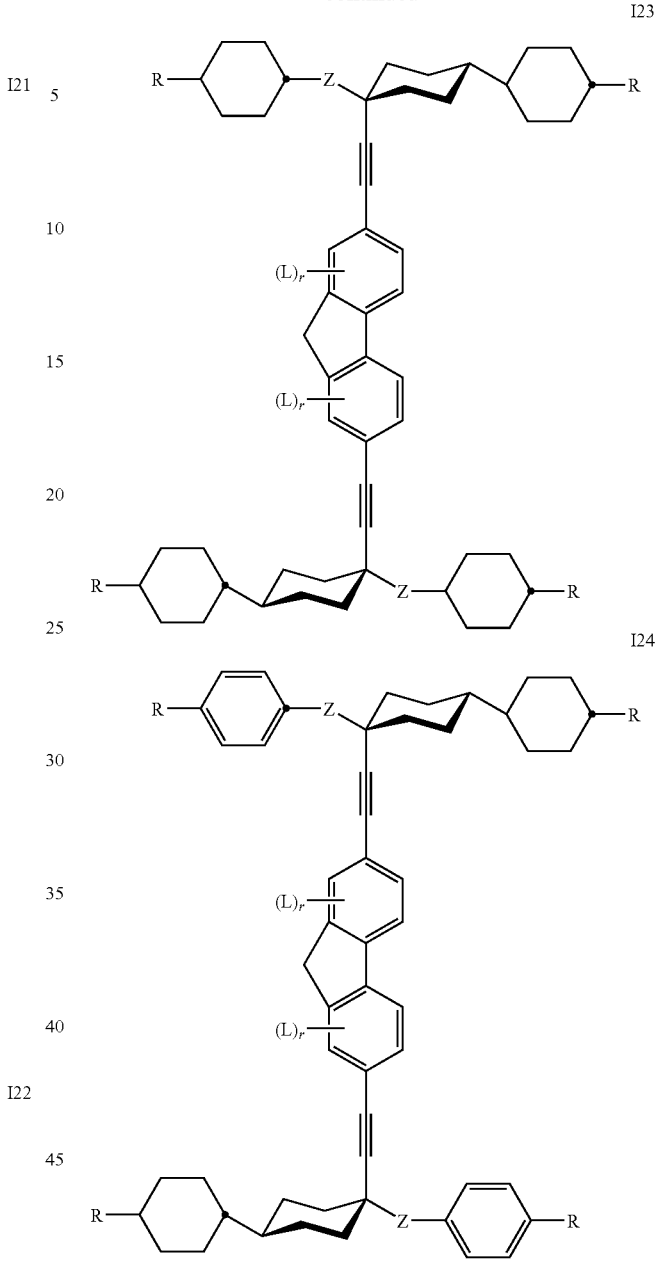

wherein Z has in each occurrence independently of one another one of the meanings of $Z^1$ given above, and R has in each occurrence independently of one another one of the meanings of $R^1$ as given above, and the benzene rings in the mesogenic groups are optionally substituted by one or more groups L as defined above.

The compounds of formula I can be synthesized according to or in analogy to methods which are known per se and which are described in the literature and in standard works of organic chemistry such as, for example, Houben-Weyl, Methoden der organischen Chemie, Thieme-Verlag, Stuttgart. Especially suitable methods are disclosed in U.S. Pat. No. 6,203,724. Further suitable methods of synthesis are also described below and in the examples.

The compounds of formula I can be generally synthesized by initially reacting a suitably substituted acetylene, e.g. (trimethylsilyl)acetylene, with a suitable cyclohexanone in the presence of butyllithium, as described e.g. in ACS Symposium Series (2001), 798 (Anisotropic Organic Materials), 195-205. After separation of the isomers by chromatography, the axial acetylenic substituents can either be homocoupled to form a dimer, (i.e. intermediate 2 in example 1) or coupled to another ring, such as dihalodobenzene, by palladium catalyzed coupling reactions as described e.g. in either J. Org. Chem. 1997, 62, 7471, or Tetrahedron Lett. 1993, 6403. With suitable choice of halo substituted phenyl rings, this can either give the symmetrical dimer or the axial-phenylacetylenic substituted cyclohexanones, which can be further coupled to another axially substituted acetylenic cyclohexanone to give unsymmetrical examples. All the above examples generally give coupled products that are either mono or di-tertiary alcohols. Esterification of the dialcohols with a suitable carboxylic acid yields a diester product.

An alternative synthetic route involves the formation of the axial-substituted cyclohexanone by the methods described above, followed by esterification of the tertiary alcohols with a suitable carboxylic acid. The ester with an axial substituted acetylenic group can be homocoupled to give the diacetylenes, or coupled to a suitably substituted halo benzene via a palladium catalyzed coupling reaction.

Another aspect of the invention is an LC medium, preferably being non-polymerisable, comprising one or more guest compounds as described above and below, preferably selected of formula I, and one or more additional compounds, which are preferably mesogenic or liquid crystalline. These additional compounds constitute the LC host mixture.

Especially preferred are LC media with a nematic LC phase.

The concentration of the guest component in the LC medium (including both the guest and the host material) is preferably from 5 to 90 wt. %, very preferably from 30 to 70 wt. %. Preferably the LC medium comprises 1 to 3 of guest compounds.

Preferably the compounds of the LC host mixture are selected from compounds having low birefringence.

Especially preferred is an LC host mixture having an absolute value of the birefringence from 0.01 to 0.2, very preferably from 0.04 to 0.16.

Preferably the LC medium is a mixture consisting of 2 to 25, preferably 3 to 15 compounds, at least one of which is a guest compound as described above and below, preferably of formula I.

The other compounds are preferably low molecular weight LC compounds selected from nematic or nematogenic substances, for example from the known classes of the azoxybenzenes, benzylidene anilines, biphenyls, terphenyls, phenyl or cyclohexyl benzoates, phenyl or cyclohexyl esters of cyclohexanecarboxylic acid, phenyl or cyclohexyl esters of cyclohexyl-benzoic acid, phenyl or cyclohexyl esters of cyclohexylcyclohexane-carboxylic acid, cyclohexylphenyl esters of benzoic acid, of cyclohexane-carboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclo-hexylpyrimidines, phenyl- or cyclohexylpyridines, phenyl- or cyclohexylpyridazines, phenyl- or cyclohexyldioxanes, phenyl- or cyclohexyl-1,3-dithianes, 1,2-diphenyl-ethanes, 1,2-dicyclohexylethanes, 1-phenyl-2-cyclohexylethanes, 1-cyclo-hexyl-2-(4-phenylcyclohexyl)-ethanes, 1-cyclohexyl-2-biphenyl-ethanes, 1-phenyl2-cyclohexyl-phenylethanes, optionally halogenated stilbenes, benzyl phenyl ether, tolanes, substituted cinnamic acids and further classes of nematic or nematogenic substances. The 1,4-phenylene groups in these compounds may also be laterally mono- or difluorinated. The LC mixture is preferably based on achiral compounds of this type.

The most important compounds that can be used as components of the LC mixture can be characterized by the following formula

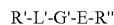

wherein L' and E, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl abd B is 2-(trans-1,4-cyclohexyl)ethyl, pyrimidine-2,5-diyl, pyridine-2,5-diyl or 1,3-dioxane-2,5-diyl.

G' in these compounds is selected from the following bivalent groups —CH=CH—, —N(O)N—, —CH=CY—, —CH=N(O)—, —C≡C—, —CH$_2$—CH$_2$—, —CO—O—, —CH$_2$—O—, —CO—S—, —CH$_2$—S—, —CH=N—, —COO-Phe-COO— or a single bond, with Y being halogen, preferably chlorine, or —CN.

R' and R" are, in each case, independently of one another, alkyl, alkenyl, alkoxy, alkenyloxy, alkanoyloxy, alkoxycarbonyl or alkoxycarbonyloxy with 1 to 18, preferably 3 to 12 C atoms, or alternatively one of R' and R" is F, CF$_3$, OCF$_3$, Cl, NCS or CN.

In most of these compounds R' and R" are, in each case, independently of each another, alkyl, alkenyl or alkoxy with different chain length, wherein the sum of C atoms in nematic media generally is between 2 and 9, preferably between 2 and 7.

All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

Many of these compounds or mixtures thereof are commercially available, like for example the nematic LC mixture ZIL-4792 (from Merck KgaA, Darmstadt, Germany), which can be suitably used as a host mixture for an LC medium as described above and below.

Another aspect of the invention is a polymerisable LC medium comprising one or more guest compounds as described above and below, and one or more additional compounds, which are polymerisable and are preferably mesogenic or liquid crystalline. Very preferably the polymerisable LC medium comprises one or more polymerisable compounds selected from reactive mesogens (RMs), most preferably selected from mono- and direactive RMs. These additional compounds constitute the polymerisable LC host material.

Another aspect of the present invention is a polymer film obtained by polymerising a layer of polymerisable LC medium as described above and below in its LC phase in an oriented state. Preferably the polymer film is crosslinked, and the polymerisable LC host material comprises at least one compound with two or more polymerisable groups (di- or multireactive).

The concentration of the guest component of the present invention in the polymerisable LC medium (including both the guest and the host material) is preferably from 5 to 90 wt. %, very preferably from 30 to 70 wt. %. Preferably the LC medium comprises 1 to 3 of guest compounds.

The additional RMs of the polymeriable LC host material can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578. Examples of particularly suitable and preferred RMs are shown in the following list.

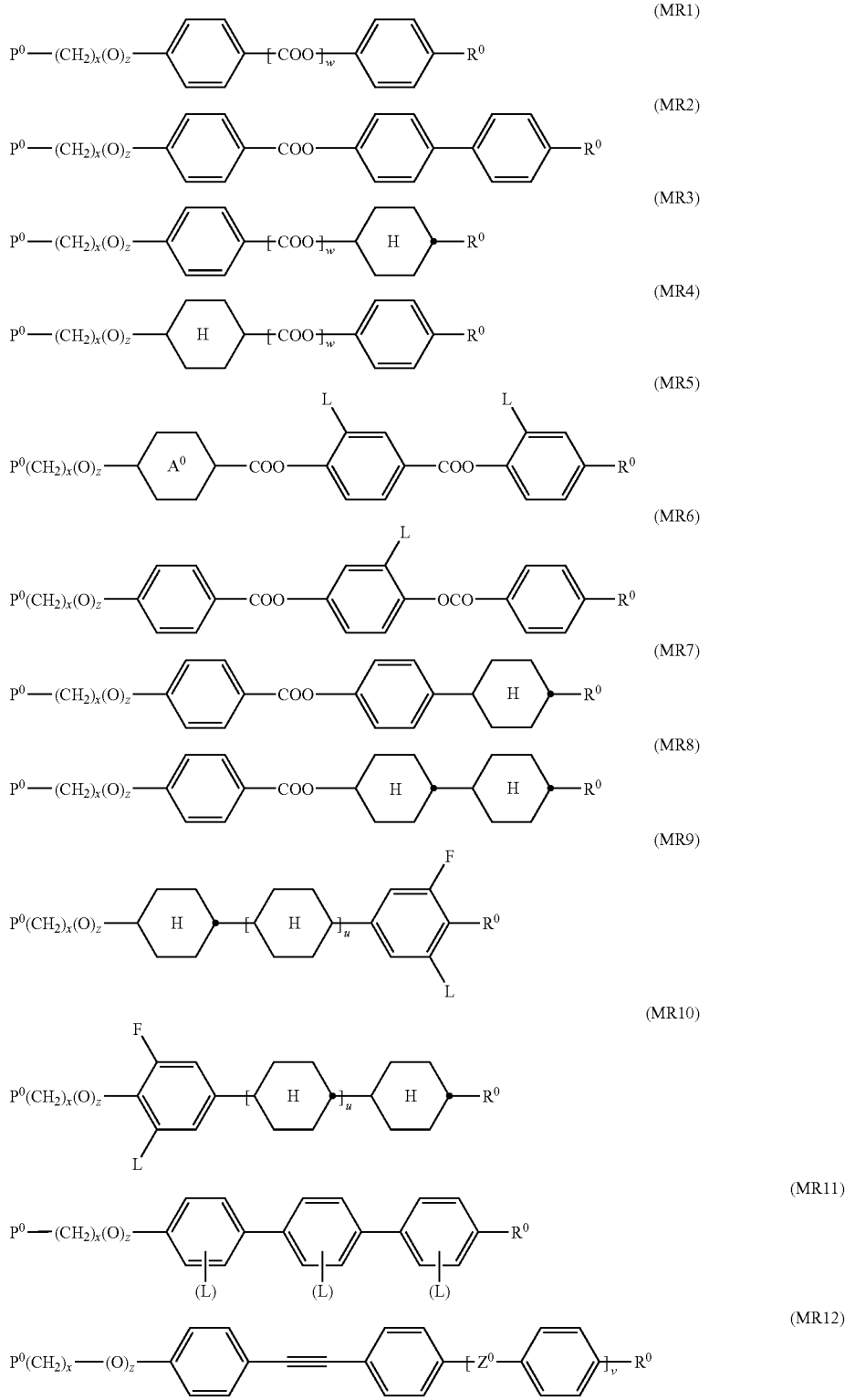

-continued
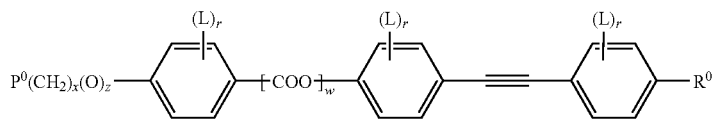
(MR13)
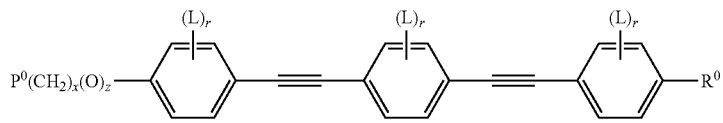
(MR14)
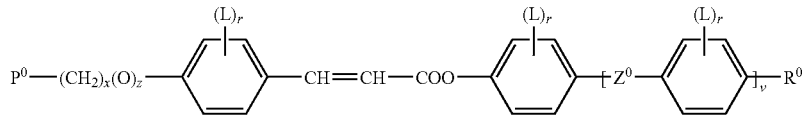
(MR15)
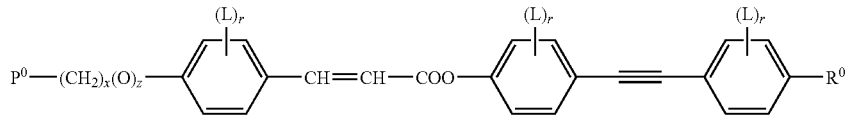
(MR16)
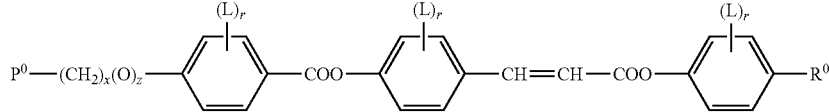
(MR17)
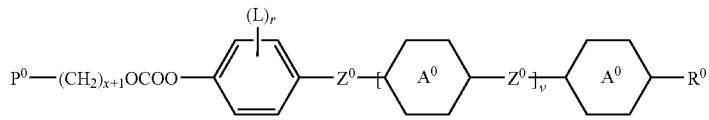
(MR18)
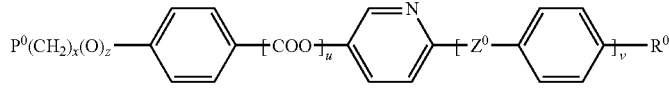
(MR19)
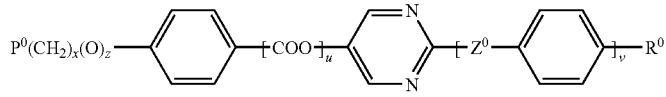
(MR20)
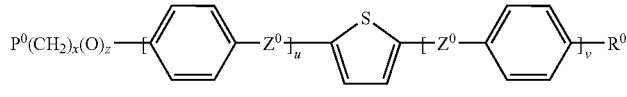
(MR21)
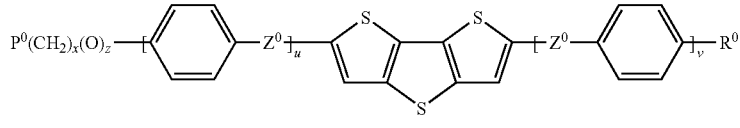
(MR22)
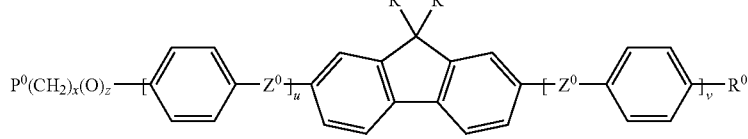
(MR23)
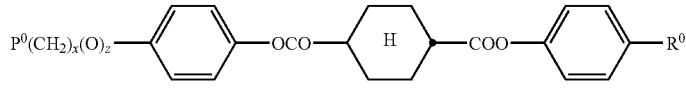
(MR24)
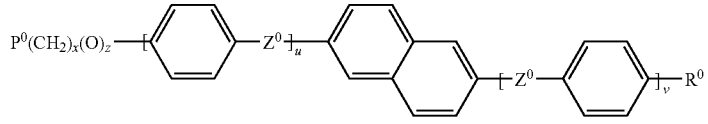
(MR25)

-continued
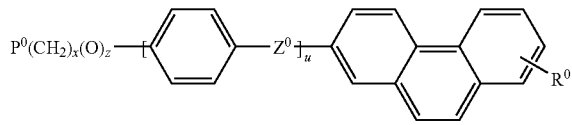
(MR26)
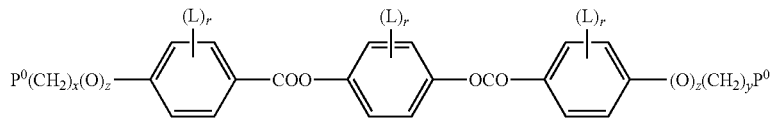
(DR1)
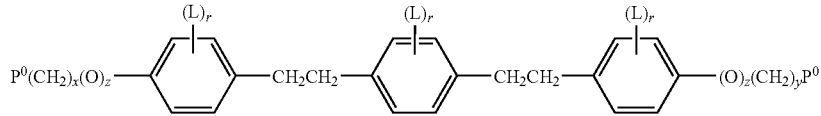
(DR2)
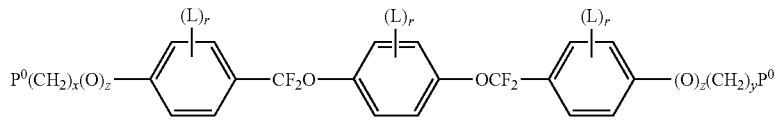
(DR3)
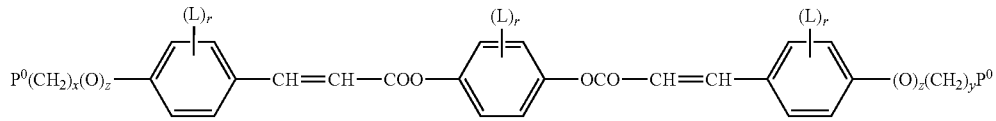
(DR4)
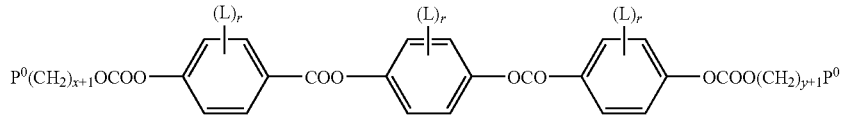
(DR5)
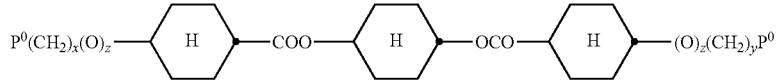
(DR6)
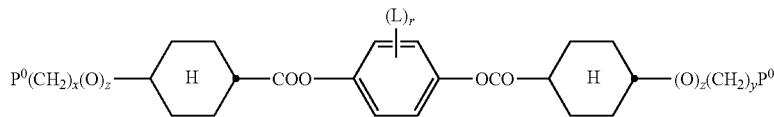
(DR7)
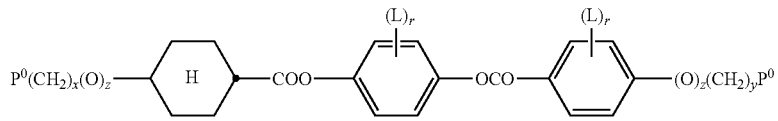
(DR8)
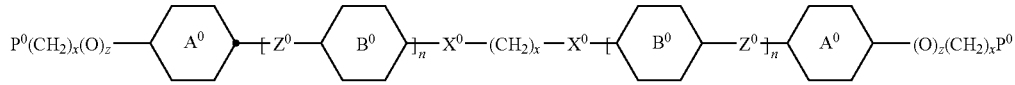
(DR9)
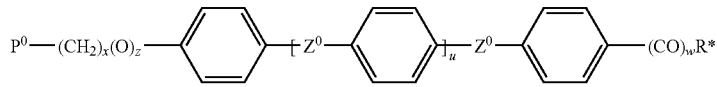
(CR1)
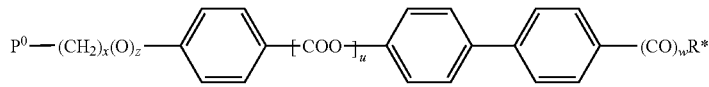
(CR2)
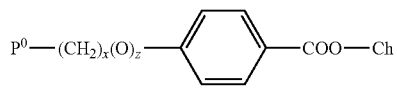
(CR3)

-continued

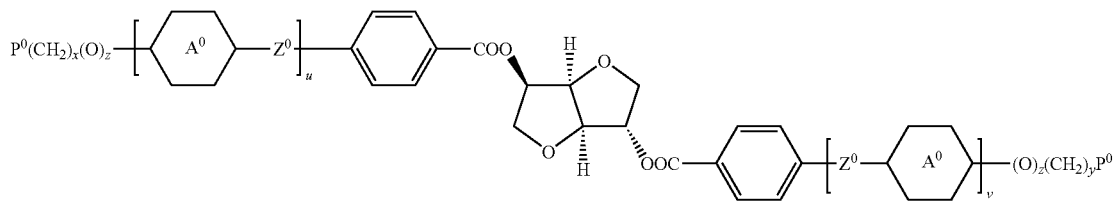
(CR4)

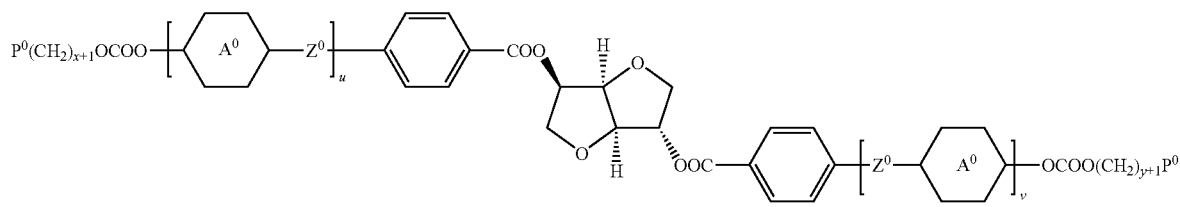
(CR5)

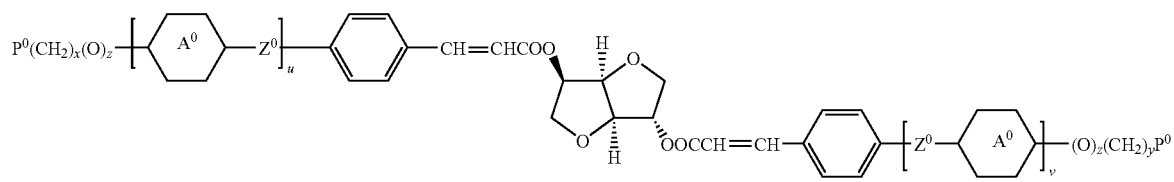
(CR6)

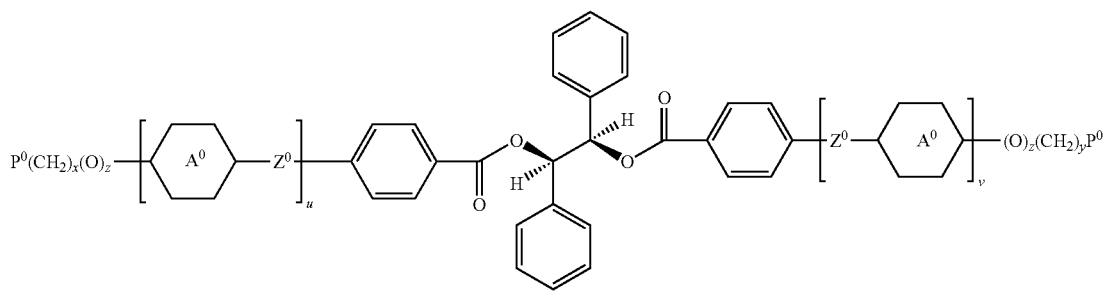
(CR7)

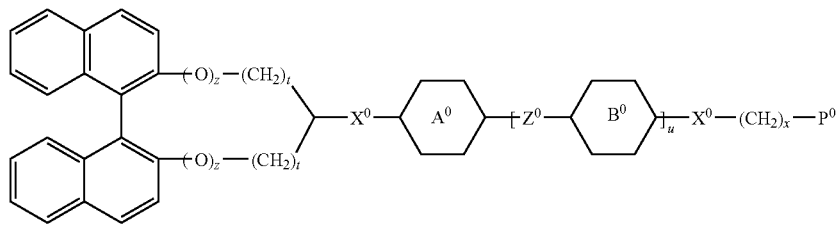
(CR8)

wherein

P⁰ is, in case of multiple occurrence independently of one another, a polymerisable group, preferably an acryl, methacryl, oxetane, epoxy, vinyl, vinyloxy, propenyl ether or styrene group, A⁰ and B⁰ are, in case of multiple occurrence independently of one another, 1,4-phenylene that is optionally substituted with 1, 2, 3 or 4 groups L, or trans-1,4-cyclohexylene, Z⁰ is, in case of multiple occurrence independently of one another, —COO—, —OCO—, —CH₂CH₂—, —C≡C—, —CH=CH—, —CH=CH—COO—, —OCO—CH=CH— or a single bond, R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is Y⁰ or P—(CH₂)$_y$—(O)$_z$—, Y⁰ is F, Cl, CN, NO₂, OCH₃, OCN, SCN, SF₅, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, $R^{O1,O2}$ are independently of each other H, $R^O$ or $Y^O$, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, t is, in case of multiple occurrence independently of one another, 0, 1, 2 or 3, u and v are independently of each other 0, 1 or 2, and wherein the benzene and napthalene rings can additionally be substituted with one or more identical or different groups L.

Especially preferably the polymerisable LC host material contains only achiral compounds and no chiral compounds.

Further preferably the polymerisable LC host material comprises one or more compounds selected from formula MR3, MR4, MR7, MR8, MR9, MR10, MR18, DR6, DR7 and DR8, furthermore DR1 and DR5.

Further preferably the polymerisable LC host material comprises one or more compounds selected from the following formulae:

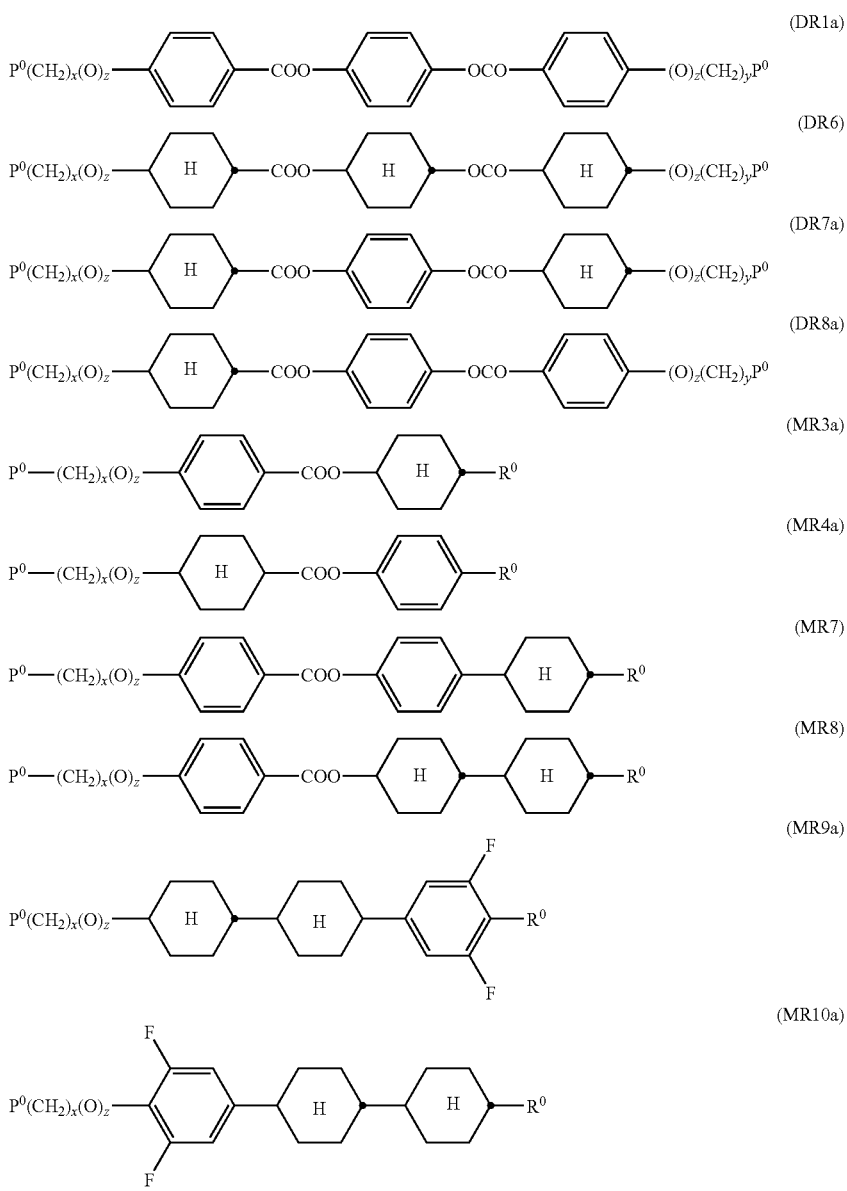

w is 0 or 1, x and y are independently of each other 0 or identical or different integers from 1 to 12, z is 0 or 1, with z being 0 if the adjacent x or y is 0, wherein $P^O$, $R^O$, x, y, and z are as defined above.

Further preferably the polymerisable LC host material comprises one or more compounds selected from the following formulae:

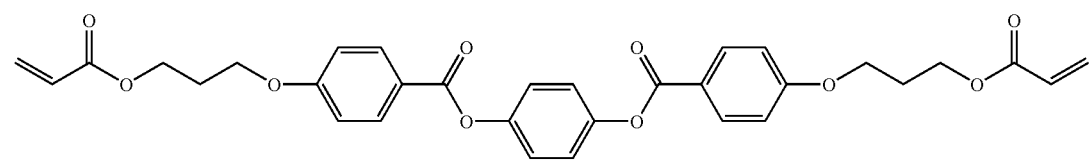
(DR1a1)
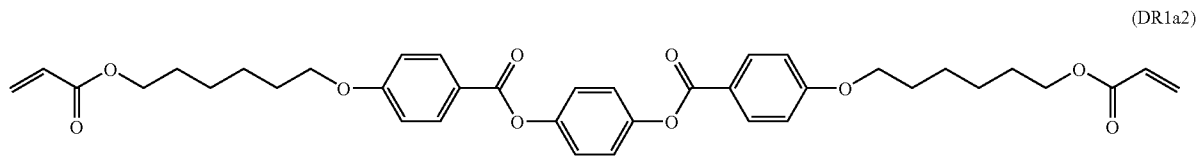
(DR1a2)
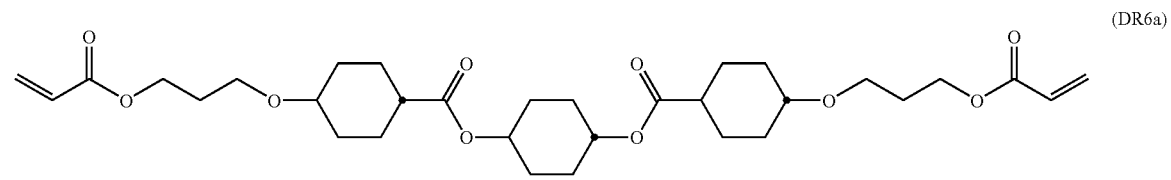
(DR6a)
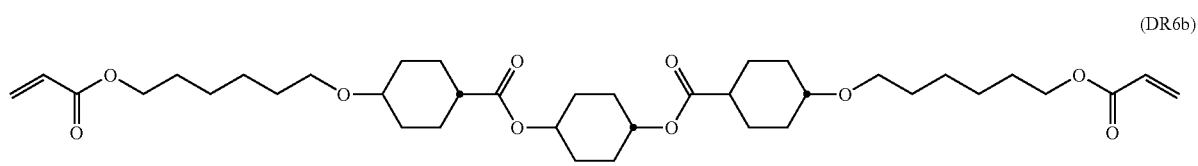
(DR6b)
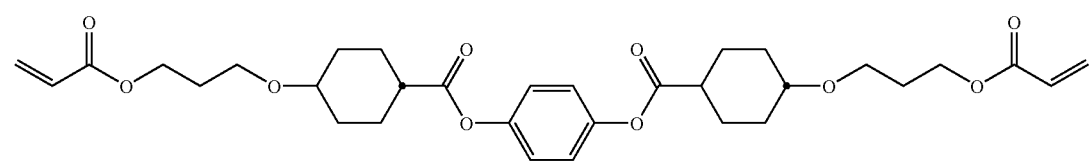
(DR7a1)
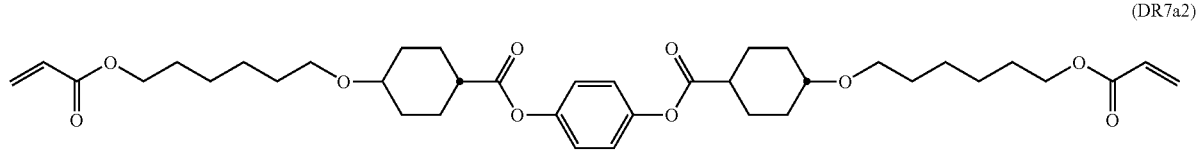
(DR7a2)
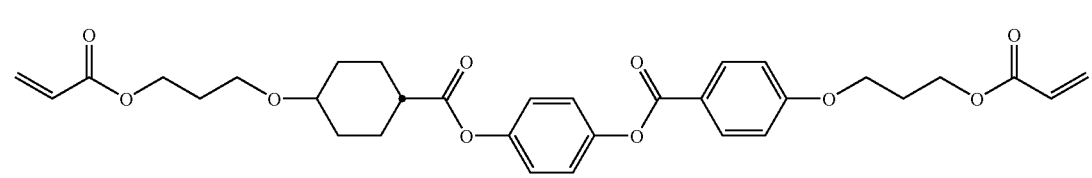
(DR8a1)
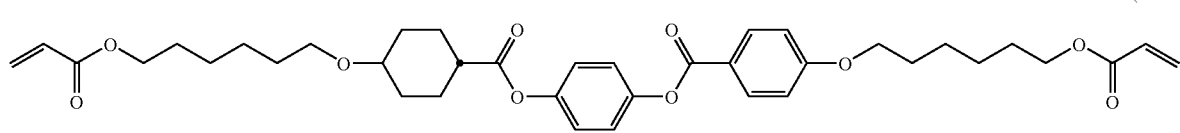
(DR8a2)
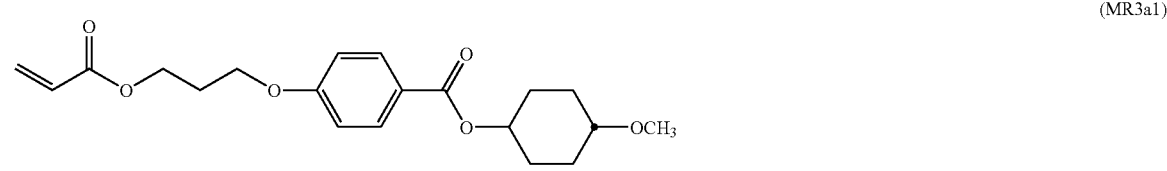
(MR3a1)

-continued
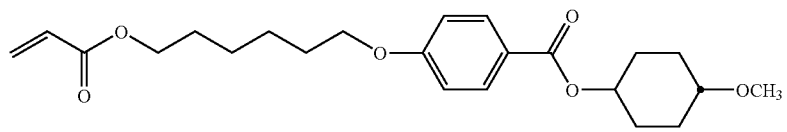
(MR3a2)
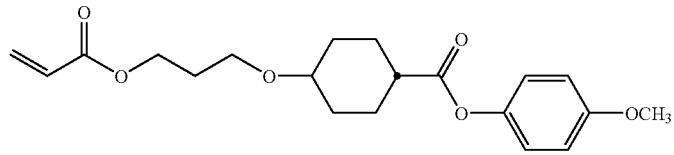
(MR4a1)
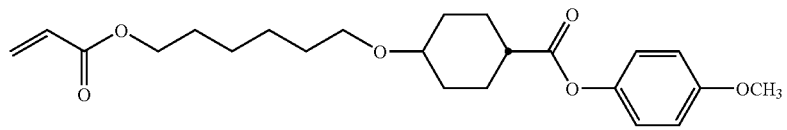
(MR4a2)
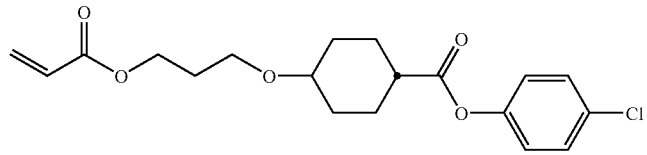
(MR4a3)
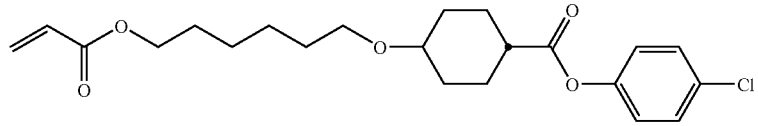
(MR4a4)
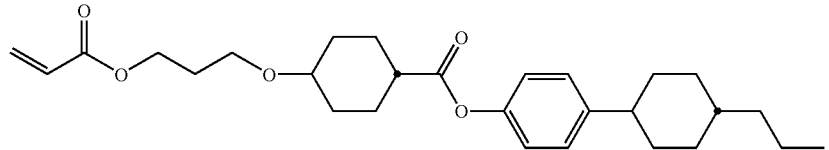
(MR7a)
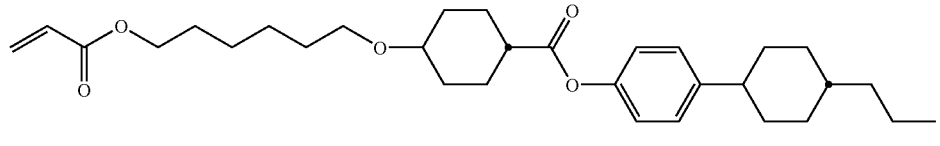
(MR7b)
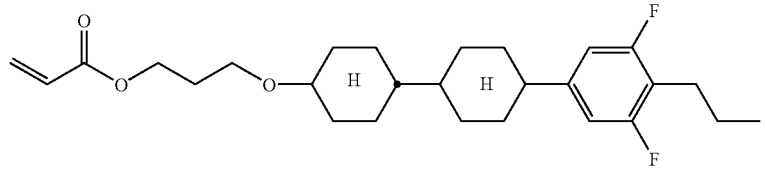
(MR9a1)
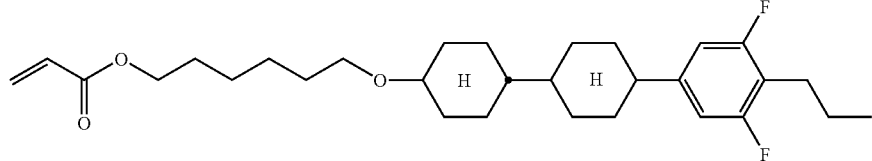
(MR9a2)
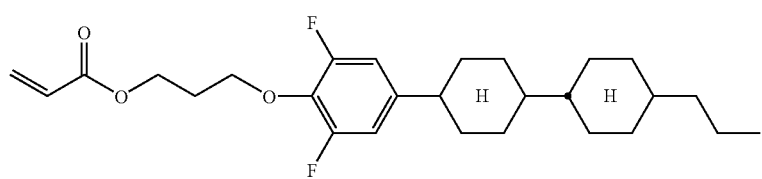
(MR10a1)

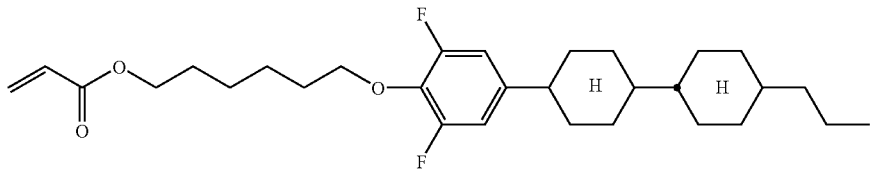

(MR10a2)

Preferably the polymerisable compounds of the polymerisable LC host materials are selected from compounds, very preferably mono- or direactive RMs, having low birefringence.

Especially preferred is a polymerisable host material having an absolute value of the birefringence from 0.01 to 0.2, very preferably from 0.04 to 0.16.

The formation of a birefringent layer from an LC medium as described above can be achieved by standard methods that are known to the person skilled in the art.

For example, in case of a non-polymerisable LC medium, a birefringent layer can be prepared by providing the LC medium in a cell formed by two plane parallel substrates, the surfaces of which are optionally treated by suitable methods to induce a desired orientation direction of the LC molecules. Suitable substrates and alignment methods are described below. Conventional LC display cells can also be used for this purpose.

In case of a polymerisable LC medium, a birefringent layer is preferably prepared by applying the LC medium on a substrate or between two substrates, and polymerising the medium in its LC phase in an oriented state to form a polymer film.

The general preparation of polymer LC films according to this invention is known to the ordinary expert and described in the literature, for example in D. J. Broer; G. Challa; G. N. Mol, *Macromol. Chem.*, 1991, 192, 59. Typically a polymerisable LC material is coated or otherwise applied onto a substrate where it aligns into uniform orientation, and polymerised in situ in its LC phase at a selected temperature for example by exposure to heat or actinic radiation, preferably by photo-polymerisation, very preferably by UV-photopolymerisation, to fix the alignment of the LC molecules. If necessary, uniform alignment can promoted by additional means like shearing or annealing the LC material, surface treatment of the substrate, or adding surfactants to the LC material.

As substrate for example glass or quartz sheets or plastic films can be used. It is also possible to put a second substrate on top of the coated material prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerised film after polymerisation, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

The polymerisable material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerisable material in a suitable solvent. This solution is then coated or printed onto the substrate, for example by spin-coating or printing or other known techniques, and the solvent is evaporated off before polymerisation. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents.

Initial alignment (e.g. planar alignment) of the polymerisable LC material can be achieved for example by rubbing treatment of the substrate, by shearing the material during or after coating, by annealing the material before polymerisation, by application of an alignment layer, by applying a magnetic or electric field to the coated material, or by the addition of surface-active compounds to the material. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Especially preferred is a polymerisable material comprising one or more surfactants that promote a specific surface alignment of the LC molecules. Suitable surfactants are described for example in J. Cognard, Mol. Cryst. Liq. Cryst. 78, Supplement 1, 1-77 (1981). Preferred aligning agents for planar alignment are for example non-ionic surfactants, preferably fluorocarbon surfactants such as the commercially available Fluorad FC-171® (from 3M Co.) or Zonyl FSN® (from DuPont), multiblock surfactants as described in GB 2 383 040 or polymerisable surfactants as described in EP 1 256 617.

It is also possible to apply an alignment layer onto the substrate and provide the polymerisable material onto this alignment layer. Suitable alignment layers are known in the art, like for example rubbed polyimide or alignment layers prepared by photoalignment as described in U.S. Pat. No. 5,602,661, U.S. Pat. No. 5,389,698 or U.S. Pat. No. 6,717,644.

It is also possible to induce or improve alignment by annealing the polymerisable LC material at elevated temperature, preferably at its polymerisation temperature, prior to polymerisation.

Polymerisation is achieved for example by exposing the polymerisable material to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

Polymerisation is preferably carried out in the presence of an initiator absorbing at the wavelength of the actinic radiation. For this purpose the polymerisable LC material preferably comprises one or more initiators, preferably in a concentration from 0.01 to 10%, very preferably from 0.05 to 5%. For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure® (Ciba Geigy AG, Basel, Switzerland). A typical cationic photoinitiator is for example UVI 6974 (Union Carbide).

The polymerisable material may also comprise one or more stabilizers or inhibitors to prevent undesired spontaneous polymerisation, like for example the commercially available Irganox® (Ciba Geigy AG, Basel, Switzerland).

The curing time depends, inter alia, on the reactivity of the polymerisable material, the thickness of the coated layer, the type of polymerisation initiator and the power of the UV lamp. The curing time is preferably $\leq 5$ minutes, very preferably $\leq 3$ minutes, most preferably $\leq 1$ minute. For mass production short curing times of $\leq 30$ seconds are preferred.

Preferably polymerisation is carried out in an inert gas atmosphere like nitrogen or argon.

The polymerisable material may also comprise one or more dyes having an absorption maximum adjusted to the wavelength of the radiation used for polymerisation, in particular UV dyes like e.g. 4,4"-azoxy anisole or Tinuvin® dyes (from Ciba AG, Basel, Switzerland).

In another preferred embodiment the polymerisable material comprises one or more monoreactive polymerisable non-mesogenic compounds, preferably in an amount of 0 to 50%, very preferably 0 to 20%. Typical examples are alkylacrylates or alkylmethacrylates.

In another preferred embodiment the polymerisable material comprises one or more di- or multireactive polymerisable non-mesogenic compounds, preferably in an amount of 0 to 50%, very preferably 0 to 20%, alternatively or in addition to the di- or multireactive polymerisable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

It is also possible to add one or more chain transfer agents to the polymerisable material in order to modify the physical properties of the polymer film. Especially preferred are thiol compounds, for example monofunctional thiols like dodecane thiol or multifunctional thiols like trimethylpropane tri (3-mercaptopropionate). Very preferred are mesogenic or LC thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerisable material may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerisable material does not contain a binder or dispersion auxiliary.

The polymerisable material can additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

The thickness of a birefringent layer according to the present invention is preferably from 0.3 to 5 microns, very preferably from 0.5 to 3 microns, most preferably from 0.7 to 1.5 microns. For use as alignment layer, thin layers with a thickness of 0.05 to 1, preferably 0.1 to 0.4 microns are preferred.

The birefringent layer of the present invention can be used as retardation or compensation film for example in LCDs to improve the contrast and brightness at large viewing angles and reduce the chromaticity. It can be used outside the switchable LC cell of the LCD or between the substrates, usually glass substrates, forming the switchable LC cell and containing the switchable LC medium (incell application).

The birefringent layer of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned), PVA (patterned vertically aligned) or PSVA (polymer stabilised vertically aligned) mode; displays with bend or hybrid alignment like the OCB (optically compensated bend cell or optically compensated birefringence), R-OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The layers, films and materials of the present invention can be used for various types of optical films, preferably selected from optically uniaxial films (A-plate, C-plate, negative C-plate, O-plate), twisted optical retarders, like for example twisted quarter wave foils (QWF), and optically biaxial films. The LC phase structure in the layers and materials can be selected from cholesteric, smectic, nematic and blue phases. The alignment of the LC material in the layer can be selected from homeotropic, splayed, tilted, planar and blue-phase alignment. The layers can be uniformly oriented or exhibit a pattern of different orientations.

The layers can be used as optical compensation film for viewing angle enhancement of LCD's or as a component in a brightness enhancement films, furthermore as an achromatic element in reflective or transflective LCD's. Further preferred applications and devices include retarding components in optoelectronic devices requiring similar phase shift at multiple wavelengths, such as combined CD/DVD/HD-DVD/Blu-Ray, including reading, writing re-writing data storage systems achromatic retarders for optical devices such as cameras achromatic retarders for displays including OLED and LCD's.

The following examples are intended to explain the invention without restricting it. The methods, structures and properties described hereinafter can also be applied or transferred to materials that are claimed in this invention but not explicitly described in the foregoing specification or in the examples.

Above and below, percentages are percent by weight. All temperatures are given in degrees Celsius. m.p. denotes melting point, cl.p. denotes clearing point, $T_g$ denotes glass transition temperature. Furthermore, C=crystalline state, N=nematic phase, S=smectic phase and I=isotropic phase. The data between these symbols represent the transition temperatures. $\Delta n$ denotes the optical anisotropy ($\Delta n = n_e - n_o$, where $n_o$ denotes the refractive index parallel to the longitudinal molecular axes and $n_e$ denotes the refractive index perpendicular thereto), measured at 589 nm and 20° C. The optical and electrooptical data are measured at 20° C., unless expressly stated otherwise.

Unless stated otherwise, the percentages of components of a polymerisable mixture as given above and below refer to the total amount of solids in the mixture polymerisable mixture, i.e. not including solvents.

Example 1

Film Prepared from a Non-Polymerisable Negative Dispersion Component and a Non-Polymerisable Host

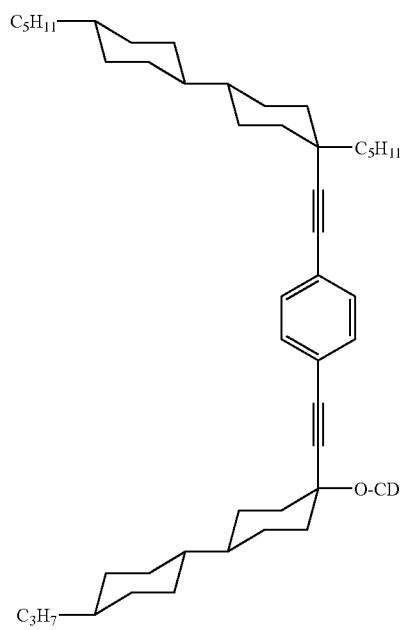

(1)

0.21 g of compound (I) are dissolved in 0.799 g of the commercially available nematic LC mixture ZLI4792 (Merck KGaA, Darmstadt, Germany) by gently heating the mixture using a water bath until the mixture becomes homogeneous. A 2.2 μm thick, planar aligned, parallel rubbed test cell is filled with the above mixture. The cell is viewed between crossed polarisers to ensure that the cell is filled and the apparent retardation is uniform. A polarising microscope is used to check that no crystallisation has occurred. The optical properties of the cell are measured using an ellipsometer (M2000 spectroscopic ellipsometer).

Several other mixtures are prepared using the above method. The compositions (in wt. %) are shown in table 1.

TABLE 1

| Component | Mix. 1 | Mix. 2 | Mix. 3 | Mix. 4 | Mix. 5 |
|---|---|---|---|---|---|
| ZLI4792 | 100 | 79.9 | 62.6 | 50.0 | 39.8 |
| (1) | 0 | 20.1 | 37.4 | 50.0 | 60.2 |

Figure 5:
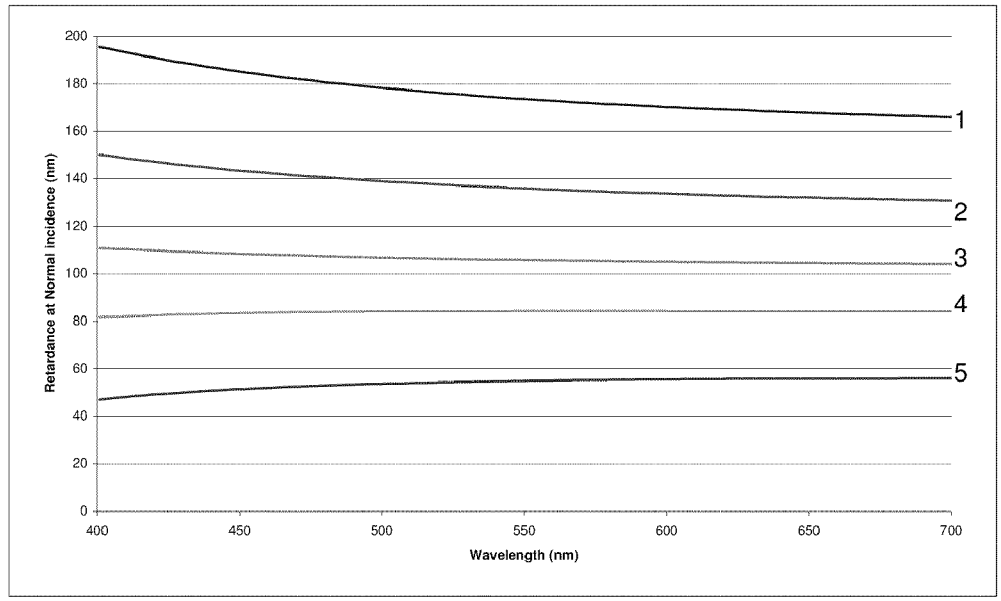
FIG. 5 shows the optical retardation versus wavelength plot of a film according to example 1 of the present invention.

The optical properties of the films, the optical retardation dispersion ($R_{450}/R_{550}$) and the retardation at 550 nm ($R_{550}$), in the test cells are shown in table 2 and FIG. 5. Therein, lines 1-5 represent the on-axis retardation (ie at 0 degrees viewing angle) of the films 1-5, respectively.

TABLE 2

| | Film 1 | Film 2 | Film 3 | Film 4 | Film 5 |
|---|---|---|---|---|---|
| $R_{450}/R_{550}$ | 1.067 | 1.055 | 1.025 | 0.99 | 0.94 |
| $R_{550}$ (nm) | 172 | 135 | 108 | 85 | 53 |

It can be seen in FIG. 5 that the on-axis retardation of the films at 550 nm ($R_{550}$) decreases with increasing concentration of (1). It can also be seen that the optical dispersion ($R_{450}/R_{550}$) also decreases with increasing concentration of (1).

Examples 2-6

Films Prepared from a Non-Polymerisable Negative Dispersion Component and a Polymerisable Host Example 2

A polymerisable LC mixture containing the components listed in table 3 (in wt. %) is prepared by gently heating the mixture using a water bath until the mixture becomes homogeneous.

TABLE 3

| Component | Mix. 6 | Mix. 7 | Mix. 8 |
|---|---|---|---|
| (1) | 0 | 19.82 | 59.59 |
| Irg 651 | 1.74 | 1.04 | 0.48 |
| Irg 1076 | 0.24 | 0.16 | 0.04 |
| RM (1) | 14.23 | 11.29 | 5.89 |
| RM (2) | 35.61 | 28.80 | 14.44 |
| RM (3) | 48.18 | 38.89 | 19.57 |

RM (1)
(K 70.7 N 125.6 I)

RM (2)
(K 40.8 N 139.4 I)

RM (3)
(K 35.16 N 109.7 I)

Irgacure® 651 and Irgacure® 1076 are commercially available photoinitiators (Ciba AG, Basel, Switzerland).

RM (1) helps to stabilise the mixture by crosslinking the host matrix. RM's (2) and (3) have low birefringence (~0.06), and contain cyclohexane groups that help to dissolve the negative dispersion additive (1).

A 2.2 µm thick, planar aligned, parallel rubbed test cell is filled with the above mixture. The cell is viewed between crossed polarisers to ensure that the cell is filled and the apparent retardation is uniform. A polarising microscope is used to check that no crystallisation had occurred. The optical properties of the cell are measured using an ellipsometer (M2000 spectroscopic ellipsometer). The film is then exposed to UV irradiation (Medium pressure Hg lamp, 50 mW/cm² for 60 s) Several other mixtures are prepared using the above method. The compositions are shown in table 3. The optical properties of the films are shown in table 4 and in FIG. 6. Therein, lines 6, 7 and 8 represent the on-axis retardation of the films 6, 7 and 8, respectively, before polymerisation (continuous line) and after polymerisation (dotted line).

TABLE 4

| | Film 6 | Film 7 | Film 8 |
|---|---|---|---|
| R(450)/R(550) before cure | 1.067 | 1.034 | 0.973 |
| R(450)/R(550) after cure | 1.063 | 1.032 | 0.968 |
| R(0) at 550 nm before cure | 166.7 | 110.9 | 77.1 |

TABLE 4-continued

| | Film 6 | Film 7 | Film 8 |
|---|---|---|---|
| Δn before cure | 0.0758 | 0.0504 | 0.0350 |
| R(0) at 550 nm after cure | 161.0 | 105.0 | 64.6 |
| Δn after cure | 0.0732 | 0.0477 | 0.0294 |

Figure 6:
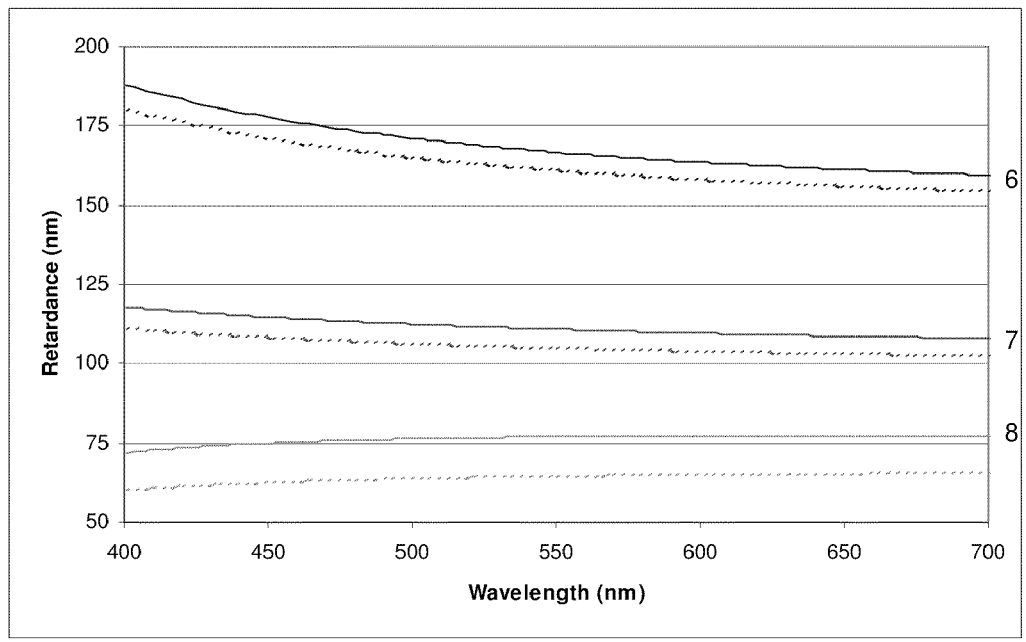
FIG. 6 shows the optical retardation versus wavelength plot of a film according to example 2 of the present invention.

It can be seen in FIG. 6 that the on-axis retardation decreases with increasing concentration of (1). It can also be seen that the dispersion curves also decrease with increasing concentration of (1). In addition, the polymerisation has an effect on the optical properties. The on-axis retardation decreases slightly after polymerisation. However, it is noteworthy that the dispersion curves do not seem to significantly change after polymerisation.

Figure 7:
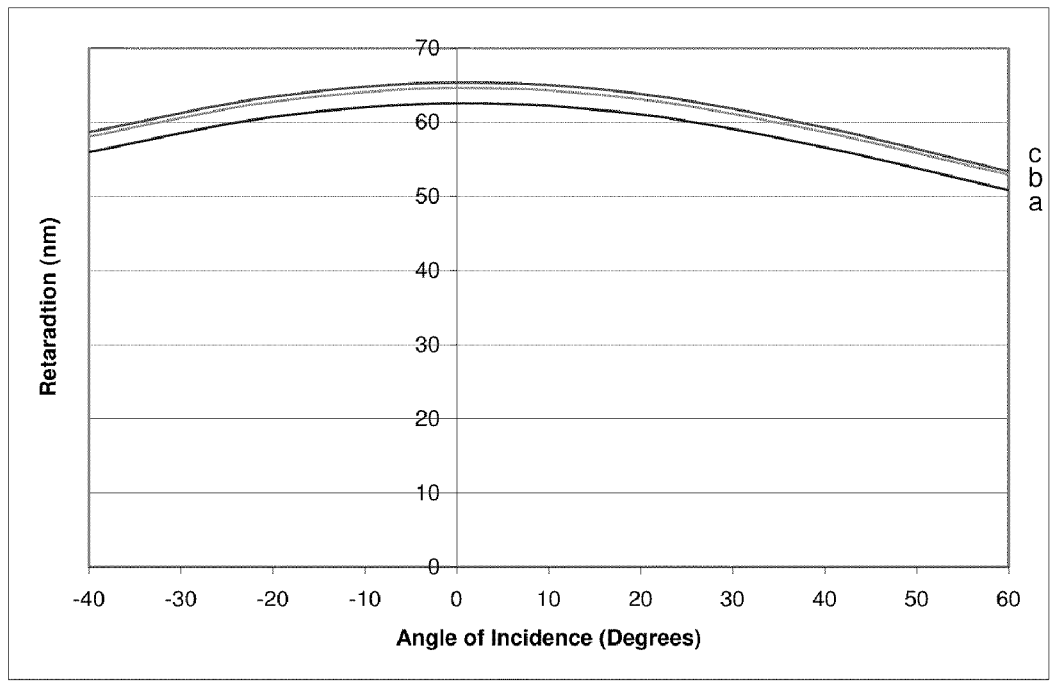
FIG. 7 shows the optical retardation versus viewing angle plot of a film according to example 2 of the present invention.

The retardation profiles of film 8 are shown in FIG. 7, and indicate that the film has the characteristics of an A plate. Therein, line (a) is the retardation of the film at 451.6 nm, line (b) the retardation at 550 nm and line (c) the retardation at 652 nm. It should be noted that the retardation at 550 nm is higher than at 451.6 nm, thus demonstrating the retardation dispersion is negative.

Example 3

Mixture 8 of example 2 is used to fill a test cell with hybrid alignment (LC cell having rubbed PI that orients LC's to give planar alignment on one side of the cell and PI that gives homeotropic alignment on the other side). The optical properties of the cell are measured at ambient temperature using an ellipsometer (M2000 spectroscopic ellipsometer). The film is then exposed to UV irradiation (Medium pressure Hg lamp, 50 mW/cm² for 60s). The optical properties of the films are then remeasured.

Figure 8:
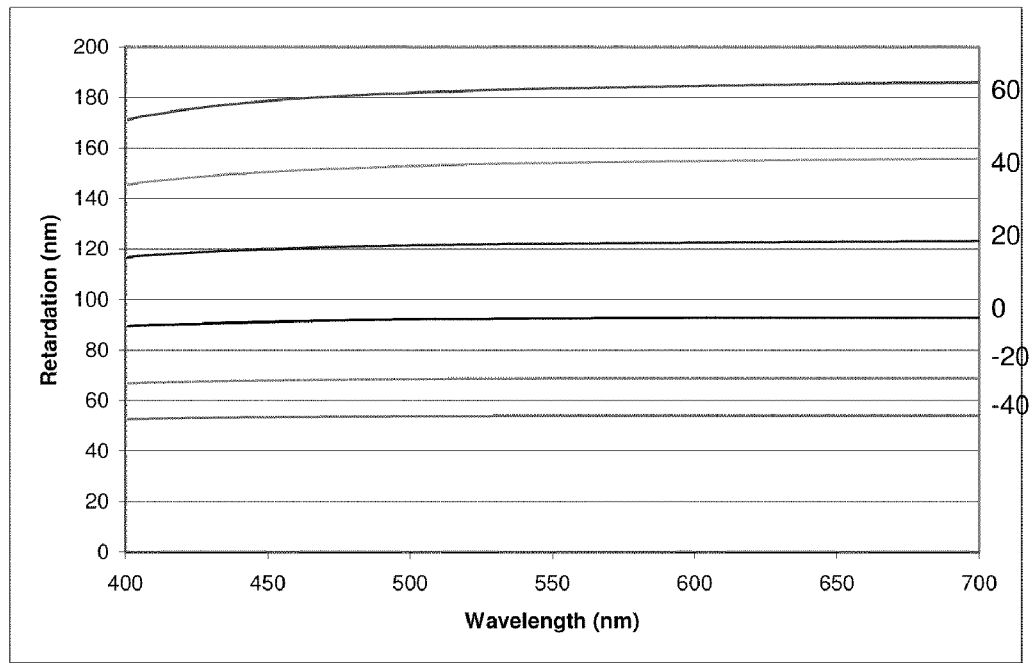
FIG. 8 shows the optical retardation versus wavelength plot of a film according to example 3 of the present invention before polymerisation.

The retardation versus wavelength of the film before polymerisation is shown in Table 5 and FIG. 8 for viewing angles of +60, +40, +20, 0, −20 and −40 degrees, respectively.

TABLE 5

| view. angle | 60 | 40 | 20 | 0 | −20 | −40 |
|---|---|---|---|---|---|---|
| R450/R550 | 0.973 | 0.977 | 0.982 | 0.984 | 0.989 | 0.991 |

Figure 9:
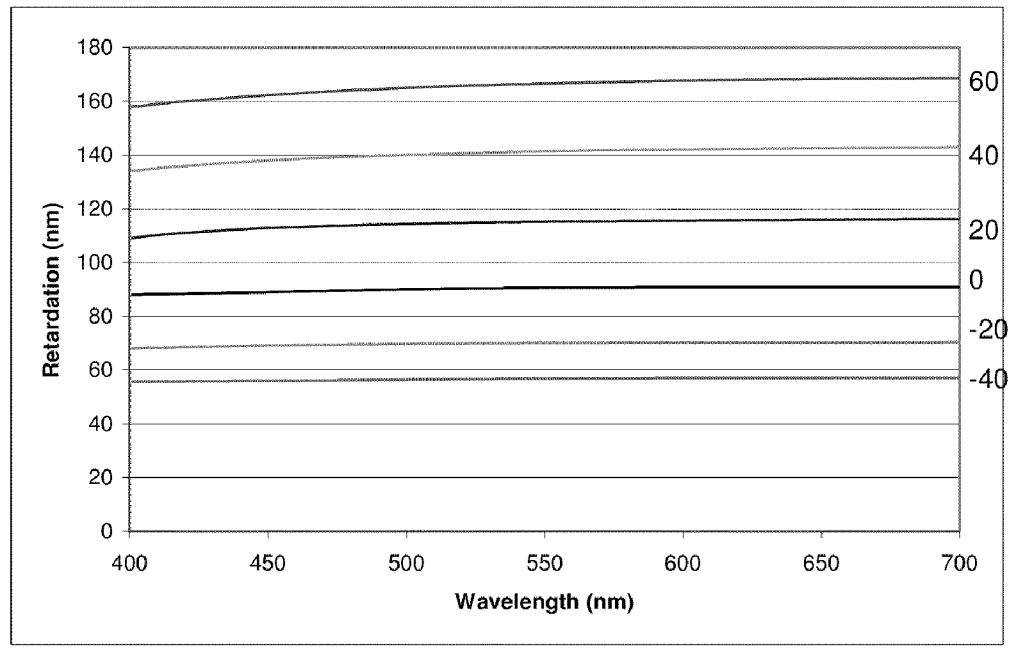
FIG. 9 shows the optical retardation versus wavelength plot of a film according to example 3 of the present invention after polymerisation.

The retardation versus wavelength and the optical dispersion R450/R550 of the film after polymerisation are shown in Table 6 and FIG. 9 for viewing angles of +60, +40, +20, 0, −20 and −40 degrees, respectively.

TABLE 6

| view. angle | 60 | 40 | 20 | 0 | −20 | −40 |
|---|---|---|---|---|---|---|
| R450/R550 | 0.974 | 0.976 | 0.980 | 0.982 | 0.987 | 0.985 |

Figure 10:
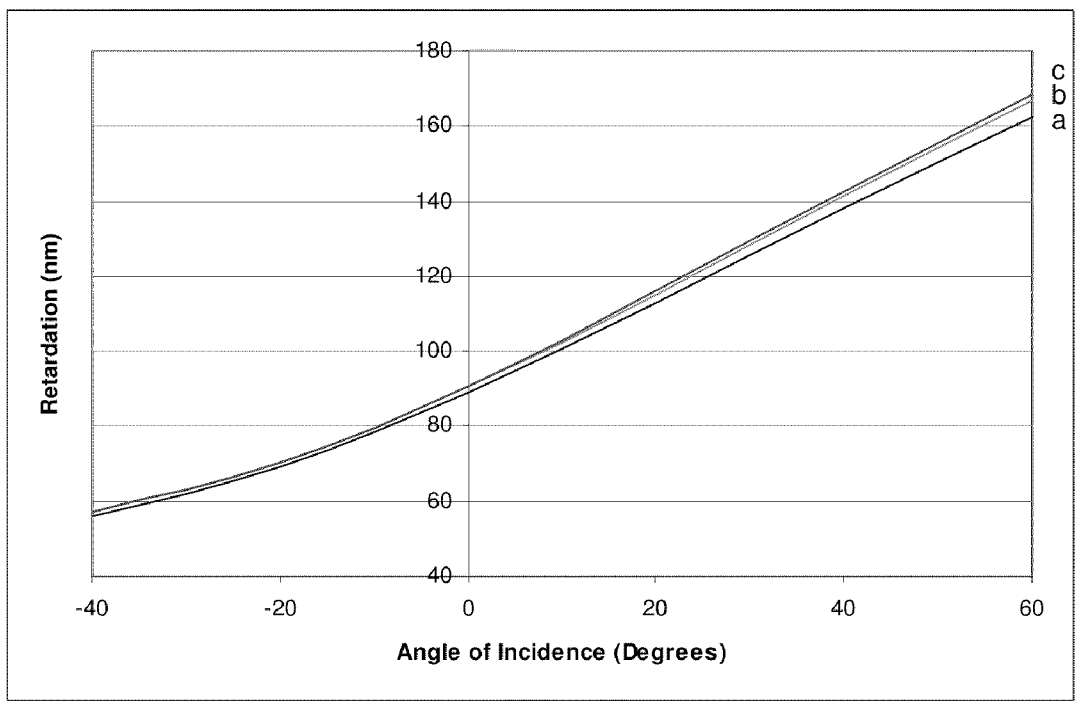
FIG. 10 shows the optical retardation versus viewing angle plot of a film according to example 3 of the present invention after polymerisation.

The retardation profile of this film is shown in FIG. 10 and indicates that the film has the characteristic of an O-plate. Therein, line (a) is the profile of the film at 451.6 nm, line (b) at 550 nm and line (c) at 652 nm. It can be seen that the on-axis retardation is slightly higher for this film when measured at 550.2 nm compared to that measured at 451.6 nm. This is further evidence that the film has negative dispersion.

Example 4

Mixture 8 of example 2 is used to fill a test cell in which both sides of the cell have been treated with an alignment layer (polyimide) that gives homeotropic alignment. The optical properties of the cell are measured at ambient temperature using an ellipsometer (M2000 spectroscopic ellipsometer). The film is then exposed to UV irradiation (Medium pressure Hg lamp, 50 mW/cm² for 60 s). The optical properties of the films are then remeasured.

Figure 11:
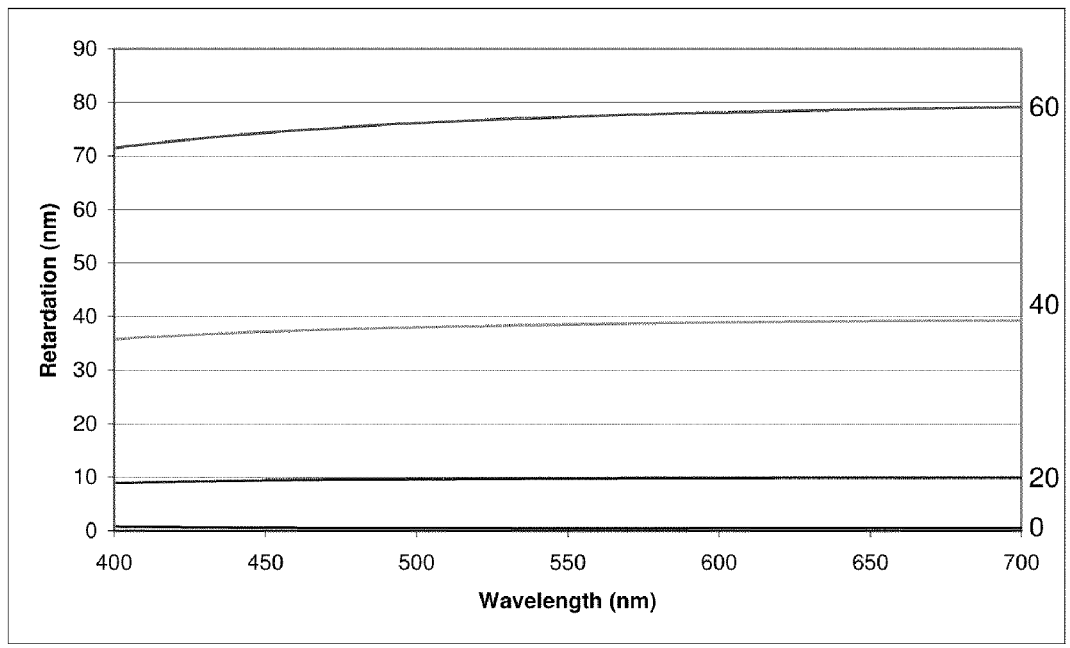
FIG. 11 shows the optical retardation versus wavelength plot of a film according to example 4 of the present invention before polymerisation.

The retardation versus wavelength and the optical dispersion R450/R550 of the film before polymerisation is shown in Table 7 and FIG. 11 for viewing angles of +60, +40, +20 and 0 degrees, respectively.

TABLE 7

| | view. angle | | | |
|---|---|---|---|---|
| | 60 | 40 | 20 | 0 |
| R450/R550 | 0.961 | 0.964 | 0.959 | 1.191 |

Figure 12:
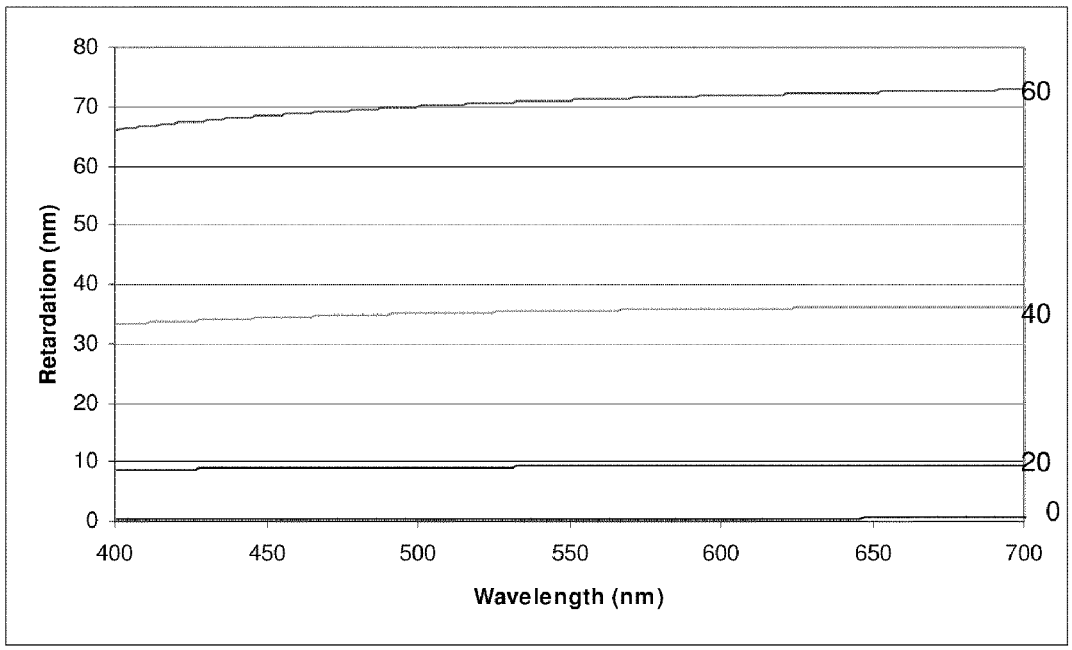
FIG. 12 shows the optical retardation versus wavelength plot of a film according to example 4 of the present invention after polymerisation.

The retardation versus wavelength and the optical dispersion R450/R550 of the film after polymerisation are shown in Table 8 and FIG. 12 for viewing angles of +60, +40, +20 and 0 degrees, respectively.

TABLE 8

| | view. angle | | | |
|---|---|---|---|---|
| | 60 | 40 | 20 | 0 |
| R450/R550 | 0.963 | 0.967 | 0.969 | 0.968 |

Figure 13:
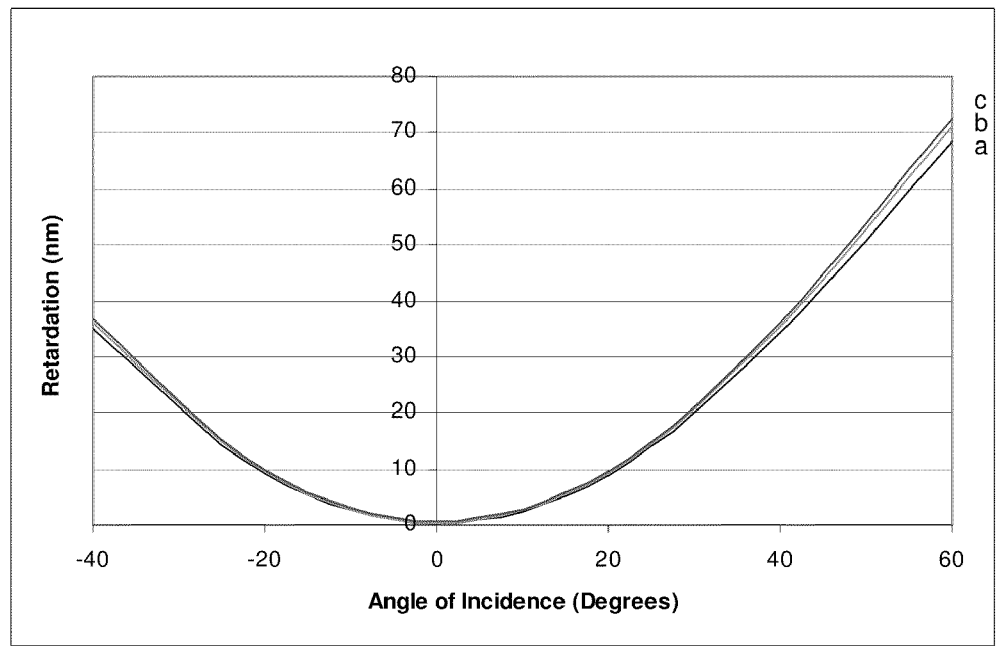
FIG. 13 shows the optical retardation versus viewing angle plot of a film according to example 4 of the present invention after polymerisation.

The retardation profile of the film is shown in FIG. 13. The plot shows the typical retardation profile for a positive C film with the on-axis retardation being zero whilst the off-axis retardation increases with increasing thickness. Therein, line (a) is the profile of the film at 451.6 nm, line (b) at 550 nm and line (c) at 652 nm. At an angle of incidence of 600, the retardation at 550.2 nm is less than that observed at 451.6 nm, thus showing that the retardation dispersion is negative.

Example 5

Mixture 9 with the composition shown in table 9 (in wt. %) is dissolved in a solvent (30 wt % solids in toluene/cyclohexanone 7:3). The solution is spin coated at 3000 rpm onto rubbed Pl glass. The film is then exposed to UV irradiation (Medium pressure Hg lamp, 200 mW/cm² at room temperature for 60 s). The optical properties of the film are measured at ambient temperature using an ellipsometer (M2000 spectroscopic ellipsometer).

TABLE 9

| Component | Mixture 9 |
|---|---|
| (1) | 49.64 |
| Irg651 | 1.31 |
| Irg1076 | 0.16 |
| RM (1) | 6.97 |
| RM (2) | 17.83 |
| RM (3) | 24.09 |

Figure 14:
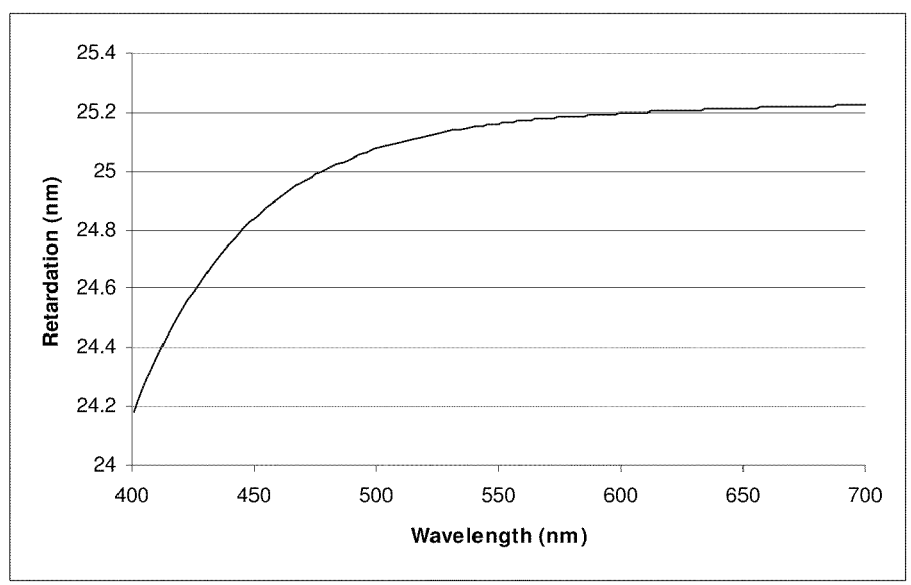
FIG. 14 shows the optical retardation versus wavelength plot of a film according to example 5 of the present invention.

The on-axis retardation versus wavelength of the film after polymerisation is shown in FIG. 14. The on-axis optical dispersion R450/R550 of the film is 0.987.

Figure 15:
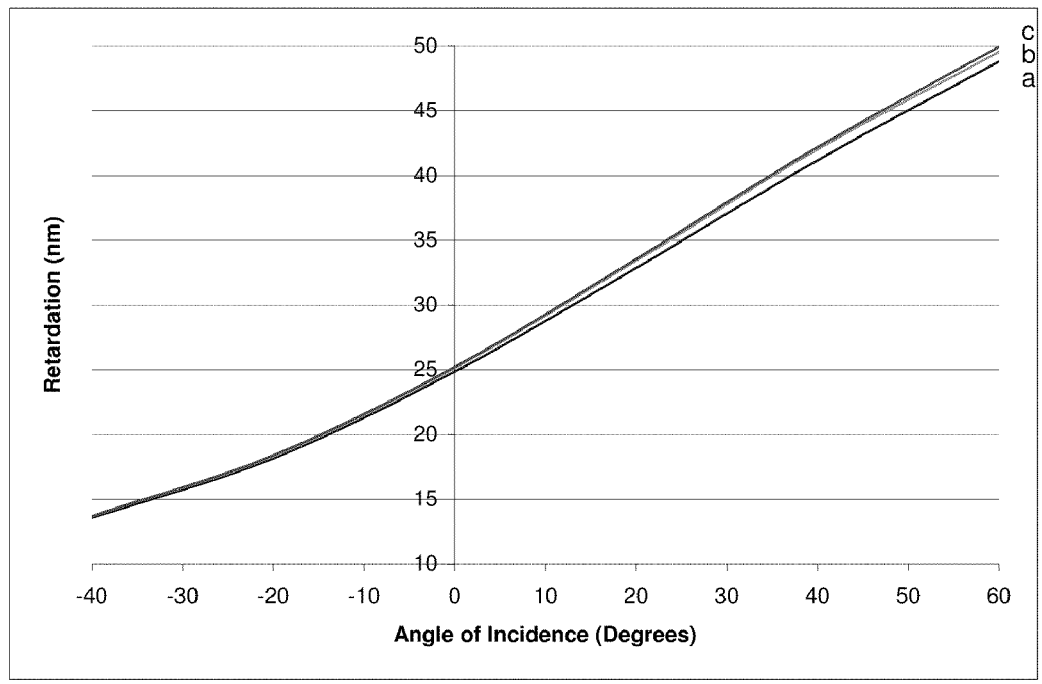
FIG. 15 shows the optical retardation versus viewing angle plot of a film according to example 5 of the present invention.

The retardation profile of the film is shown in FIG. 15. The retardation profile indicates that the film has the characteristics of an O-plate.

Example 6

Mixture 9 of example 5 is spin coated at 2000 rpm onto clean unrubbed glass (i.e. no alignment layer). The film is then exposed to UV irradiation (Medium pressure Hg lamp, 200 mW/cm² at room temperature for 60 s). The optical properties of the film are measured at ambient temperature using an ellipsometer (M2000 spectroscopic ellipsometer).

Figure 16:
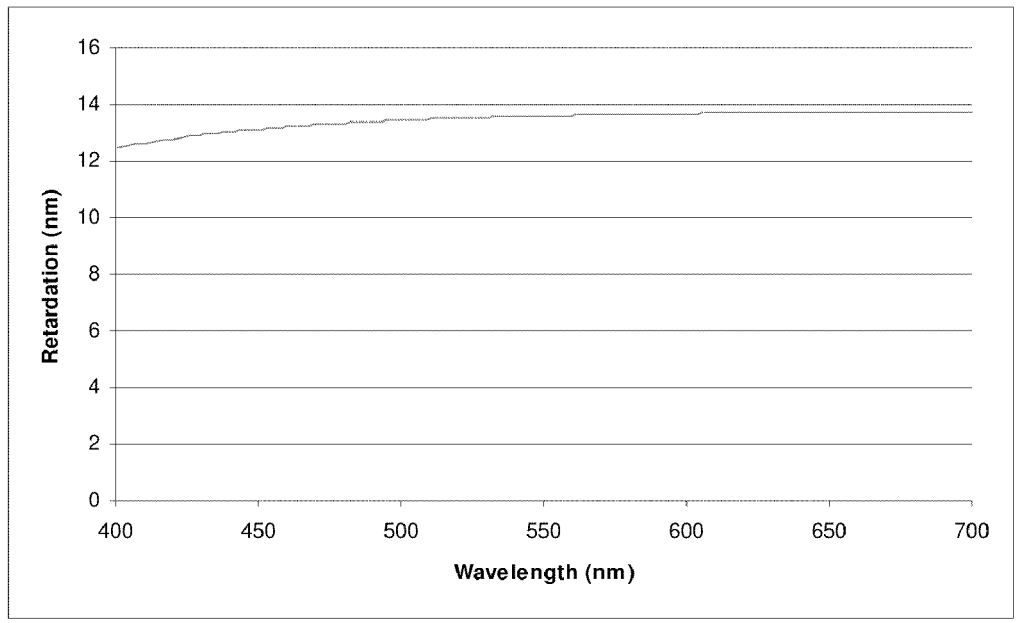
FIG. 16 shows the optical retardation versus wavelength plot of a film according to example 6 of the present invention.

The retardation at 40 degrees viewing angle versus wavelength of the film after polymerisation is shown in FIG. 16.

Figure 17:
FIG. 17 shows the optical retardation versus viewing angle plot of a film according to example 6 of the present invention.

The retardation profile of the film is shown in FIG. 17. The retardation profile is similar to that of the film of example 4.

Example 7

Mixture 10 with the following composition is prepared

Component 2

| Component | Mixture 9 |
|---|---|
| (2) | 19.86 |
| Irg651 | 1.11 |
| Irg1076 | 0.04 |
| RM (1) | 11.40 |
| RM (2) | 28.79 |
| RM (3) | 38.80 |

Figure 18:
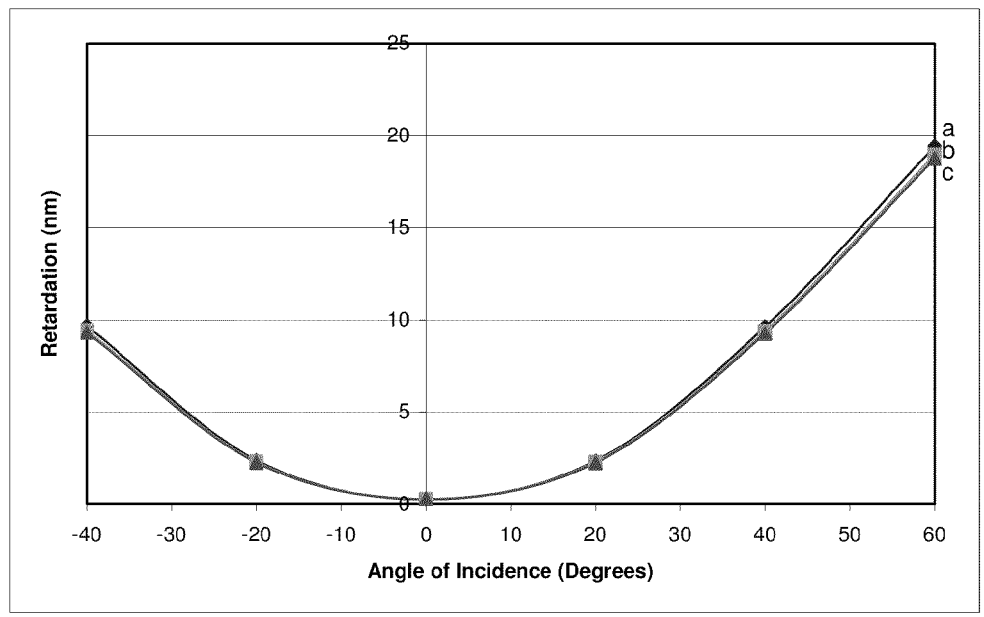
FIG. 18 shows the optical retardation versus viewing angle plot of a film according to example 7 of the present invention.

The above mixture is dissolved in a mixture of toluene and cyclohexanone (7:3 ratio) such that the solid content of the solution is 40 w/w % The solution is filtered through a 0.2 micron PTFE filter and a film is prepared on clean glass by spin coated at 3000 rpm. The film is annealed at 40° C. for 30 s. After annealing, the film is polymerised using the EFOS lamp (200 mW/cm2) 365 nm filter, under nitrogen at 40° C. for 60 s. The retardation of the polymerised film is measured using the Ellipsometer. It is found to have homeotropic orientation with the following retardation profile. By measuring the retardation at 450 nm and at 550 nm, it is found that the dispersion of the mixture at 400 is 1.027 which is significantly lower that the dispersion of the same mixture without compound 2 therefore demonstrating that compound 2 can reduce the dispersion of RM mixtures. The dispersion of the film prepared with mixture 10, but without the compound 2 is found to be 1.043. The retardation profile of the film is shown in FIG. 18. Therein, line (a) is the profile of the film at 451.6 nm, line (b) at 550 nm and line (c) at 652 nm.

The invention claimed is:

1. A birefringent layer with $R_{450}/R_{550}<1$, wherein $R_{450}$ is the optical on-axis retardation at a wavelength of 450 nm and $R_{550}$ is the optical on-axis retardation at a wavelength of 550 nm, said layer comprising an LC medium that comprises one or more non-polymerizable compounds of formula I as a guest component

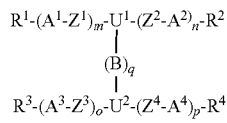

I wherein $U^1$ and $U^2$ are independently of each other selected from the group consisting of

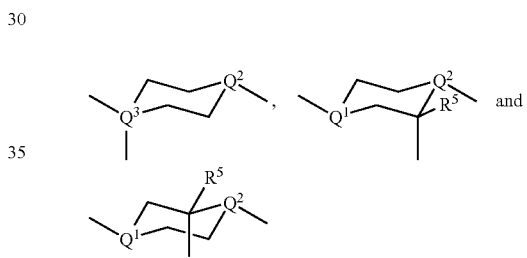

including their mirror images, wherein $U^1$ and $U^2$ are each bonded to the group —(B)$_q$— via an axial bond, and in which one or two non-adjacent ring $CH_2$ groups are optionally replaced by O and/or S, and $U^1$ and $U^2$ are optionally substituted by one or more groups L, L is, in case of multiple occurrence independently of one another, F, Cl, Br, I, —CN, —NO$_2$, —NCO, —NCS, —OCN, —SCN, —O(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, X is halogen, $Q^1$ and $Q^2$ are independently of each other CH or SiH, $Q^3$ is C or Si, B is in each occurrence independently of one another —C≡C—, —CY$^1$=CY$^2$— or an optionally substituted aromatic or heteroaromatic group, $Y^1$ and $Y^2$ are independently of each other H, F, Cl, CN or R$^0$, g is an integer from 1 to 10, $A^1$, $A^2$, $A^3$ and $A^4$ are independently of each other selected from the group consisting of non-aromatic carbocyclic groups, heterocyclic groups, aromatic groups and heteroaromatic groups, which are optionally substituted by one or more L, and wherein each of -(A$^1$-Z$^1$)$_m$—U$^1$—(Z$^2$-A$^2$)$_n$- and -(A$^3$-Z$^3$)$_o$—U$^2$—(Z$^4$-A$^4$)$_p$- does not contain more aromatic groups than non-aromatic groups,

Z$^1$, Z$^2$

Z$^3$ and Z$^4$ are independently of each other —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O— —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —)CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —CH=CH—COO—, —OCO—CH=CH—, CR$^0$R$^{00}$ or a single bond, R$^0$ and R$^{00}$ are independently of each other H or alkyl with 1 to 12 C-atoms, m and n are independently of each other 0, 1, 2, 3 or 4, o and p are independently of each other 0, 1, 2, 3 or 4, and R$^1$, R$^2$, R$^3$, R$^4$ and R$^5$ are independently of each other identical or different groups and are H, halogen, —CN, —NC, —NCO, —NCS, —OCN, —SCN, —C(=O)NR$^0$R$^{00}$, —C(=O)X$^0$—C(=O)R$^0$, —NH$_2$, —NR$^0$R$^{00}$, —SH, —SR$^0$, —SO$_3$H, —SO$_2$R$^0$, —OH, —NO$_2$, —CF$_3$—SF$_5$, optionally substituted silyl, or carbyl or hydrocarbyl with 1 to 40 C atoms that is optionally substituted and optionally comprises one or more hetero atoms, and wherein one or more H atoms are optionally replaced by D atoms, and further comprising one or more mesogenic or liquid crystalline compounds as a host component.

2. A birefringent layer according to claim 1, wherein —(B)q- in formula I is —C≡C—, —C≡C—C≡C—, —C≡C—C≡C—C≡C—, —C≡C—C≡C—C≡C—C≡C—,

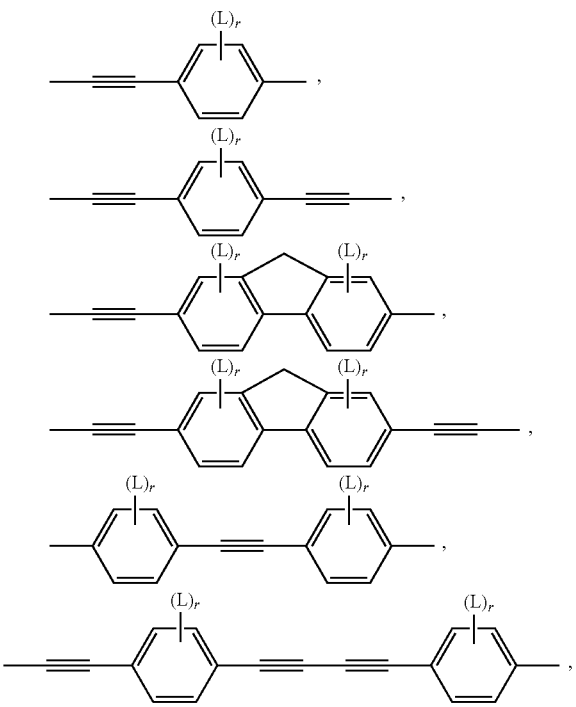

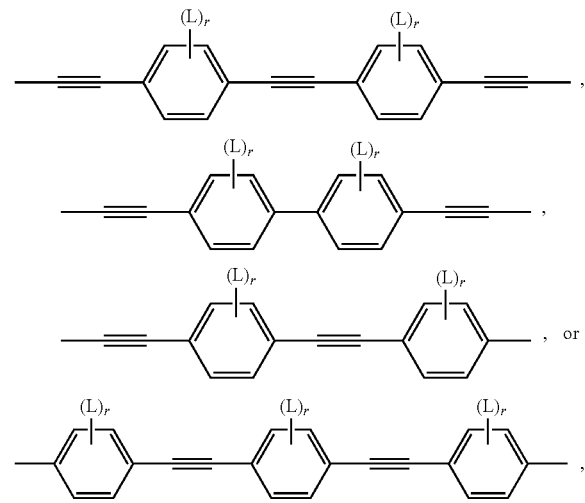

wherein r is 0, 1, 2, 3 or 4 and L is F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, wherein R$^0$ and R$^{00}$ are independently of each other H or alkyl with 1 to 12 C-atoms, and X is halogen.

3. A birefringent layer according to claim 1, wherein U$^1$ and U$^2$ in formula I are selected from the group consisting of

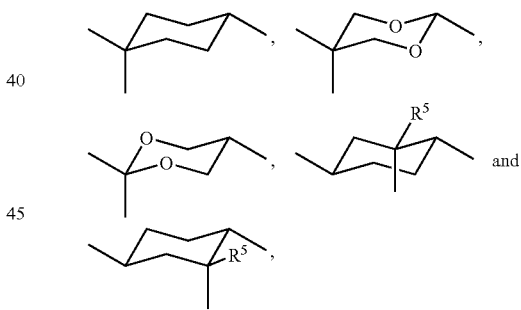

wherein R$^5$ is as defined for the compound of formula I.

4. A birefringent layer according to claim 1, wherein A$^{1-4}$ in formula I are selected from the group consisting of trans-1,4-cyclohexylene and 1,4-phenylene that is optionally substituted with one or more groups L.

5. A birefringent layer according to claim 1, wherein the groups (A$^1$-Z$^1$)$_m$—U$^1$—(Z$^2$-A$^2$)$_n$ and (A$^3$-Z$^3$)$_o$—U$^2$—(Z$^4$-A$^4$)$_p$ do not comprise more than one unsaturated or aromatic ring.

6. A birefringent layer according to claim 1, wherein Z$^{1-4}$ in formula I are selected from the group consisting of —COO—, —OCO— and a single bond.

7. A birefringent layer according to claim 1, wherein the one or more compounds of formula I are of the following subformulae:

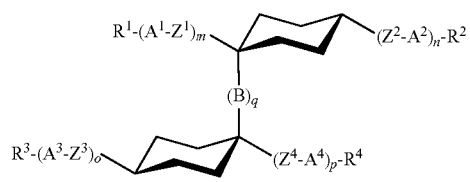 Ia
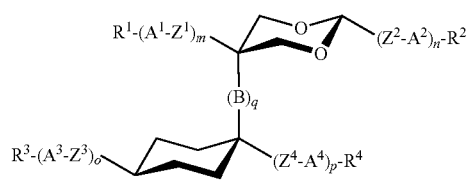 Ib
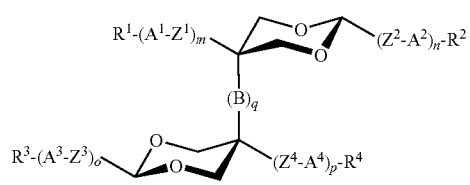 Ic
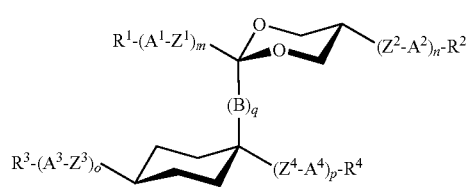 Id
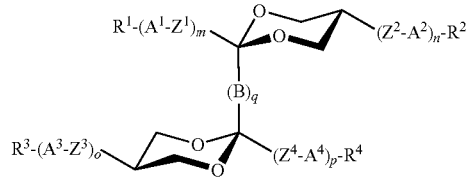 Ie
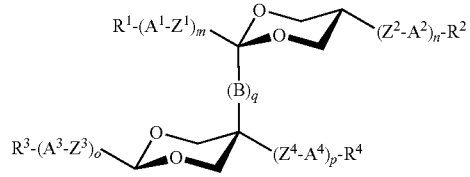 If
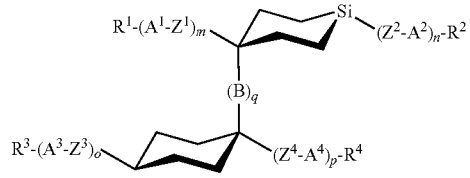 Ig
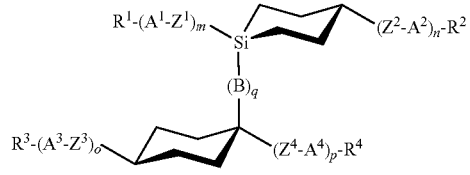 Ih
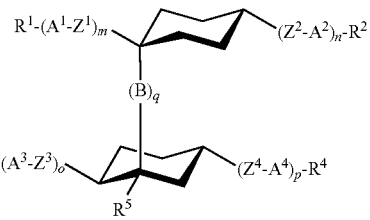 Ii
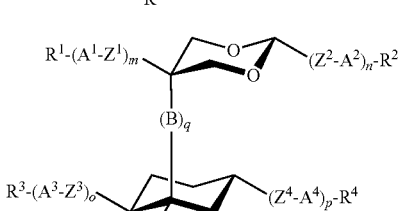 Ik
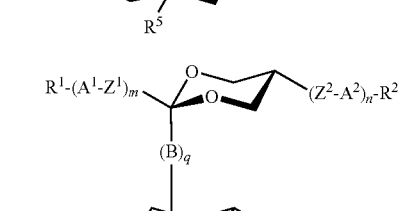 Im
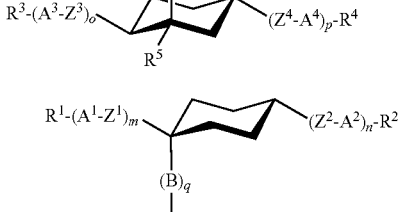 In
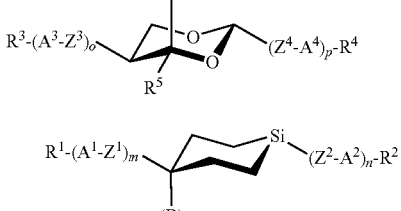 Io
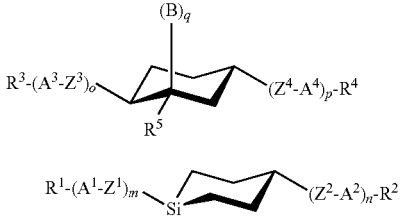 Ip
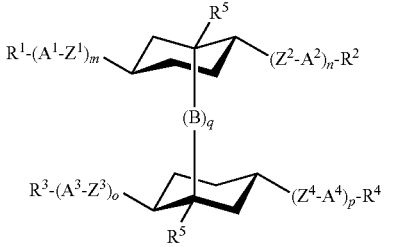 Iq

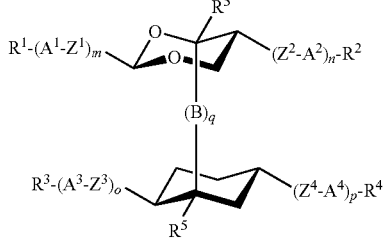
Ir
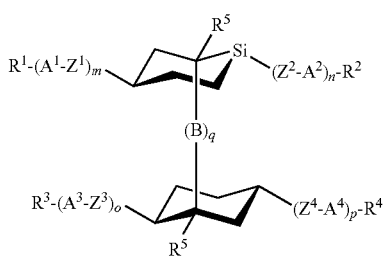
Is
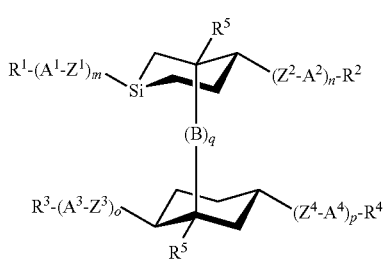
It
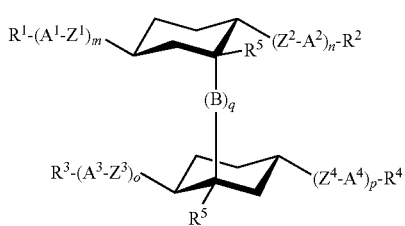
Iu
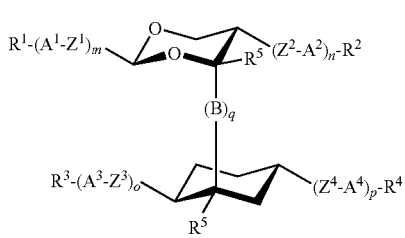
Iv
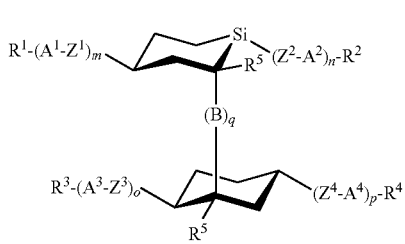
Iw
Ix
wherein $R^{1-5}$, $A^{1-4}$, $Z^{1-4}$, B, m, n, o, p and q have the meanings given for the compound of formula I.
8. A birefringent layer according to claim 1, wherein the one or more compounds of formula I are of the following subformulae:
I1
I2
I3
I4

I5
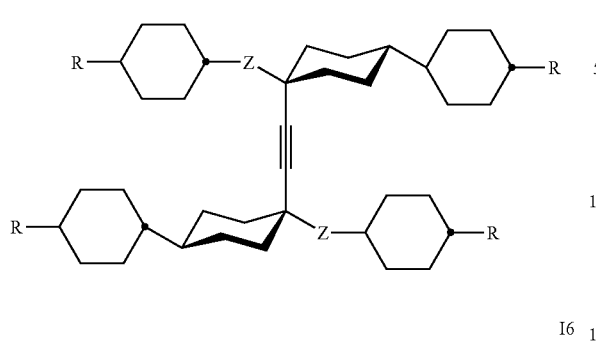
I6
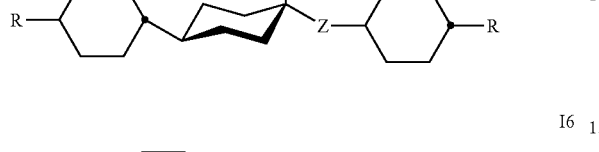
I7
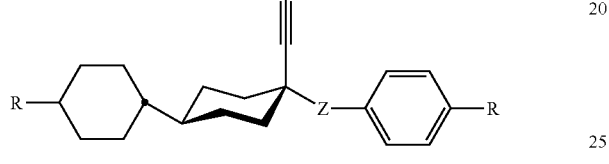
I8
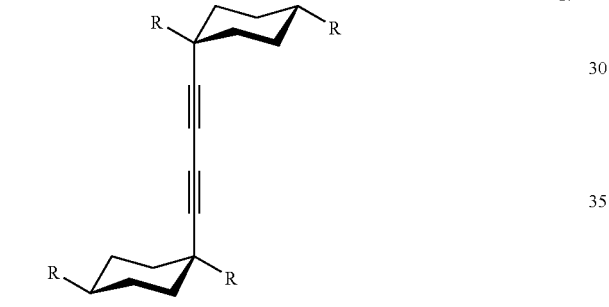
I9
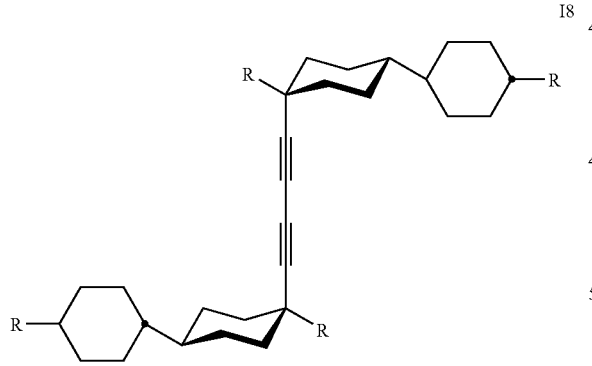
I10
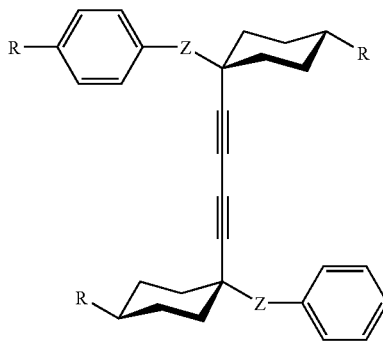
I11
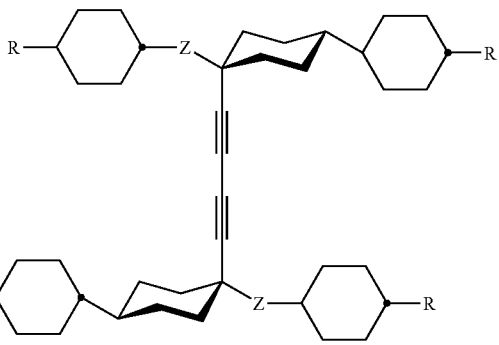
I12
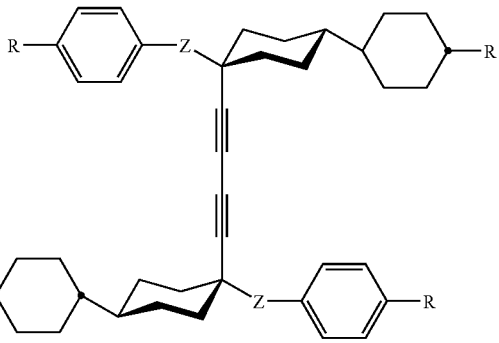
I13
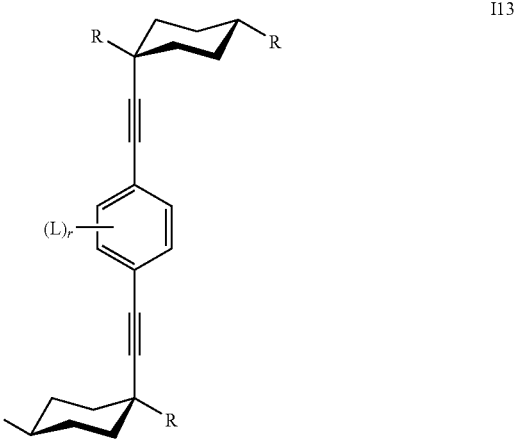

I14
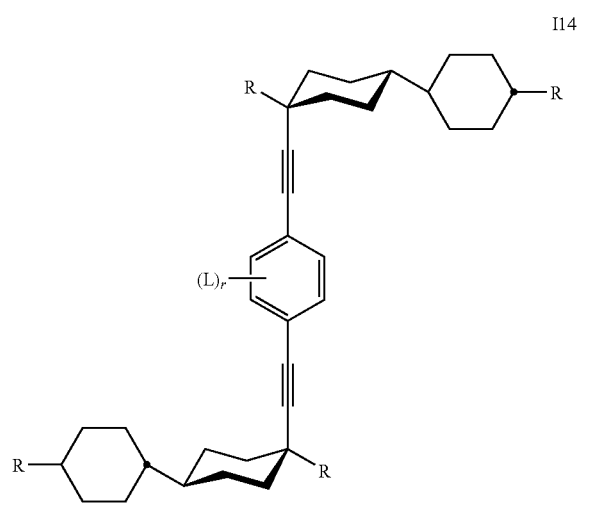
I17
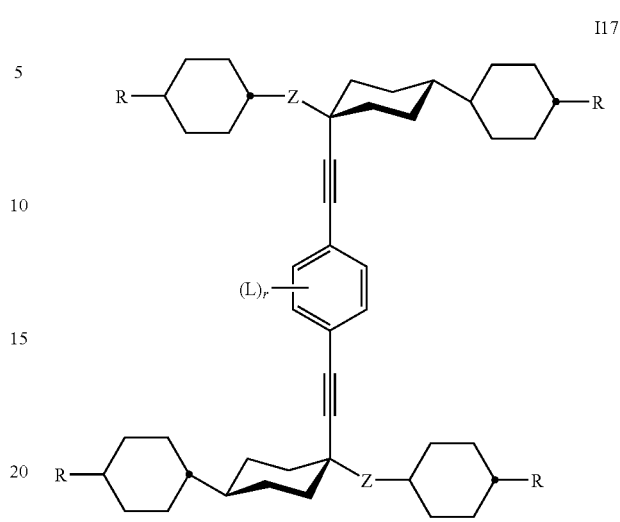
I15
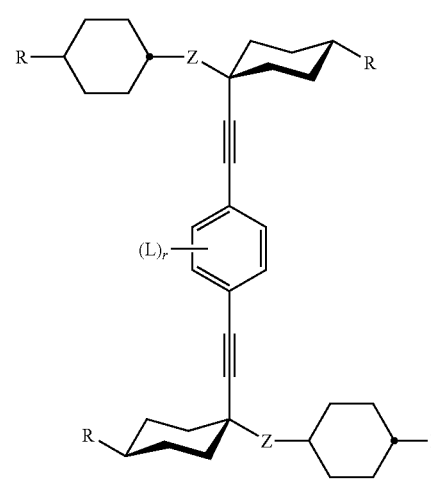
I18
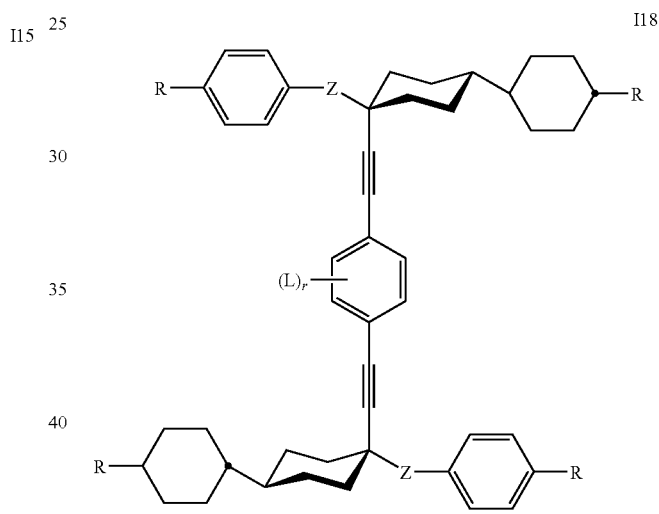
I16
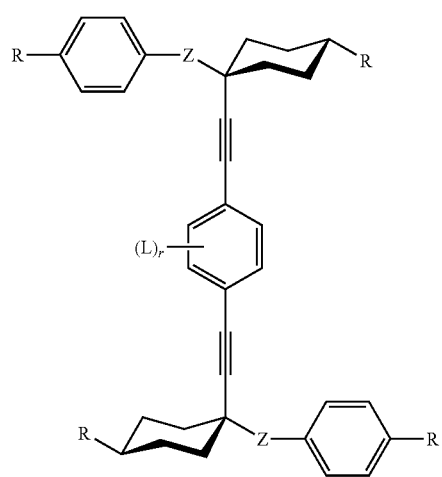
I19
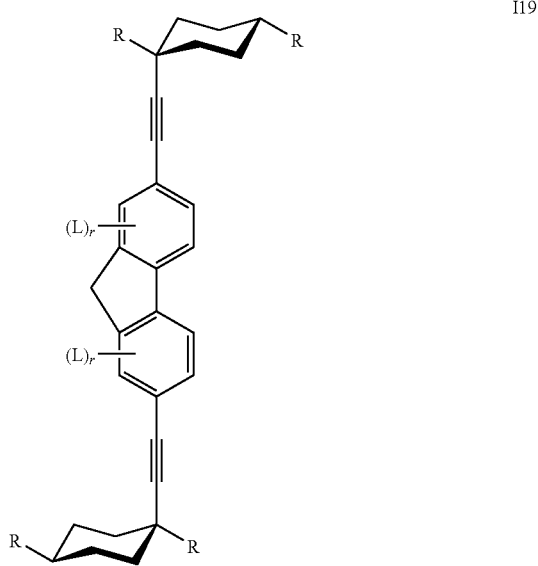

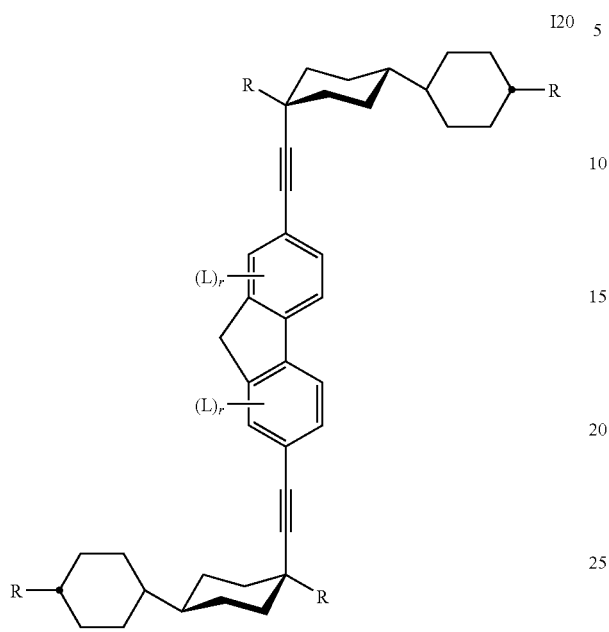
I20
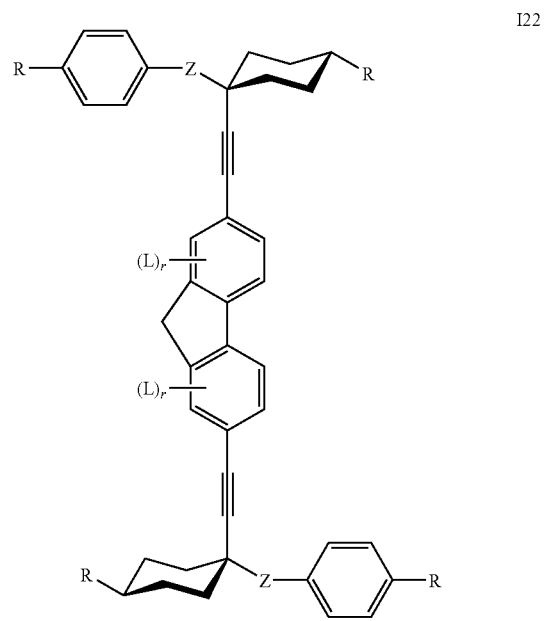
I22
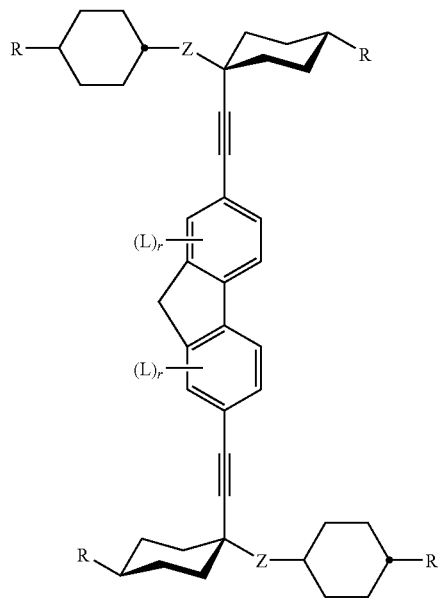
I21
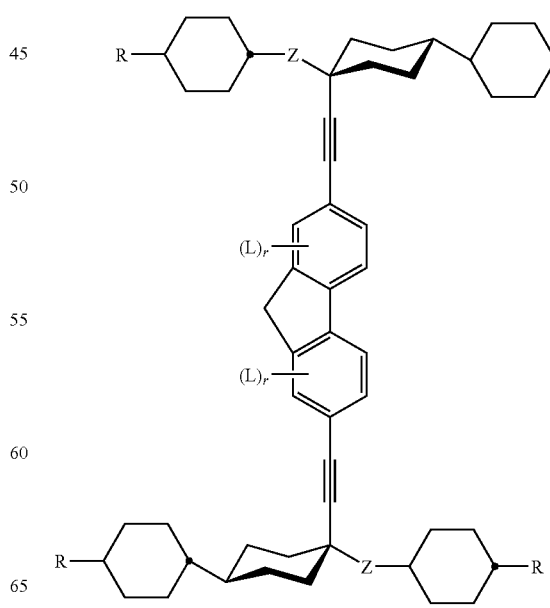
I23

-continued

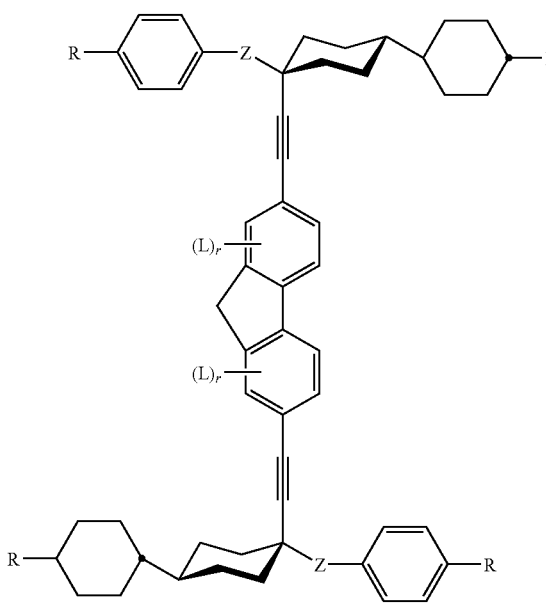

I24 wherein Z has in each case occurrence independently of one another one of the meanings of $Z^1$ given for the compound of formula I, and R has in each case occurrence independently of one another one of the meanings of $R^1$ given for the compound of formula I, and the benzene rings in the mesogenic groups are optionally substituted by one or more groups L as defined for the compound of formula I, and r is 0, 1, 2, 3 or 4.

9. A polymerizable LC medium comprising one or more compounds of formula I

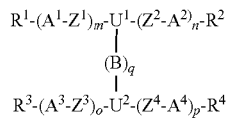

I wherein $U^1$ and $U^2$ are independently of each other selected from the group consisting of

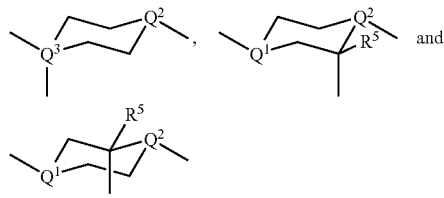

including their mirror images, wherein $U^1$ and $U^2$ are each bonded to the group —$(B)_q$— via an axial bond and in which one or two non-adjacent ring $CH_2$ groups are optionally replaced by O and/or S, and $U^1$ and $U^2$ are optionally substituted by one or more groups L, L is, in case of multiple occurrence independently of one another, H, P-Sp-, F, Cl, Br, I, —CN, —$NO_2$, —NCO, —NCS, —OCN, —SCN, —C(=O)$NR^0R^{00}$, —C(=O) X, —C(=O)$OR^0$, —C(=O)$R^0$, —$NR^0R^{00}$, —OH, —$SF_5$, optionally substituted silyl, aryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, P is a polymerizable group, Sp is a spacer group, X is halogen, $Q^1$ and $Q^2$ are independently of each other CH or SiH, $Q^3$ is C or Si, B is in each occurrence independently of one another —C≡C—, —$CY^1$=$CY^2$— or an optionally substituted aromatic or heteroaromatic group, $Y^1$ and $Y^2$ are independently of each other H, F, Cl, CN or $R^0$, q is an integer from 1 to 10, $A^1$, $A^2$, $A^3$ and $A^4$ are independently of each other selected from the group consisting of non-aromatic carbocylic groups, heterocyclic groups, aromatic groups and heteroaromatic groups, which are optionally substituted by one or more $R^5$, and wherein each of -($A^1$-$Z^1$)$_m$—$U^1$—($Z^2$-$A^2$)$_n$- and -($A^3$-$Z^3$)$_o$—$U^2$—($Z^4$-$A^4$)$_p$- does not contain more aromatic groups than non-aromatic groups, $Z^1$, $Z^2$ $Z^3$ and $Z^4$ are independently of each other —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CH_2CF_2$—, —$CF_2CF_2$—, —CH=CH—, —$CY^1$=$CY^2$—, —CH=N—, —N=CH—, —N=N—, —CH=$CR^0$—, —C≡C—, —CH=CH—COO—, —OCO—CH=CH—, $CR^0R^{00}$ or a single bond, $R^0$ and $R^{00}$ are independently of each other H or alkyl with 1 to 12 C-atoms, m and n are independently of each other 0, 1, 2, 3 or 4, o and p are independently of each other 0, 1, 2, 3 or 4, and $R^1$, $R^2$, $R^3$, $R^4$ and $R^5$ are independently of each other identical or different groups and are H, halogen, —CN, —NC, —NCO, —NCS, —OCN, —SCN, —C(=O)$NR^0R^{00}$, —C(=O)$X^0$, —C(=O)$R^0$, —$NH_2$, —$NR^0R^{00}$, —SH, —$SR^0$, —$SO_3H$, —$SO_2R^0$, —OH, —$NO_2$, —$CF_3$, —$SF_5$, optionally substituted silyl, or carbyl or hydrocarbyl with 1 to 40 C atoms that is optionally substituted and optionally comprises one or more hetero atoms, and wherein one or more H atoms are optionally replaced by D atoms, and one or more compounds that are polymerizable and are optionally mesogenic or liquid crystalline.

10. An optical, electronic or electrooptical device, or a component thereof, comprising a birefringent layer according to claim 1.

11. A device or component according to claim 10, which is selected from the group consisting of electrooptical displays, LCDs, optical films, polarisers, compensators, beam splitters, reflective films, alignment layers, colour filters, holographic elements, hot stamping foils, coloured images, decorative markings, security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarizing layers, antistatic films, conducting substrates, conducting patterns, photoconductors, electrophotographic applications, electrophotographic recordings, organic memory devices, biosensors, and biochips.

12. A polymerizable LC medium according to claim 9, wherein the one or more polymerizable compounds are of the following formulae

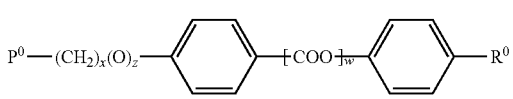
(MR1)

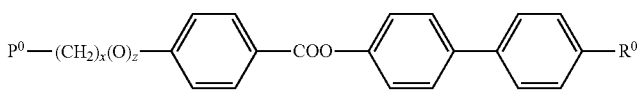
(MR2)

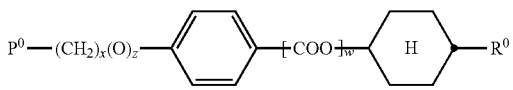
(MR3)

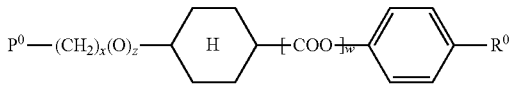
(MR4)

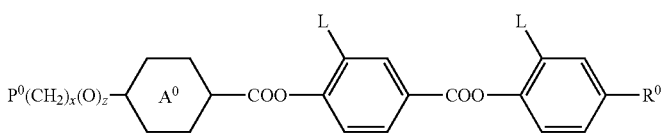
(MR5)

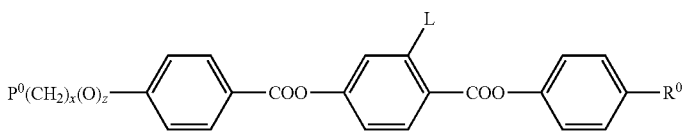
(MR6)

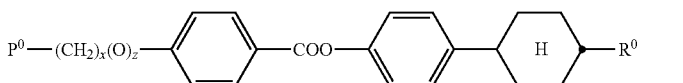
(MR7)

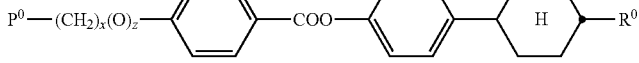
(MR8)

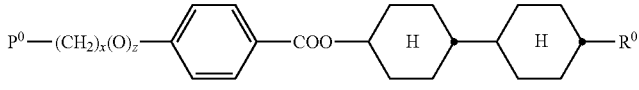
(MR9)

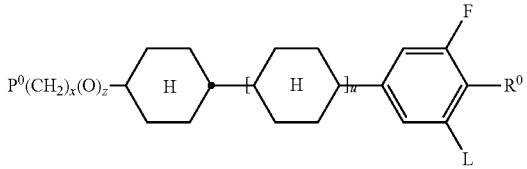
(MR10)

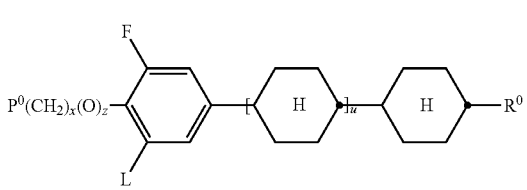
(MR11)

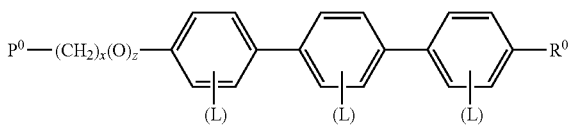

-continued
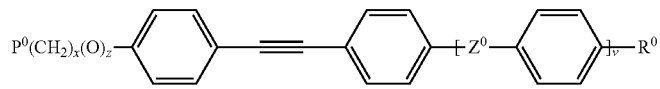 (MR12)
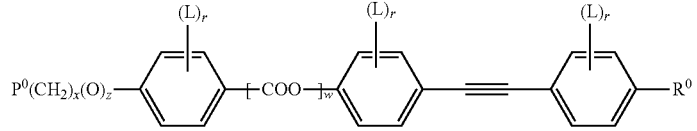 (MR13)
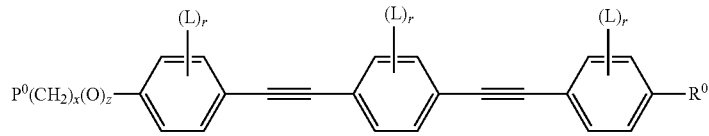 (MR14)
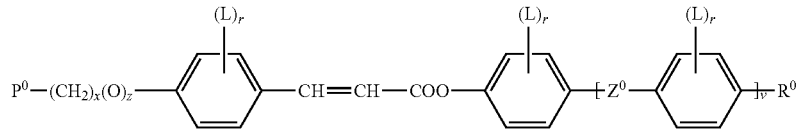 (MR15)
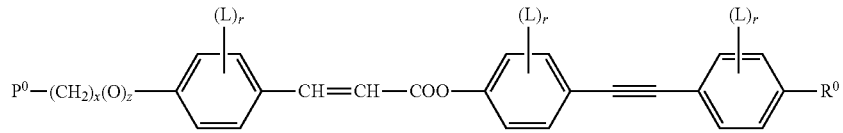 (MR16)
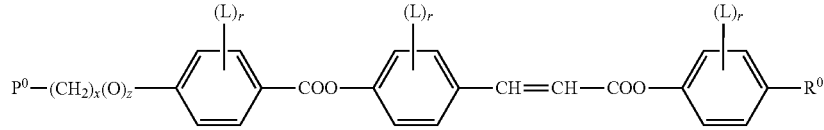 (MR17)
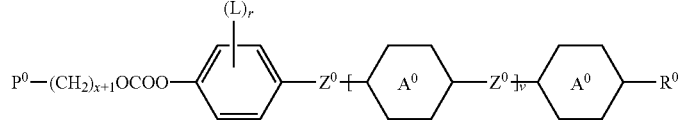 (MR18)
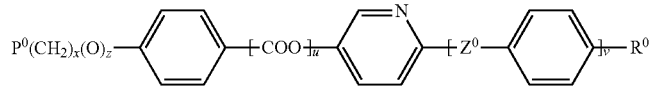 (MR19)
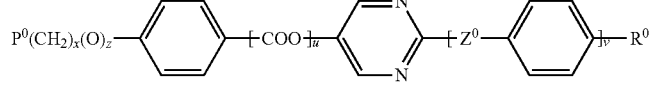 (MR20)
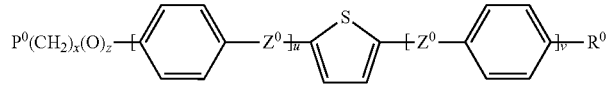 (MR21)
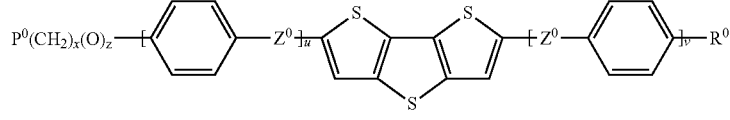 (MR22)
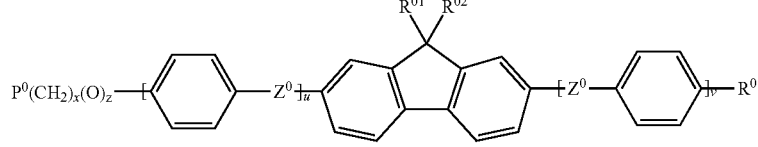 (MR23)

-continued
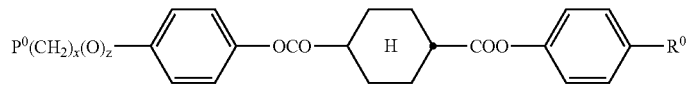 (MR24)
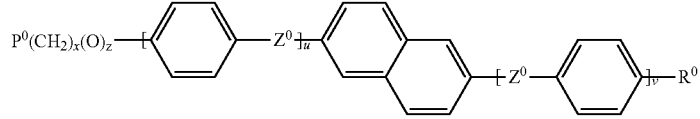 (MR25)
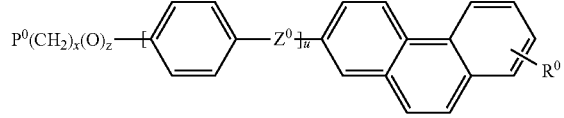 (MR26)
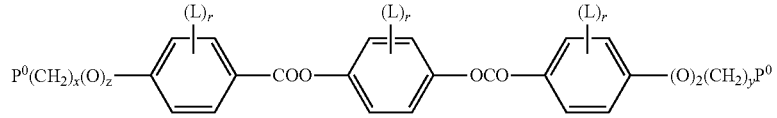 (DR1)
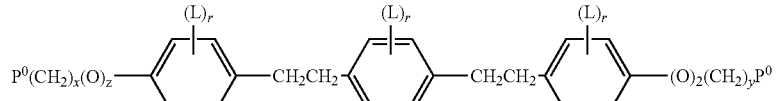 (DR2)
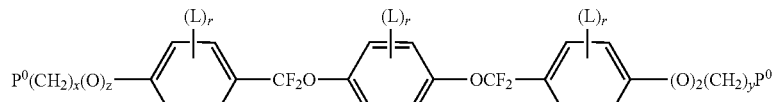 (DR3)
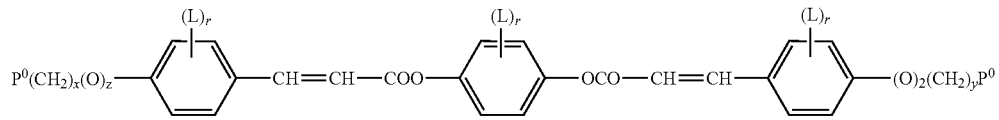 (DR4)
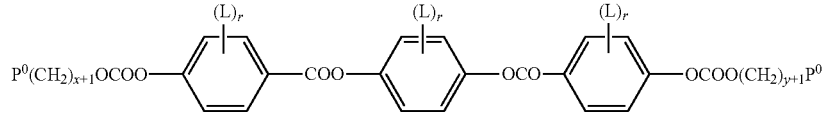 (DR5)
 (DR6)
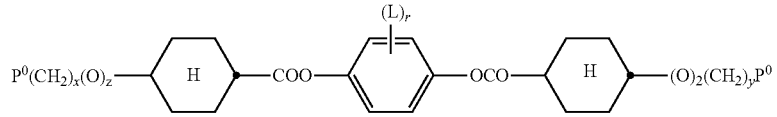 (DR7)
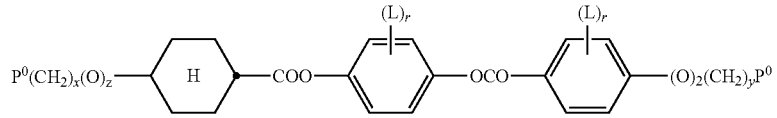 (DR8)
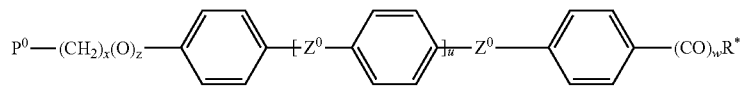 (CR1)
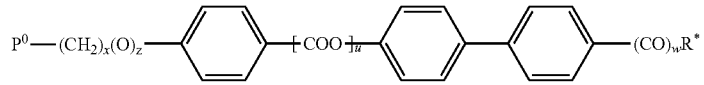 (CR2)

-continued

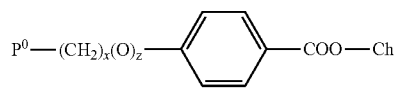
(CR3)

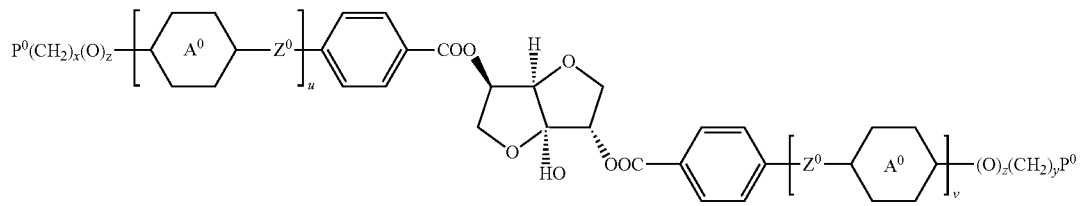
(CR4)

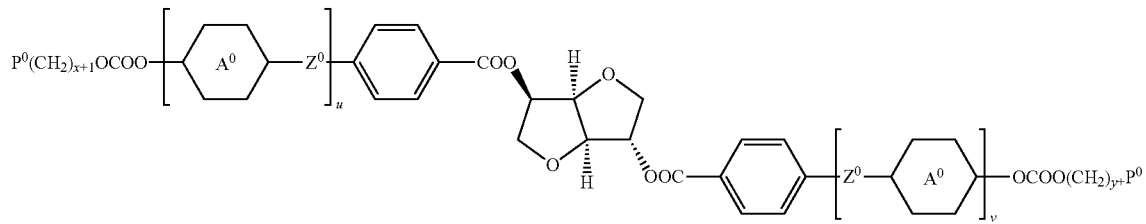
(CR5)

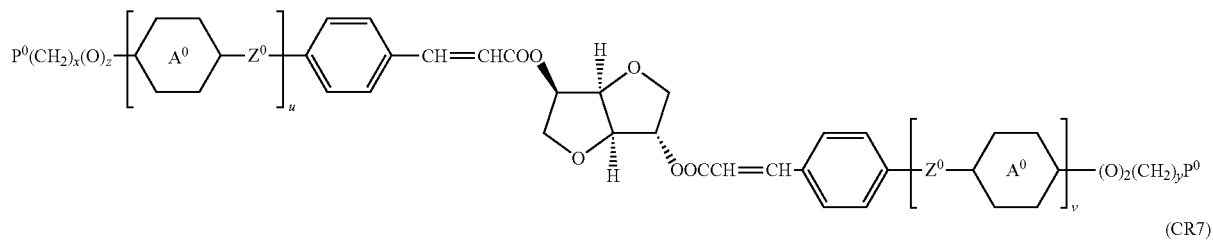
(CR6)

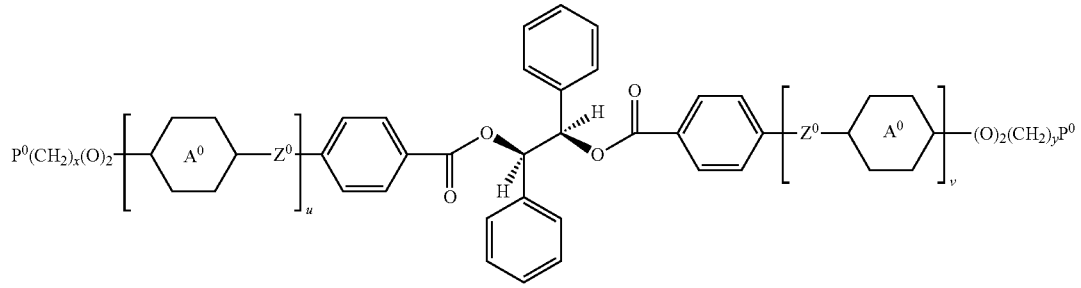
(CR7)

wherein
$P^0$ is, in case of multiple occurrence independently of one another, an acryl, methacryl, oxetane, epoxy, vinyl, vinyloxy, propenyl ether or styrene group,
$A^0$ and $B^0$ are, in case of multiple occurrence independently of one another, 1,4-phenylene that is optionally substituted with 1, 2, 3 or 4 groups L, or trans-1,4-cyclohexylene,
$Z^0$ is, in case of multiple occurrence independently of one another, —COO—, —OCO—, —CH$_2$CH$_2$—, —C≡C—, —CH═CH—, —CH═CH—COO—, —OCO—CH═CH— or a single bond,
$R^0$ is alkyl, alkoxy, thioalkyl, alkylcarbonyl, alkoxycarbonyl, alkylcarbonyloxy or alkoxycarbonyloxy with one or more C atoms, which is optionally fluorinated, or is $Y^0$ or $P^0$—(CH$_2$)$_y$—(O)$_z$—,
$Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
$R^{01,02}$ are independently of each other H, $R^0$ or $Y^0$,
R* is a chiral alkyl or alkoxy group with 4 or more C atoms,
Ch is a chiral group selected from the group consisting of cholesteryl, estradiol, and terpenoid radicals,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
t is, in case of multiple occurrence independently of one another, 0, 1, 2 or 3,
u and v are independently of each other 0, 1 or 2,
w is 0 or 1,
x and y are independently of each other 0 or identical or different integers from 1 to 12, and
z is 0 or 1, with z being 0 if the adjacent x or y is 0,
and wherein the benzene and napthalene rings can additionally be substituted with one or more identical or different groups L.

13. A polymerizable LC medium according to claim 9, wherein the one or more polymerizable compounds are of the following formulae

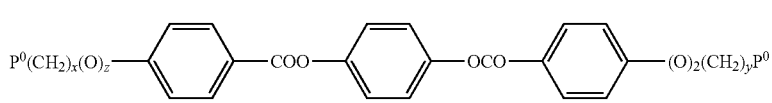
(DR1a)

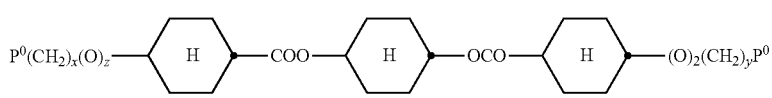
(DR6)

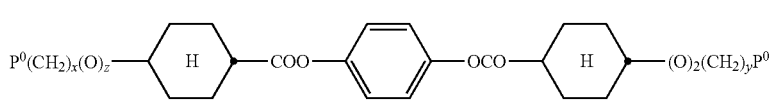
(DR7a)

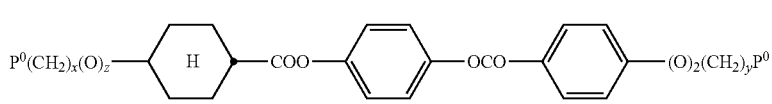
(DR8a)

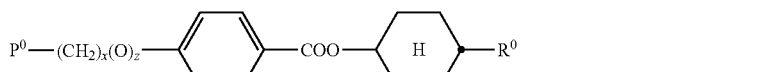
(MR3a)

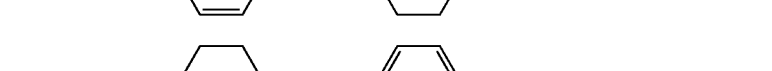
(MR4a)

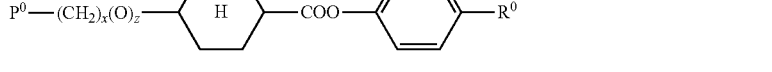
(MR7)

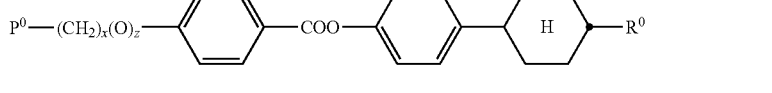
(MR8)

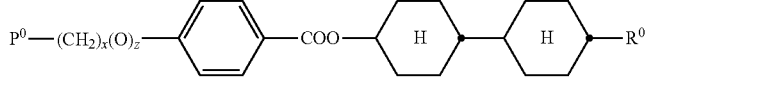
(MR9a)

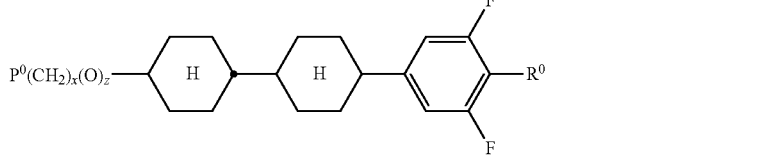
(MR10a)

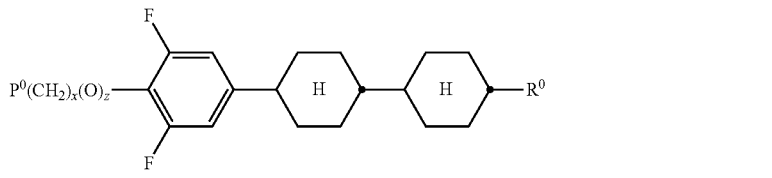

wherein
$P^0$ is, in case of multiple occurrence independently of one another, an acryl, methacryl, oxetane, epoxy, vinyl, vinyloxy, propenyl ether or styrene group,
$R^0$ is alkyl, alkoxy, thioalkyl, alkylcarbonyl, alkoxycarbonyl, alkylcarbonyloxy or alkoxycarbonyloxy with one or more C atoms, which is optionally fluorinated, or is $Y^0$ or P—$(CH_2)_y$—$(O)_z$—,
P is a polymerizable group,
$Y^0$ is F, Cl, CN, $NO_2$, $OCH_3$, OCN, SCN, $SF_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
x and y are independently of each other 0 or identical or different integers from 1 to 12, and
z is 0 or 1, with z being 0 if the adjacent x or y is 0,
and wherein the benzene and napthalene rings can additionally be substituted with one or more identical or different groups L,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms.

14. A polymerizable LC medium according to claim 9, wherein the one or more polymerizable compounds are of the following formulae

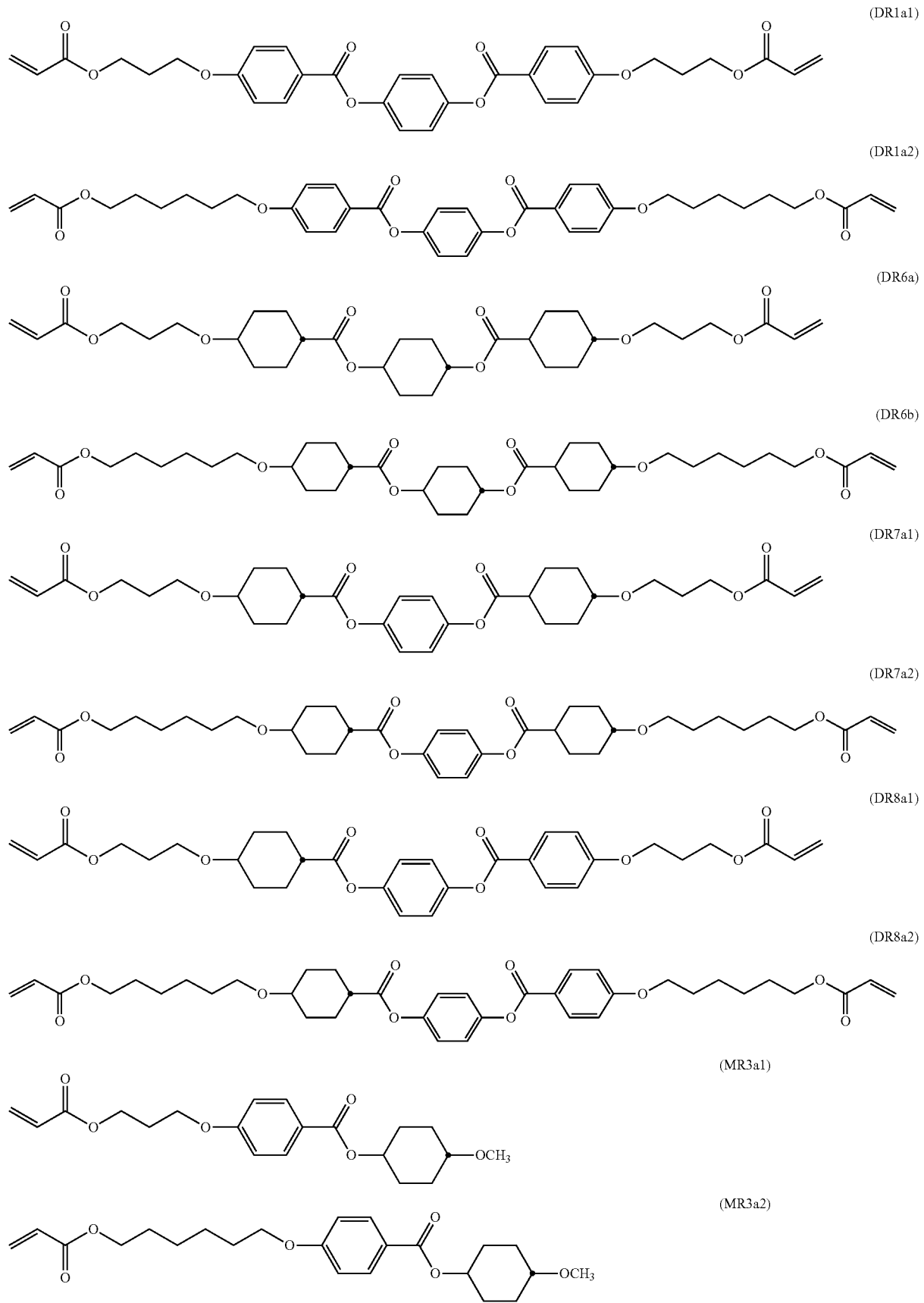

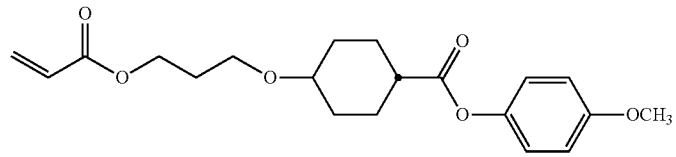
(MR4a1)
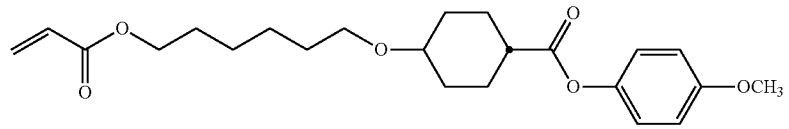
(MR4a2)
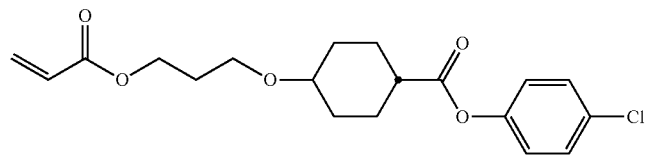
(MR4a3)
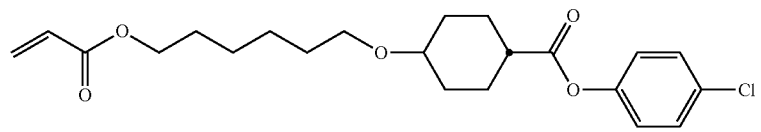
(MR4a4)
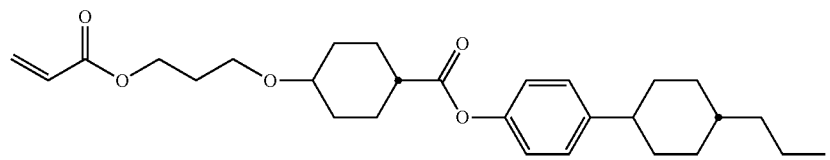
(MR7a)
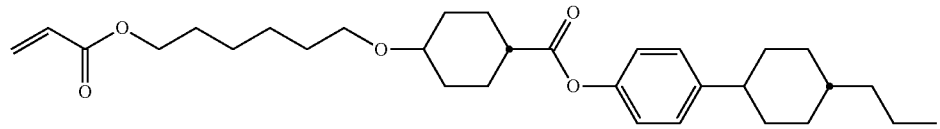
(MR7b)
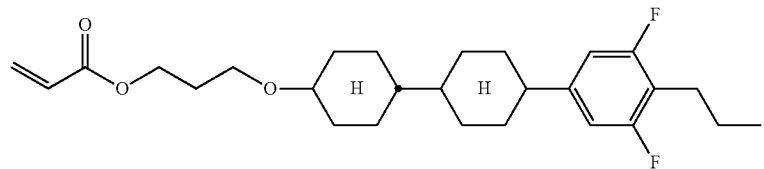
(MR9a1)
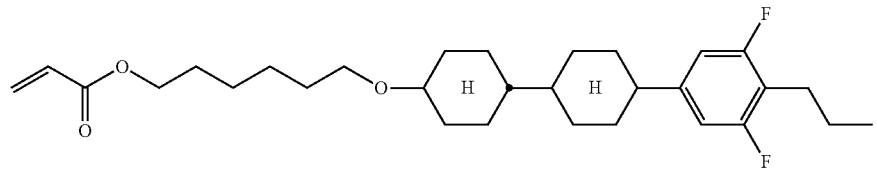
(MR9a2)
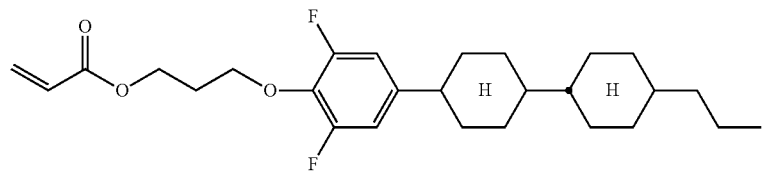
(MR10a1)

-continued

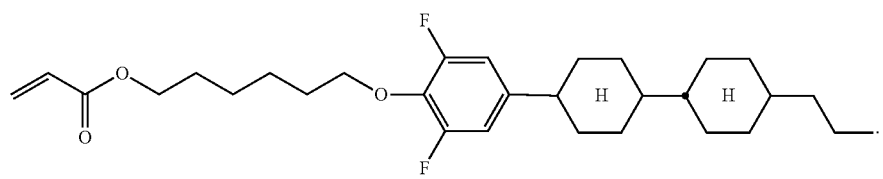
(MR10a2)

15. A polymerizable LC medium according to claim 9, wherein the concentration of the compounds of formula I is from 5 to 90 wt. %.

16. A polymerizable LC medium according to claim 15, wherein the concentration of the compounds of formula I is from 30 to 70 wt. %.

17. A birefringent layer according to claim 1, wherein the LC medium has a nematic phase.

18. A birefringent layer according to claim 1, wherein the host component of the LC medium is an LC mixture of two or more mesogenic or liquid crystalline compounds.

19. A birefringent layer according to claim 1, wherein the concentration of the compounds of formula I is from 5 to 90 wt. %.

20. A birefringent layer according to claim 1, wherein the concentration of the compounds of formula I is from 30 to 70 wt. %.

21. A birefringent layer according to claim 1, which is prepared by providing the LC medium in a cell formed by two plane parallel substrates, the surfaces of which are optionally treated to induce a predetermined orientation direction of the LC molecules.

22. A birefringent layer according to claim 1, wherein the host component comprises one or more polymerizable compounds which are optionally mesogenic or liquid crystalline.

23. A birefringent layer according to claim 22, wherein said one or more polymerizable compounds are reactive mesogens.

24. A birefringent layer according to claim 23, wherein said reactive mesogens are of the following formulae

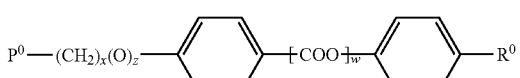
(MR1)

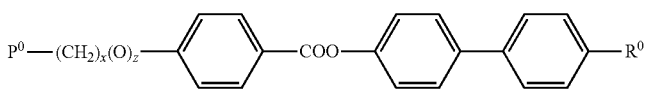
(MR2)

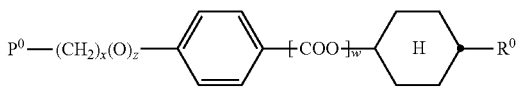
(MR3)

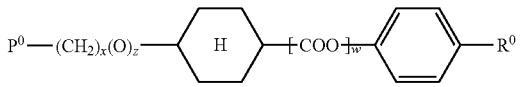
(MR4)

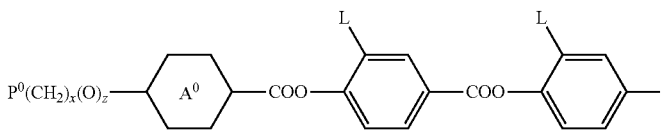
(MR5)

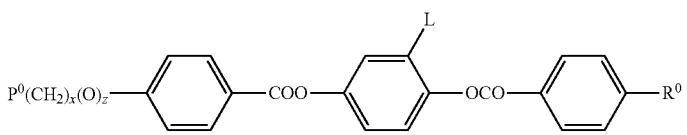
(MR6)

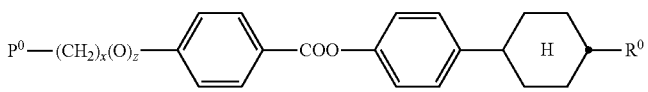
(MR7)

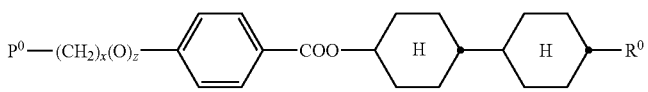
(MR8)

-continued
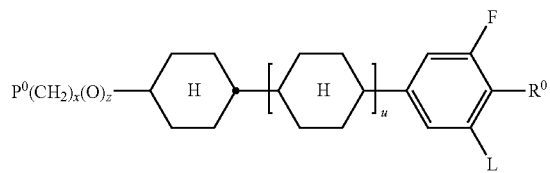
(MR9)
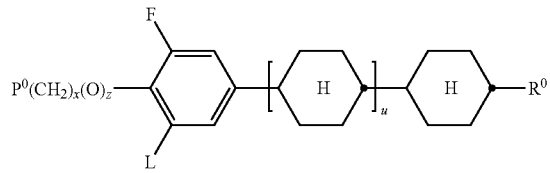
(MR10)
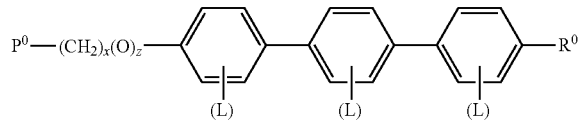
(MR11)
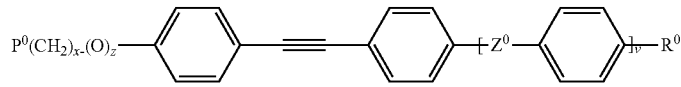
(MR12)
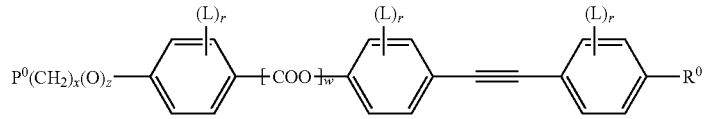
(MR13)
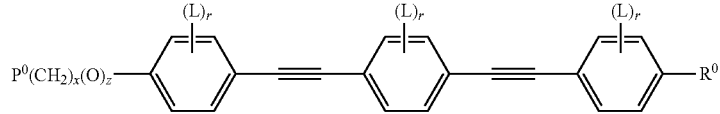
(MR14)
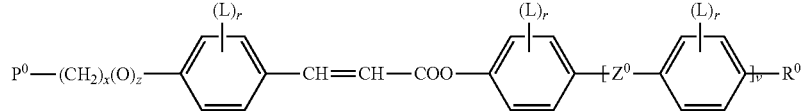
(MR15)
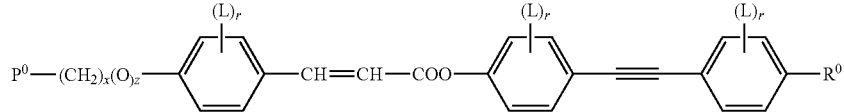
(MR16)
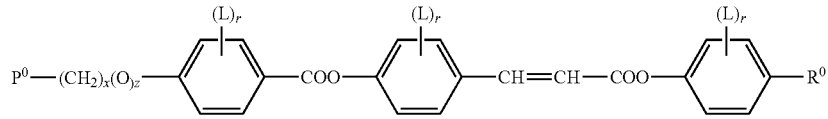
(MR17)
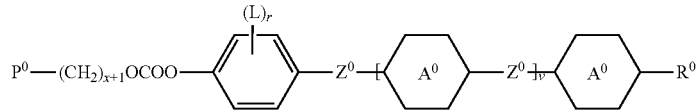
(MR18)
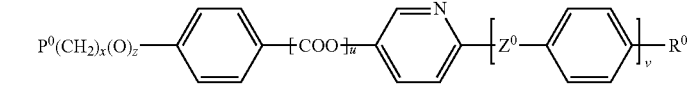
(MR19)
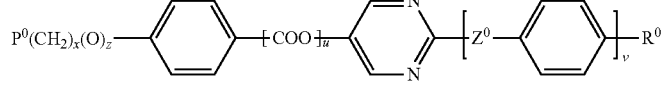
(MR20)

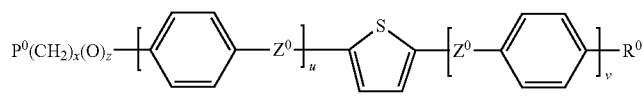
(MR21)
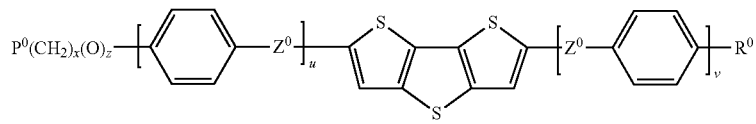
(MR22)
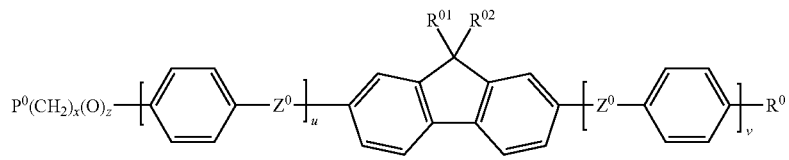
(MR23)
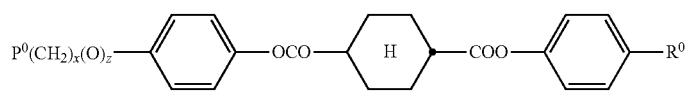
(MR24)
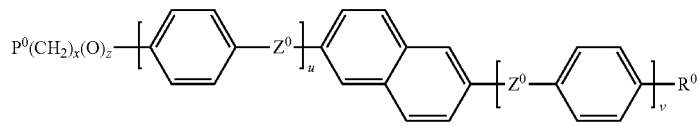
(MR25)
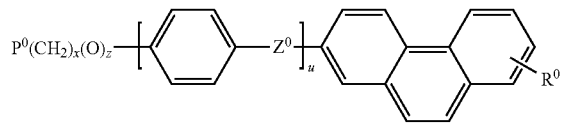
(MR26)
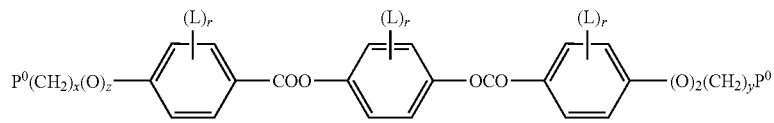
(DR1)
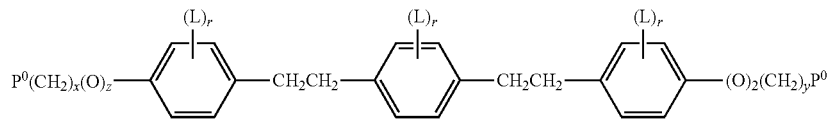
(DR2)
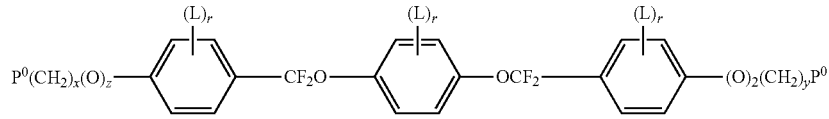
(DR3)
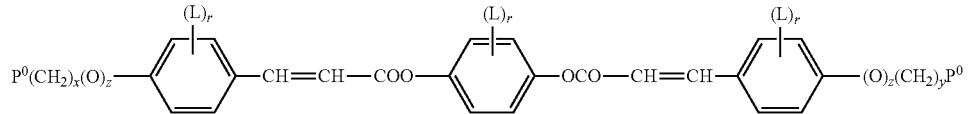
(DR4)
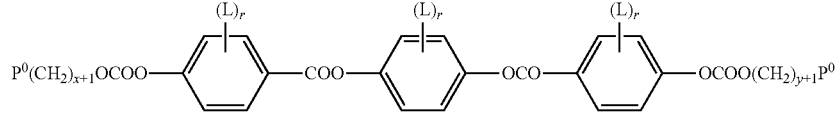
(DR5)
(DR6)

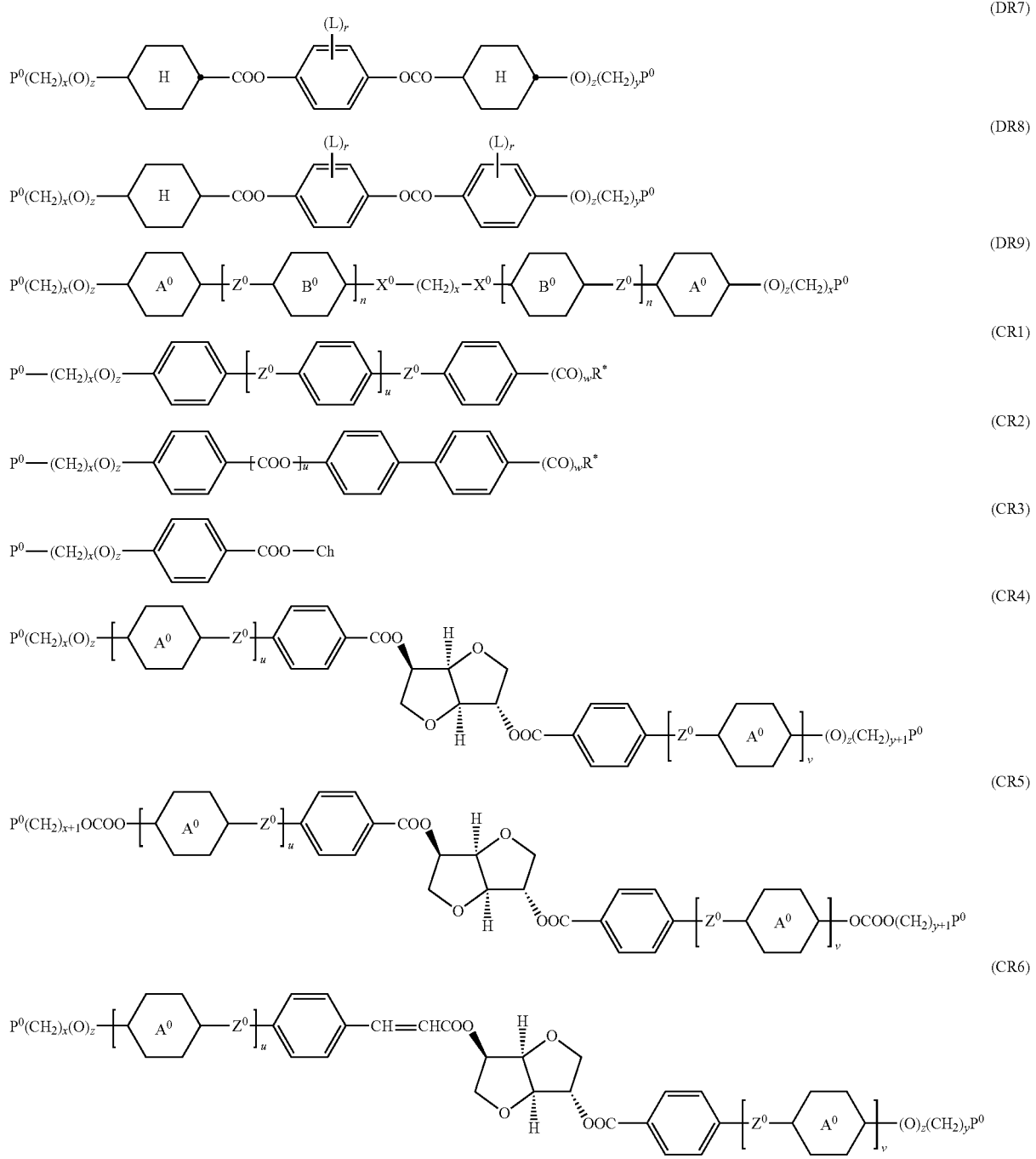

wherein
P⁰ is, in case of multiple occurrence independently of one another, an acryl, methacryl, oxetane, epoxy, vinyl, vinyloxy, propenyl ether or styrene group,
A⁰ and B⁰ are, in case of multiple occurrence independently of one another, 1,4-phenylene that is optionally substituted with 1, 2, 3 or 4 groups L, or trans-1,4-cyclohexylene,
Z⁰ is, in case of multiple occurrence independently of one another, —COO—, —OCO—, —CH$_2$CH$_2$—, —C≡C—, —CH=CH—, —CH=CH—OCO—, —OCO—CH=CH— or a single bond,
R⁰ is alkyl, alkoxy, thioalkyl, alkylcarbonyl, alkoxycarbonyl, alkylcarbonyloxy or alkoxycarbonyloxy with one or more C atoms, which is optionally fluorinated, or is Y⁰ or P—(CH$_2$)$_y$—(O)$_z$—,
P is a polymerizable group,
Y⁰ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
$R^{01,02}$ are independently of each other H, R⁰ or Y⁰,
R* is a chiral alkyl or alkoxy group with 4 or more C atoms, Ch is a chiral group selected from the group consisting of cholesteryl, estradiol, and terpenoid radicals, L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, t is, in case of multiple occurrence independently of one another, 0, 1, 2 or 3, u and v are independently of each other 0, 1 or 2, w is 0 or 1, x and y are independently of each other 0 or identical or different integers from 1 to 12, and z is 0 or 1, with z being 0 if the adjacent x or y is 0, and wherein the benzene and napthalene rings can additionally be substituted with one or more identical or different groups L.

25. A birefringent layer according to claim 22, which is prepared by applying the LC medium on a substrate or between two substrates, and polymerizing the LC medium in its LC phase in an oriented state to form a polymer film.

26. A birefringent layer according to claim 1, which is an A plate, O plate, C plate or negative C plate.

27. A birefringent layer according to claim 1, wherein the host component has positive birefringence and normal dispersion, and the guest component has negative birefringence at 550 nm and normal birefringence dispersion or positive birefringence at 550 nm and reverse birefringence dispersion.

28. A birefringent layer according to claim 1, wherein

L is, in case of multiple occurrence independently of one another, F, Cl, Br, I, —CN, —$NO_2$, —NCO, —NCS, —OCN, —SCN, —C(=O)$NR^oR^{oo}$, —C(=O)X, —C(=O)$OR^o$, —C(=O)$R^o$, —$NR^oR^{oo}$, —OH, —$SF_5$, optionally substituted silyl, aryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl.

29. A polymerizable LC medium according to claim 9, wherein

L is, in case of multiple occurrence independently of one another, F, Cl, Br, I, —CN, —$NO_2$, —NCO, —NCS, —OCN, —SCN, —C(=O)$NR^oR^{oo}$, —C(=O)X, —C(=O)$OR^o$, —C(=O)$R^o$, —$NR^oR^{oo}$, —OH, —$SF_5$, optionally substituted silyl, aryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl.

30. A birefringent layer according to claim 1, wherein

L is, in case of multiple occurrence independently of one another, F, Cl, Br, I, —CN, —$NO_2$, —NCO, —NCS, —OCN, —SCN, —C(=O)$NR^oR^{oo}$, —C(=O)X, —C(=O)$OR^o$, —C(=O)$R^o$, —$NR^oR^{oo}$, —OH, —$SF_5$, silyl, aryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, B is in each occurrence independently of one another —C≡C—, —$CY^1$=$CY^2$— or an aromatic or heteroaromatic group, and $R^1$, $R^2$, $R^3$, $R^4$ and $R^5$ are independently of each other identical or different groups and are H, halogen, —ON, —NC, —NCO, —NCS, —OCN, —SCN, —C(=O)$NR^oR^{oo}$, —C(=O)$X^o$, —C(=O)$R^o$, —$NH_2$, —$NR^oR^{oo}$, —SH, —$SR^o$, —$SO_3H$, —$SO_2R^o$, —OH, —$NO_2$, —$CF_3$, —$SF_5$, silyl, or carbyl or hydrocarbyl with 1 to 40 C atoms that optionally comprises one or more hetero atoms, and wherein one or more H atoms are optionally replaced by D atoms.

31. A polymerizable LC medium according to claim 9, wherein

L is, in case of multiple occurrence independently of one another, F, Cl, Br, I, —CN, —$NO_2$, —NCO, —NCS, —OCN, —SCN, —C(=O)$NR^oR^{oo}$, —C(=O)X, —C(=O)$OR^o$, —C(=O)$R^o$, —$NR^oR^{oo}$, —OH, —$SF_5$, silyl, aryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, B is in each occurrence independently of one another —C≡C—, —$CY^1$=$CY^2$— or an aromatic or heteroaromatic group, and $R^1$, $R^2$, $R^3$, $R^4$ and $R^5$ are independently of each other identical or different groups and are H, halogen, —ON, —NC, —NCO, —NCS, —OCN, —SCN, —C(=O)$NR^oR^{oo}$, —C(=O)$X^o$, —C(=O)$R^o$, —$NH_2$, —$NR^oR^{oo}$, —SH, —$SR^o$, —$SO_3H$, —$SO_2R^o$, —OH, —$NO_2$, —$CF_3$, —$SF_5$, silyl, or carbyl or hydrocarbyl with 1 to 40 C atoms that optionally comprises one or more hetero atoms, and wherein one or more H atoms are optionally replaced by D atoms.

32. A birefringent layer according to claim 1, wherein

L is, in case of multiple occurrence independently of one another, F, Cl, Br, I, —ON, —$NO_2$, —NCO, —NCS, —OCN, —SCN, —C(=O)$NR^oR^{oo}$, —C(=O)X, —C(=O)$OR^o$, —C(=O)$R^o$, —$NR^oR^{oo}$, —OH, —$SF_5$, silyl, aryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, B is in each occurrence independently of one another —C≡C—, —$CY^1$=$CY^2$— or an optionally substituted by L aromatic or heteroaromatic group, and $R^1$, $R^2$, $R^3$, $R^4$ and $R^5$ are independently of each other identical or different groups and are H, halogen, —ON, —NC, —NCO, —NCS, —OCN, —SCN, —C(=O)$NR^oR^{oo}$, —C(=O)$X^o$, —C(=O)$R^o$, —$NH_2$, —$NR^oR^{oo}$, —SH, —$SR^o$, —$SO_3H$, —$SO_2R^o$, —OH, —$NO_2$, —$CF_3$, —$SF_5$, silyl, or carbyl or hydrocarbyl with 1 to 40 C atoms that is optionally mono- or polysubstituted by F, Cl, Br, I or CN and optionally comprises one or more hetero atoms, and wherein one or more H atoms are optionally replaced by D atoms.

33. A polymerizable LC medium according to claim 9, wherein

L is, in case of multiple occurrence independently of one another, F, Cl, Br, I, —CN, —$NO_2$, —NCO, —NCS, —OCN, —SCN, —C(=O)$NR^oR^{oo}$, —C(=O)X, —C(=O)$OR^o$, —C(=O)$R^o$, —$NR^oR^{oo}$, —OH, —$SF_5$, silyl, aryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, B is in each occurrence independently of one another —C≡C—, —CY$^1$=CY$^2$— or an optionally substituted by L aromatic or heteroaromatic group, and R$^1$, R$^2$, R$^3$, R$^4$ and R$^5$ are independently of each other identical or different groups and are H, halogen, —CN, —NC, —NCO, —NCS, —OCN, —SCN, —C(=O)NR$^0$R$^{00}$, —C(=O)X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, silyl, or carbyl or hydrocarbyl with 1 to 40 C atoms that is optionally mono- or polysubstituted by F, Cl, Br, I or CN and optionally comprises one or more hetero atoms, and wherein one or more H atoms are optionally replaced by D atoms.

\* \* \* \* \*

UNITED STATES PATENT AND TRADEMARK OFFICE
CERTIFICATE OF CORRECTION

PATENT NO. : 8,119,026 B2
APPLICATION NO. : 12/532901
DATED : February 21, 2012
INVENTOR(S) : Parri et al.

It is certified that error appears in the above-identified patent and that said Letters Patent is hereby corrected as shown below:

Column 52, line 48, "-OCN, -SCN, -O(=O)NR$^0$R$^{00}$, -C(=O)X," SHOULD READ
-- -OCN, -SCN, -C(=O)NR$^0$R$^{00}$, -C(=O)X, --

Column 53, line 15, "-N=CH-, -N=N-, -CH=CR$^0$-," SHOULD READ
-- -N=CH-, -N=N-, -CH=CR$^0$-, -C=-C --

Column 74, (CR5) SHOULD READ –

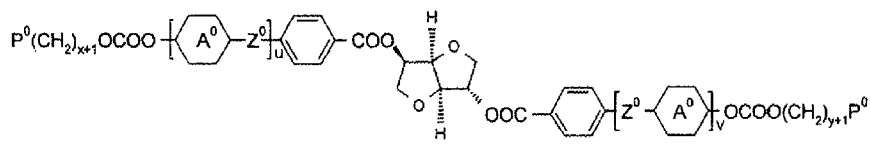

Column 88, (CR6) SHOULD READ –

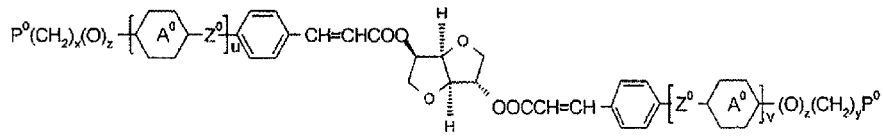

Column 90, line 23 reads, "different groups and are H, halogen, -ON, -NC," SHOULD READ
-- different groups and are H, halogen, -CN, -NC --

Column 90, line 35 reads, "another F, Cl, Br, I, -ON, -NO$_2$, -NCO, -NCS," SHOULD READ
-- another F, Cl, Br, I, -CN, -NO$_2$, -NCO, -NCS --

Column 90, line 48 reads, "different groups and are H, halogen, -ON, -NC," SHOULD READ
-- different groups and are H, halogen, -CN, -NC --

Signed and Sealed this
Thirteenth Day of November, 2012

David J. Kappos
*Director of the United States Patent and Trademark Office*